(12) United States Patent
Fujita et al.

(10) Patent No.: US 12,222,675 B2
(45) Date of Patent: Feb. 11, 2025

(54) IMAGE FORMING APPARATUS AND SHEET DISCHARGING DEVICE

(71) Applicant: CANON KABUSHIKI KAISHA, Tokyo (JP)

(72) Inventors: Keisuke Fujita, Kanagawa (JP); Shogo Nagamine, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/499,579

(22) Filed: Nov. 1, 2023

(65) Prior Publication Data

US 2024/0152092 A1   May 9, 2024

(30) Foreign Application Priority Data

Nov. 9, 2022   (JP) ................ 2022-179893
Dec. 14, 2022  (JP) ................ 2022-199832

(51) Int. Cl.
  *G03G 15/00*   (2006.01)
  *G03G 21/20*   (2006.01)
  *G06K 15/16*   (2006.01)

(52) U.S. Cl.
  CPC ....... *G03G 21/203* (2013.01); *G03G 15/6552* (2013.01); *G06K 15/16* (2013.01)

(58) Field of Classification Search
  CPC .......... G03G 15/6552; G03G 21/203
  USPC .......................... 399/44, 401, 405
  See application file for complete search history.

(56) References Cited

U.S. PATENT DOCUMENTS

| | | | |
|---|---|---|---|
| 7,761,018 B2 | 7/2010 | Etoh | |
| 11,119,429 B2 * | 9/2021 | Nakama | G03G 21/203 |
| 11,429,048 B2 | 8/2022 | Hirajima | |
| 11,774,900 B2 * | 10/2023 | Nakamura | G03G 21/1647 271/3.14 |
| 2009/0035032 A1 | 2/2009 | Etoh | |
| 2023/0120649 A1 | 4/2023 | Noji | |

FOREIGN PATENT DOCUMENTS

| | | | |
|---|---|---|---|
| CN | 112010084 | * | 12/2020 |
| JP | 2003-081515 A | | 3/2003 |
| JP | 2009-053656 A | | 3/2009 |
| JP | 2009215070 | * | 9/2009 |
| JP | 2020-126104 A | | 8/2020 |

OTHER PUBLICATIONS

Aug. 27, 2024 Japanese Official Action in Japanese Patent Appln. No. 2022-179893.
Nov. 19, 2024 Japanese Official Action in Japanese Patent Appln. No. 2022-179893.

* cited by examiner

*Primary Examiner* — Hoan H Tran
(74) *Attorney, Agent, or Firm* — Venable LLP

(57) ABSTRACT

An image forming apparatus includes a feeding portion, an image forming portion, a fixing portion, a casing, a discharging portion, a reversing portion, and a controller. In a first operation, the image forming portion forms an image on a sheet fed by the feeding portion, and then the discharging portion discharges the sheet. In a second operation, after the reversing portion reverses and conveys the sheet (i) which is fed by the feeding portion and (ii) which passes through the image forming portion without forming the image thereon and is conveyed to the second conveyance passage, the image forming portion forms the image on the sheet, and then the discharging portion discharges the sheet.

35 Claims, 27 Drawing Sheets

(a)

(b)

(c)

(d)

(e)

(a)

(b)

IMAGE FORMING APPARATUS AND SHEET DISCHARGING DEVICE

FIELD OF THE INVENTION AND RELATED ART

The present invention relates to an image forming apparatus for forming an image on a sheet. In addition, the present invention relates to a sheet discharging device for discharging the sheet and the image forming apparatus including the sheet discharging device.

In an image forming apparatus such as a printer, a copying machine, or a multi-function machine, after an image (toner image) is formed on a sheet which is a recording medium, the image is fixed on the sheet by heating the sheet by a fixing device. During the fixing, there is a case that moisture contained in the sheet becomes water vapor and thus a water droplet is deposited on a sheet conveyance passage. Particularly, in an image forming apparatus capable of double-side printing, in the case where one-side printing is continuously executed, the water droplet is deposited on a conveyance passage for the double-side printing through which the sheet does not pass, and thereafter, the sheet is wetted when the double-side printing is carried out, so that there is a possibility of occurrence of a lowering in image quality and improper conveying.

In Japanese Laid-Open Patent Application (JP-A) 2009-53656, an image forming apparatus operable in a mode in which a sheet first fed in a double-side printing job is fed to a double-side conveyance passage without forming an image thereon and is caused to absorb a water droplet on the double-side conveyance passage and then in which the image is formed after the sheet is dried is disclosed.

However, in the operation in the mode of JP-A 2009-53656, a waiting time until the first sheet in the double-side printing job is discharged (this time is referred to as a "FPOT" (First Print-Out Time) becomes long.

Conventionally, an image forming apparatus in which a sheet on which an image is formed is discharged to a sheet discharge stacking portion and then four corners of the sheet discharged to the sheet discharge stacking portion are pressed by a pressing means is proposed (JP-A 2003-81515). The pressing means includes a flag member rotatably supported by a bottom of an image reading apparatus (device). The flag member is rotated by being pressed by a leading end of the sheet, and when the discharged sheet is stacked on the sheet discharge stacking portion, the sheet is pressed onto the sheet discharge stacking portion from above by a self-weight thereof. By this, curl of the sheet is suppressed.

As described above, the flag member disclosed in JP-A 2003-81515 press the sheet by the self-weight thereof. For this reason, in order to suppress the curl, a weight to some degree is required. However, in the case where the weight of the flag member is increased, when the leading end of the discharged sheet presses the flag member, the leading end of the sheet cannot completely press up the flag member and thus is directed downward. Then, in a contact portion between the leading end of the sheet and the sheet discharge stacking portion, an angle formed between the leading end of the sheet and the sheet discharge stacking portion becomes large.

In the case where the sheet has already been stacked on the sheet discharge stacking portion, when a frictional force between the discharged sheet and the sheet which has already been stacked on the sheet discharge stacking portion becomes large, a force by which the sheet on the sheet discharge stacking portion is pressed downstream in a sheet discharging direction becomes strong.

SUMMARY OF THE INVENTION

A principal object of the present invention is to provide an image forming apparatus capable of reducing a degree of an occurrence of troubles due to setting of the sheet.

Another object of the present invention is to provide a sheet discharging device improved in sheet stacking property and an image forming apparatus including the sheet discharging device.

According to an aspect of the present invention, there is provided an image forming apparatus comprising: a feeding unit configured to feed a sheet; an image forming unit configured to form an image on the sheet fed by the feeding unit; a fixing unit configured to fix the image on the sheet by heating the sheet; a casing configured to accommodate the fixing unit, the casing including a first conveyance passage along which the sheet passed through the fixing unit is conveyed and including a second conveyance passage branched from the first conveyance passage; a discharging unit provided in the first conveyance passage and configured to discharge the sheet to an outside of the casing; a reversing unit configured to reverse and convey the sheet in the second conveyance passage so that the sheet conveyed in the second conveyance passage is conveyed again toward the image forming unit; and a controller configured to execute a first operation and a second operation executed for a predetermined sheet during execution of a job for forming an image on one side of each of a plurality of sheets, wherein in the first operation, the image forming unit forms the image on the sheet fed by the feeding unit, and then the discharging unit discharges the sheet, and wherein in the second operation, after the reversing unit reverses and conveys the sheet (i) which is fed by the feeding unit and (ii) which passes through the image forming unit without forming the image thereon and is conveyed to the second conveyance passage, the image forming unit forms the image on the sheet, and then the discharging unit discharges the sheet.

According to another aspect of the present invention, there is provided a sheet discharging device comprising: a discharging portion configured to discharge a sheet; a stacking portion configured to stack the sheet discharged by the discharging portion; a first moving unit including a contact portion movable to a stand by position and a detecting position and including a pressed portion; a detecting portion configured to detect a position of the contact portion; a second moving unit including a pressing portion and movable to a first position and a second position; an actuator configured to drive the second moving unit; and a controller configured to control the actuator and the discharging portion, wherein the contact portion is positioned in the detecting position in a case that the contact portion contacts the sheet, stacked on the stacking portion, in a position higher than a predetermined position, and wherein the controller executes (i) in a case that detection that the contact portion is positioned in the detecting position is made by the detecting portion, first processing for moving the second moving unit from the first position to the second position so that the pressing portion presses the pressed portion so as to urge the contact portion from the detecting position toward the stand by position, and (ii) second processing for permitting discharge of the sheet by the discharging portion in a case that detection that the contact portion is moved from the detecting position toward the stand by position after the first processing is made by the detecting portion, and for restricting the discharge of the sheet by the discharging portion in a case that detection that the contact portion is maintained in the detecting position even after the first processing is made by the detecting portion.

According to a further aspect of the present invention, there is provided an image forming apparatus comprising: an image forming portion configured to form an image on a sheet; a discharging portion configured to discharge the sheet on which the image is formed by an image forming portion; a stacking portion configured to stack the sheet discharged by the discharging portion; a first moving unit including a contact portion movable to a stand by position and a detecting position and including a pressed portion; a detecting portion configured to detect a position of the contact portion; a second moving unit including a pressing portion and movable to a first position and a second position; an actuator configured to drive the second moving unit; and a controller configured to control the actuator and the discharging portion, wherein the contact portion is positioned in the detecting position in a case that the contact portion contacts the sheet, stacked on the stacking portion, in a position higher than a predetermined position, and wherein the controller executes in a case that detection that the contact portion is positioned in the detecting position is made by the detecting portion, first processing for moving the second moving unit from the first position to the second position so that the pressing portion presses the pressed portion so as to urge the contact portion from the detecting position toward the stand by position, and second processing for permitting discharge of the sheet by the discharging portion in a case that detection that the contact portion is moved from the detecting position toward the stand by position after the first processing is made by the detecting portion, and for restricting the discharge of the sheet by the discharging portion in a case that detection that the contact portion is maintained in the detecting position even after the first processing is made by the detecting portion.

Further features of the present invention will become apparent from the following description of exemplary embodiments with reference to the attached drawings.

BRIEF DESCRIPTION OF THE DRAWINGS

Part (a) of FIG. 1 is a schematic view of an image forming apparatus according to an embodiment 1, and part (b) of FIG. 1 is an enlarged view thereof.

Parts (a) to (f) of FIG. 2 are schematic views for illustrating a double-side sheet passing operation in the embodiment 1.

Figure 4:
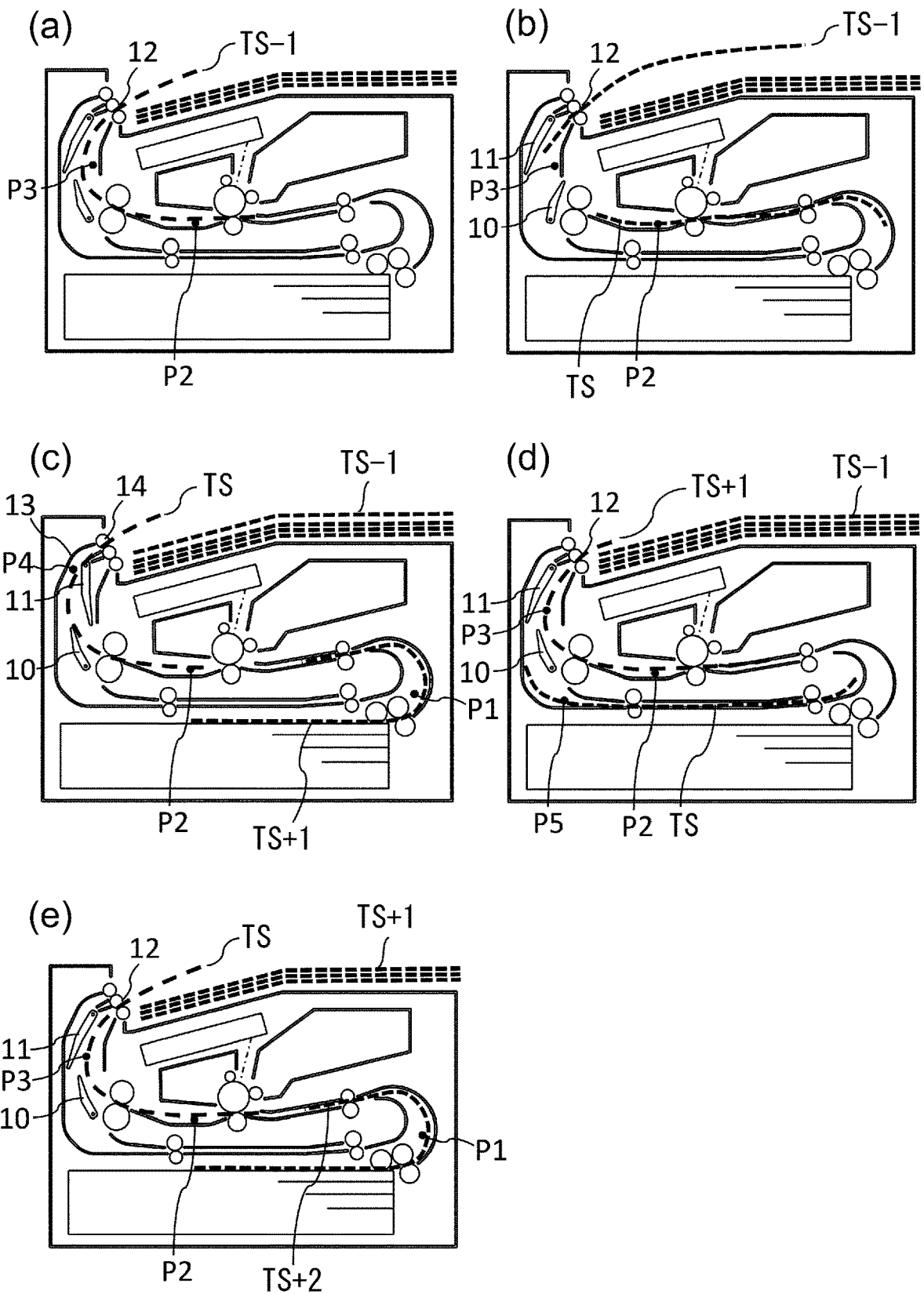

Parts (a) to (e) of FIG. 4 are schematic views for illustrating a sheet passing operation in the one-side printing job in the embodiment 1.

Figure 5:
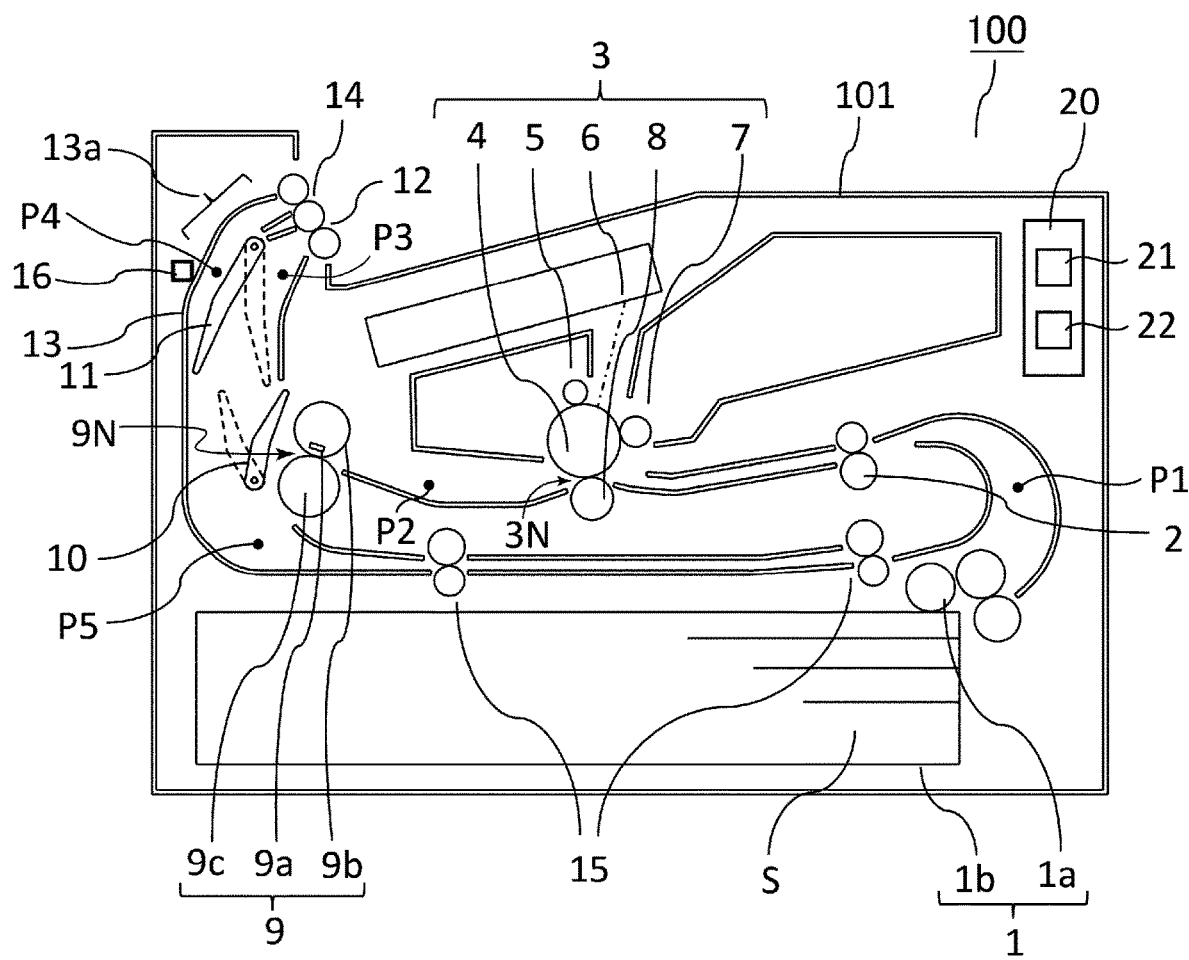

FIG. 5 is a schematic view of an image forming apparatus according to an embodiment 2.

Figure 6:
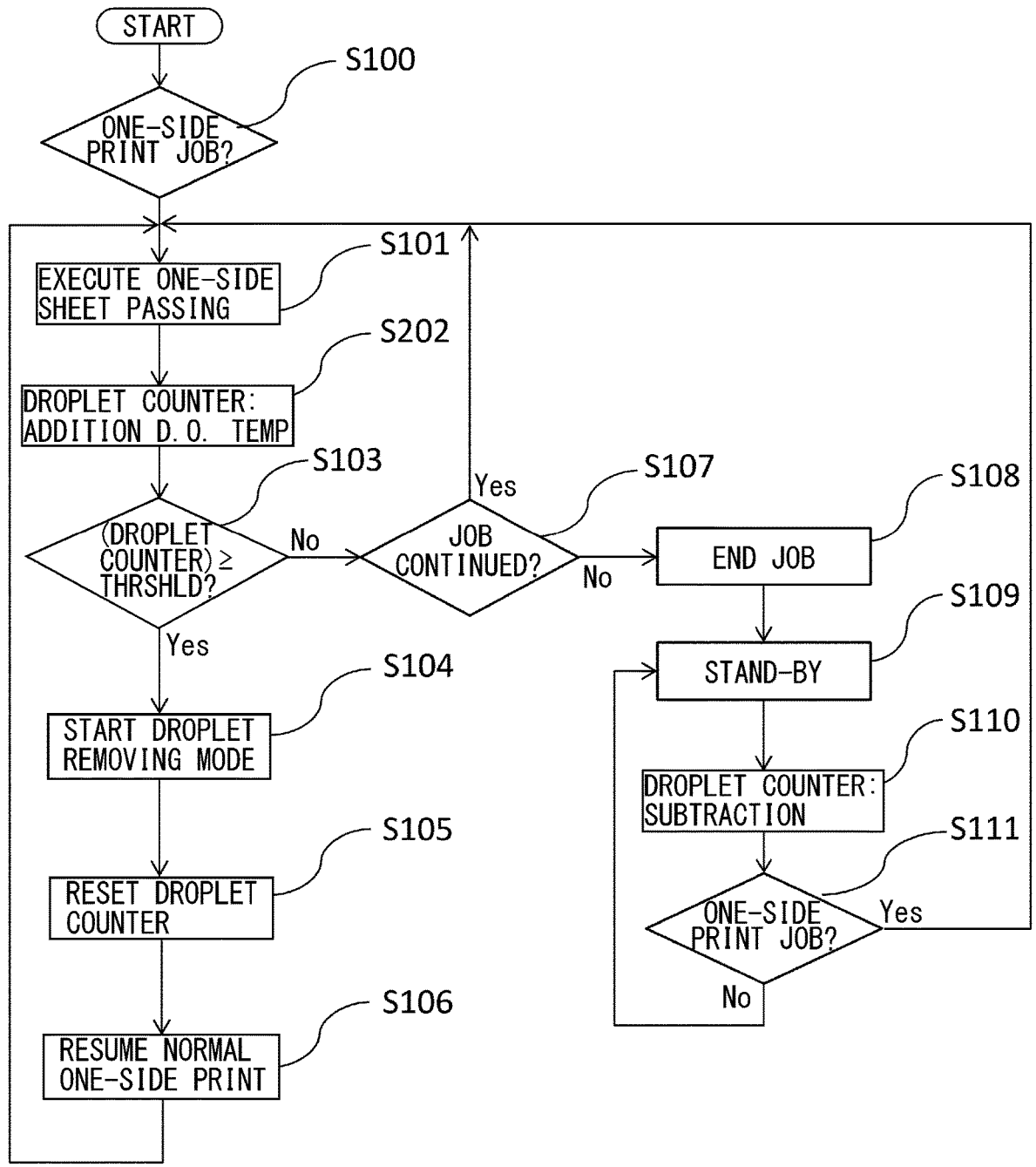

FIG. 6 is a flow chart showing control of a one-side printing job in the embodiment 2.

Figure 7:
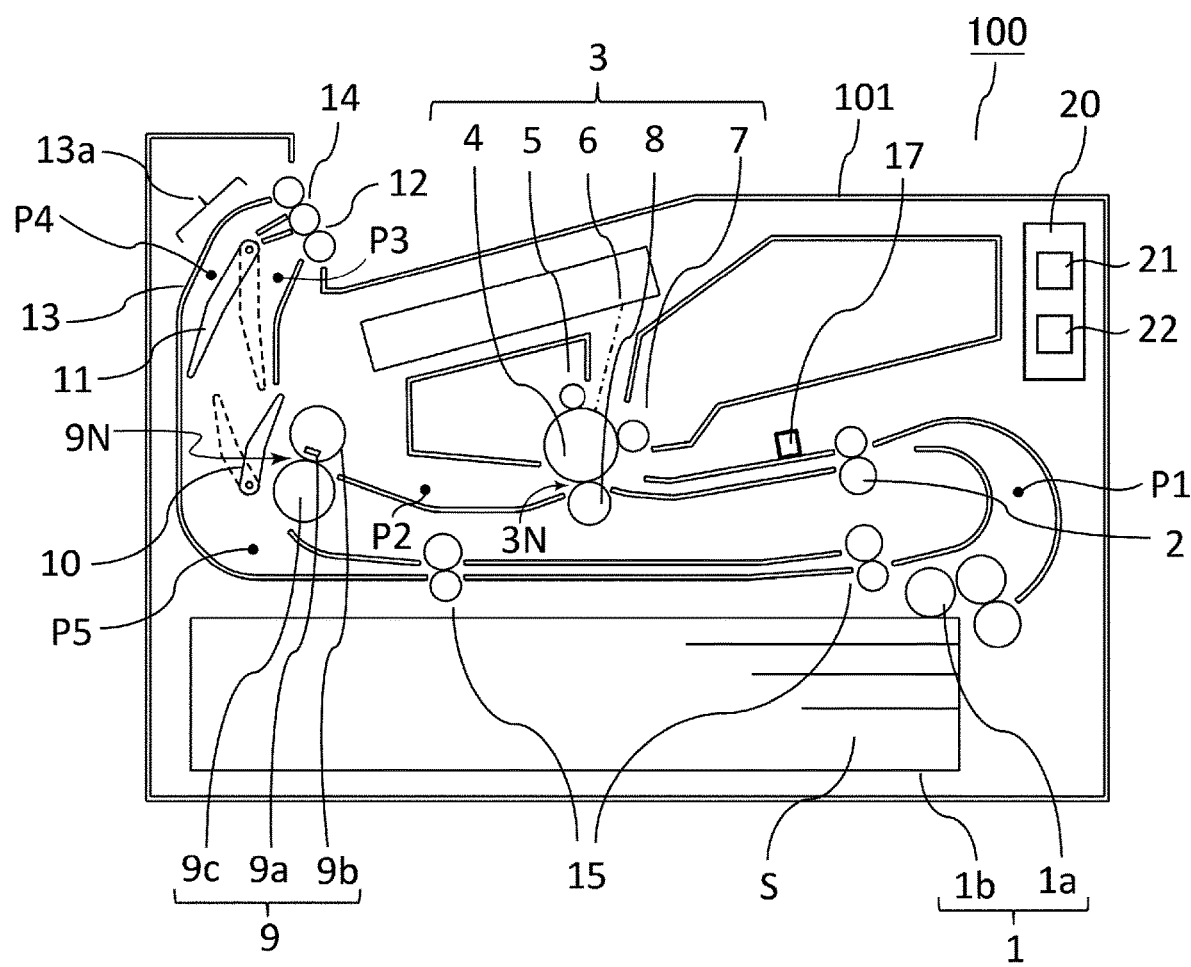

FIG. 7 is a schematic view of an image forming apparatus according to an embodiment 3.

Figure 8:
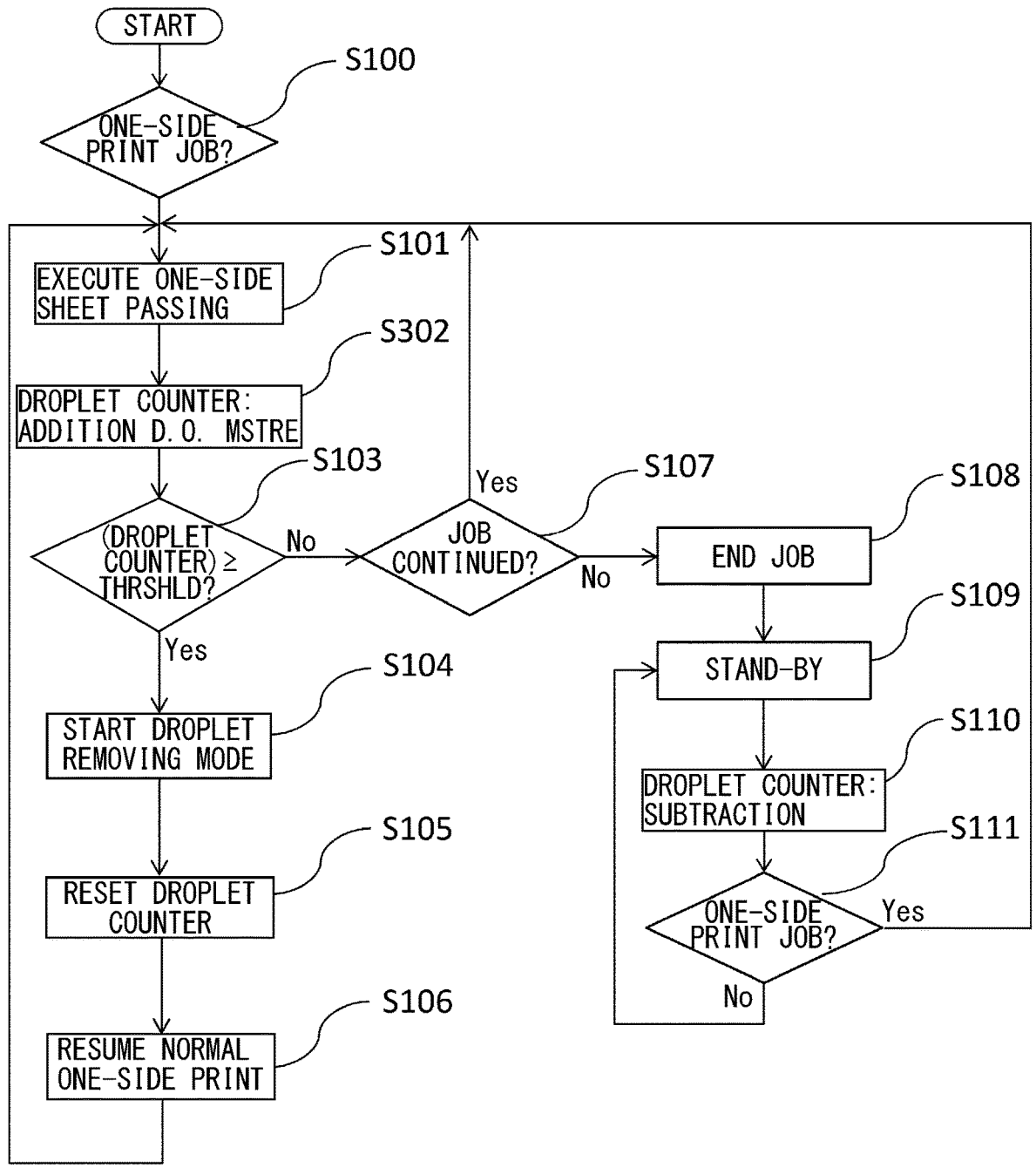

FIG. 8 is a flow chart showing control of a one-side printing job in the embodiment 3.

Figure 9:
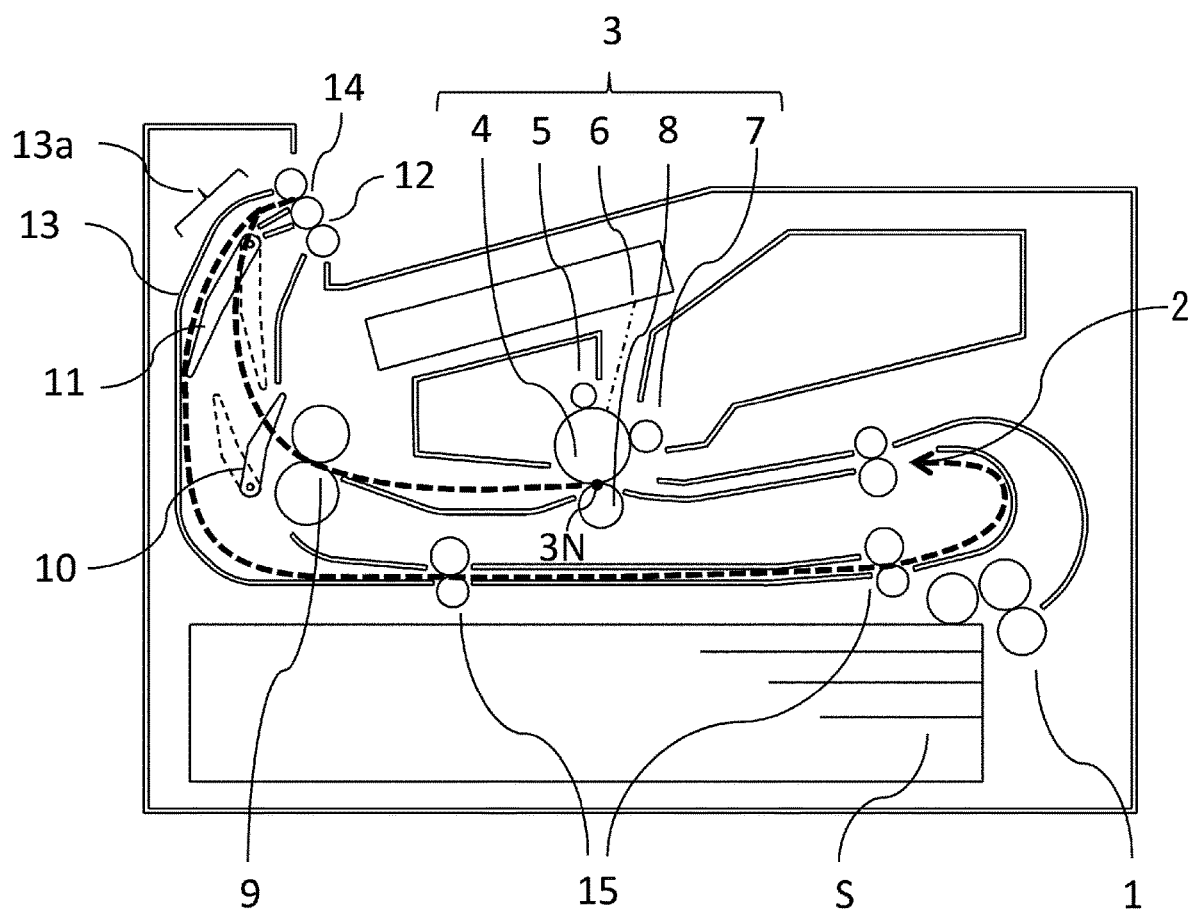

FIG. 9 is a schematic view of an image forming apparatus according to an embodiment 4.

Figure 10:
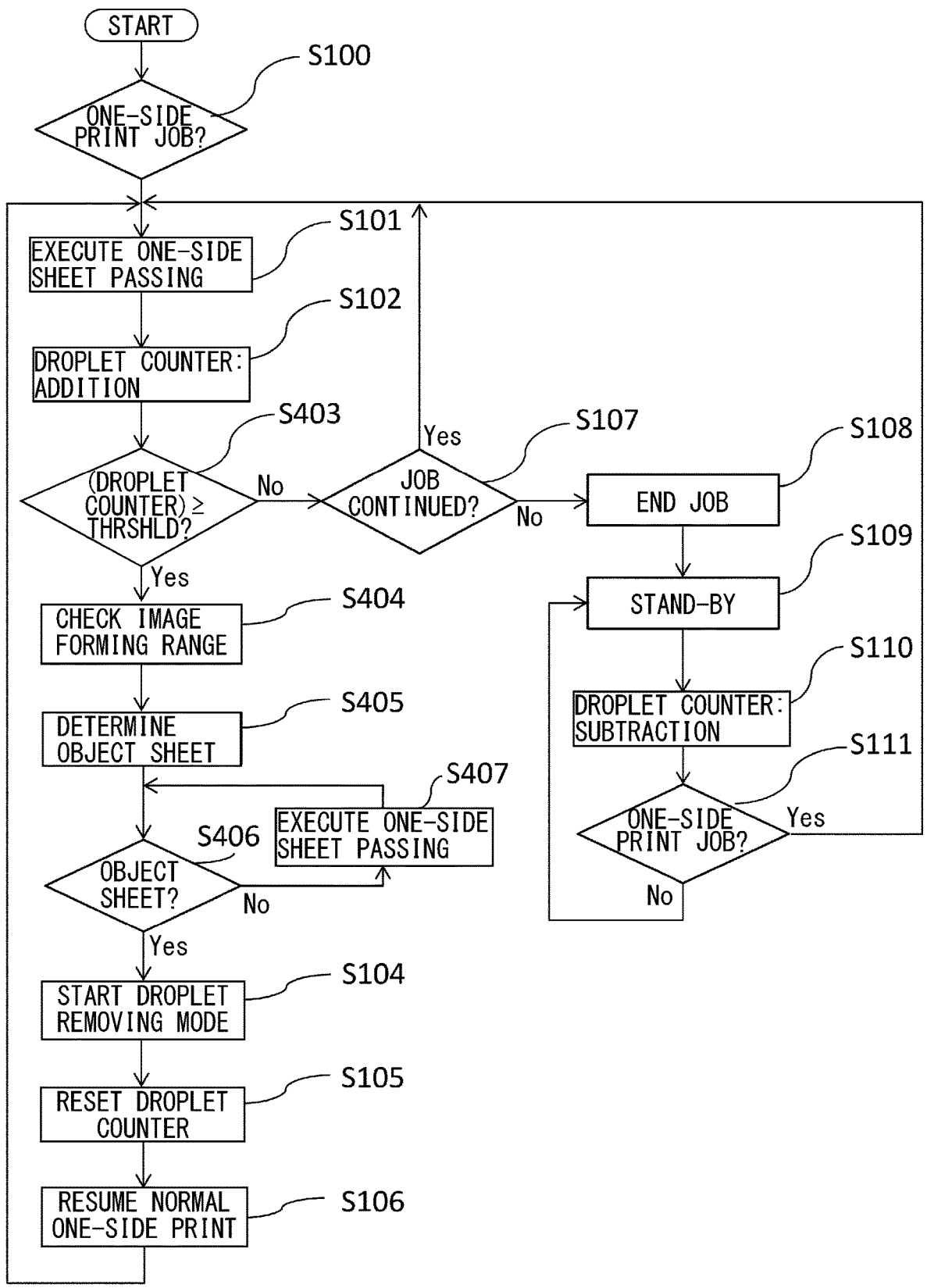

FIG. 10 is a flow chart showing control of a one-side printing job in the embodiment 4.

Figure 11:
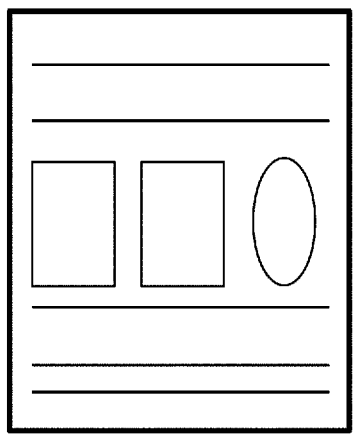
Figure 11:
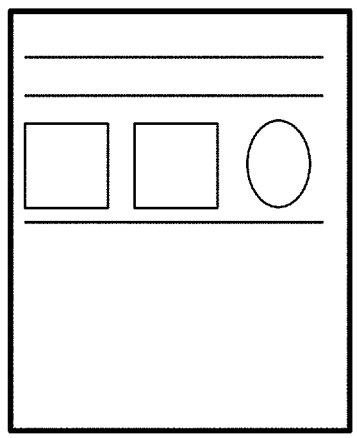
Figure 11:
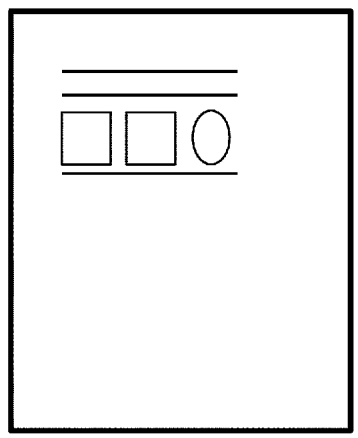
Figure 11:
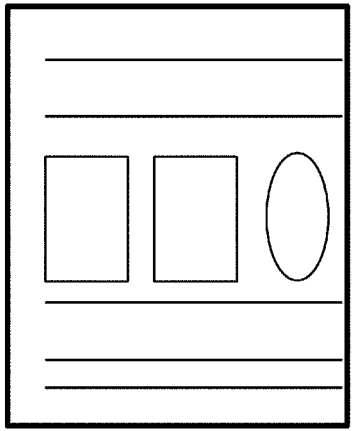
Figure 11:
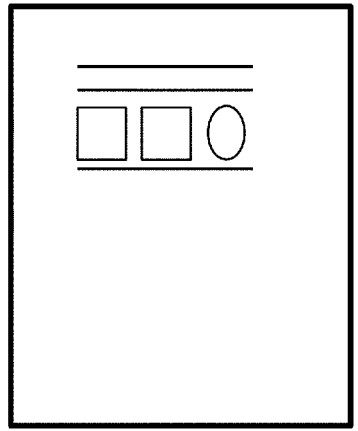

Parts (a) to (e) of FIG. 11 are schematic views for illustrating a result of the one-side printing job in the embodiment 4.

Figure 12:
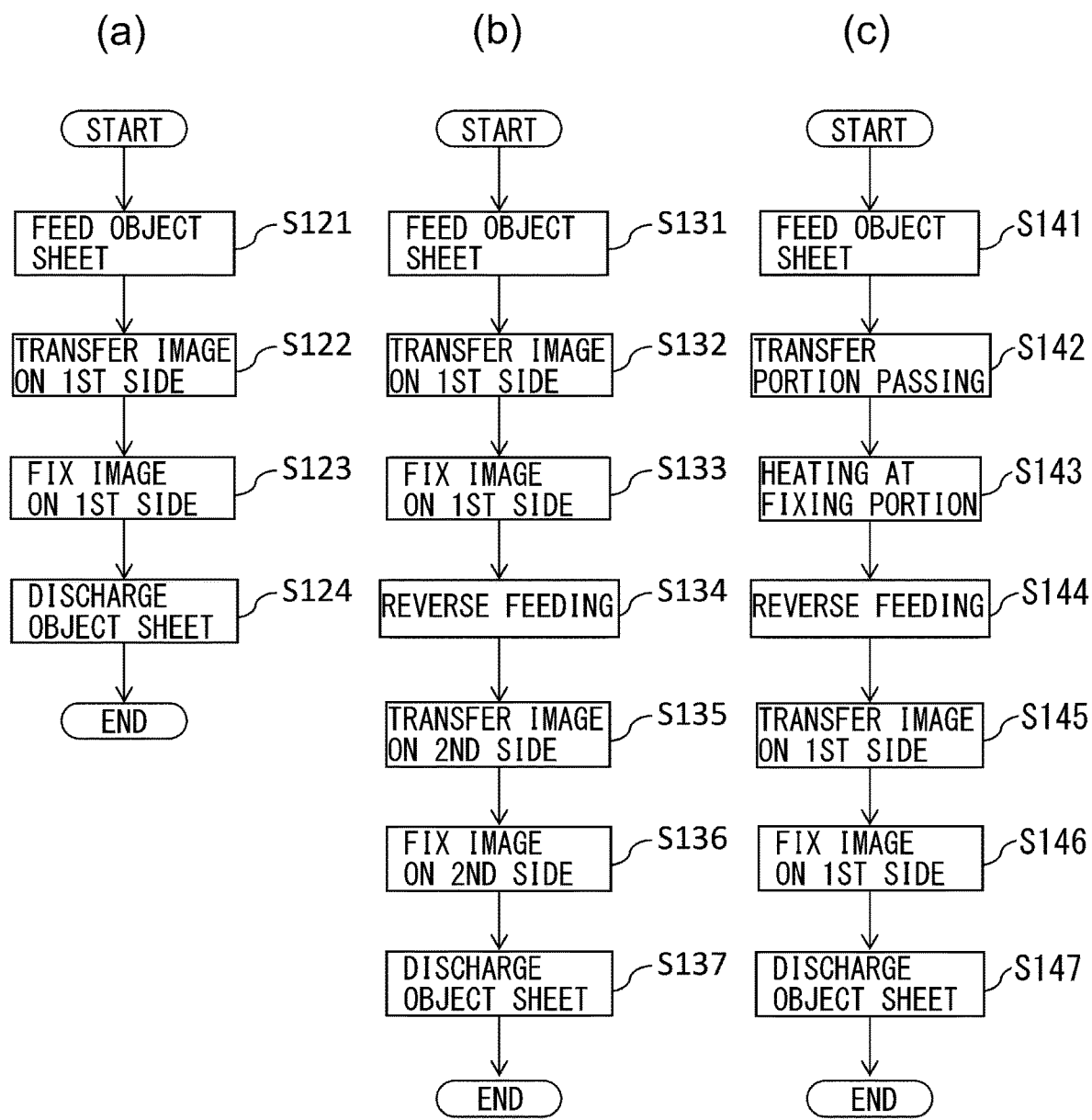

Parts (a) to (c) of FIG. 12 are flow charts each showing control of a sheet passing operation in the embodiment 1.

Figure 13:
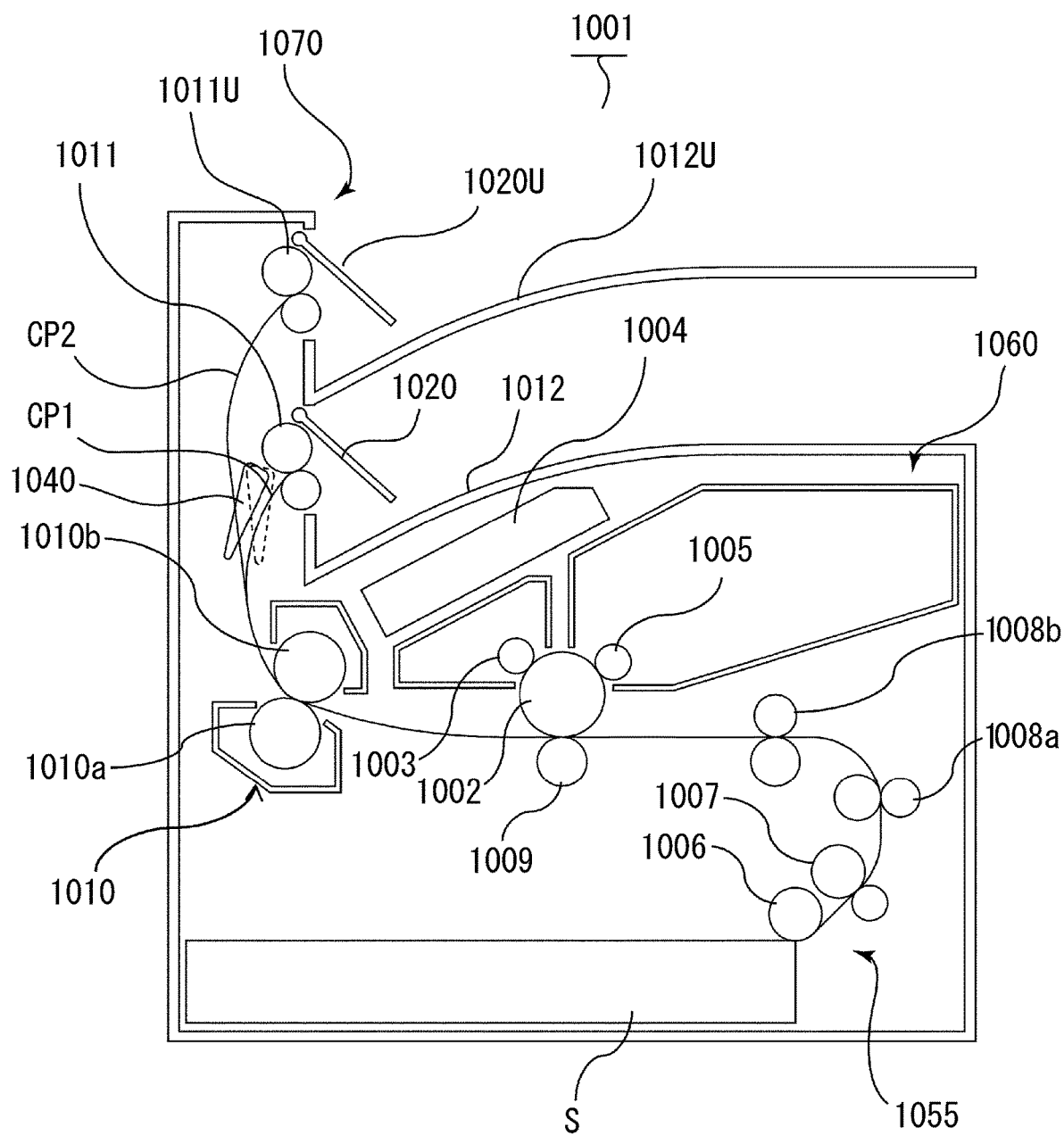

FIG. 13 is an entire schematic view showing a printer according to an embodiment 5.

Figure 14:
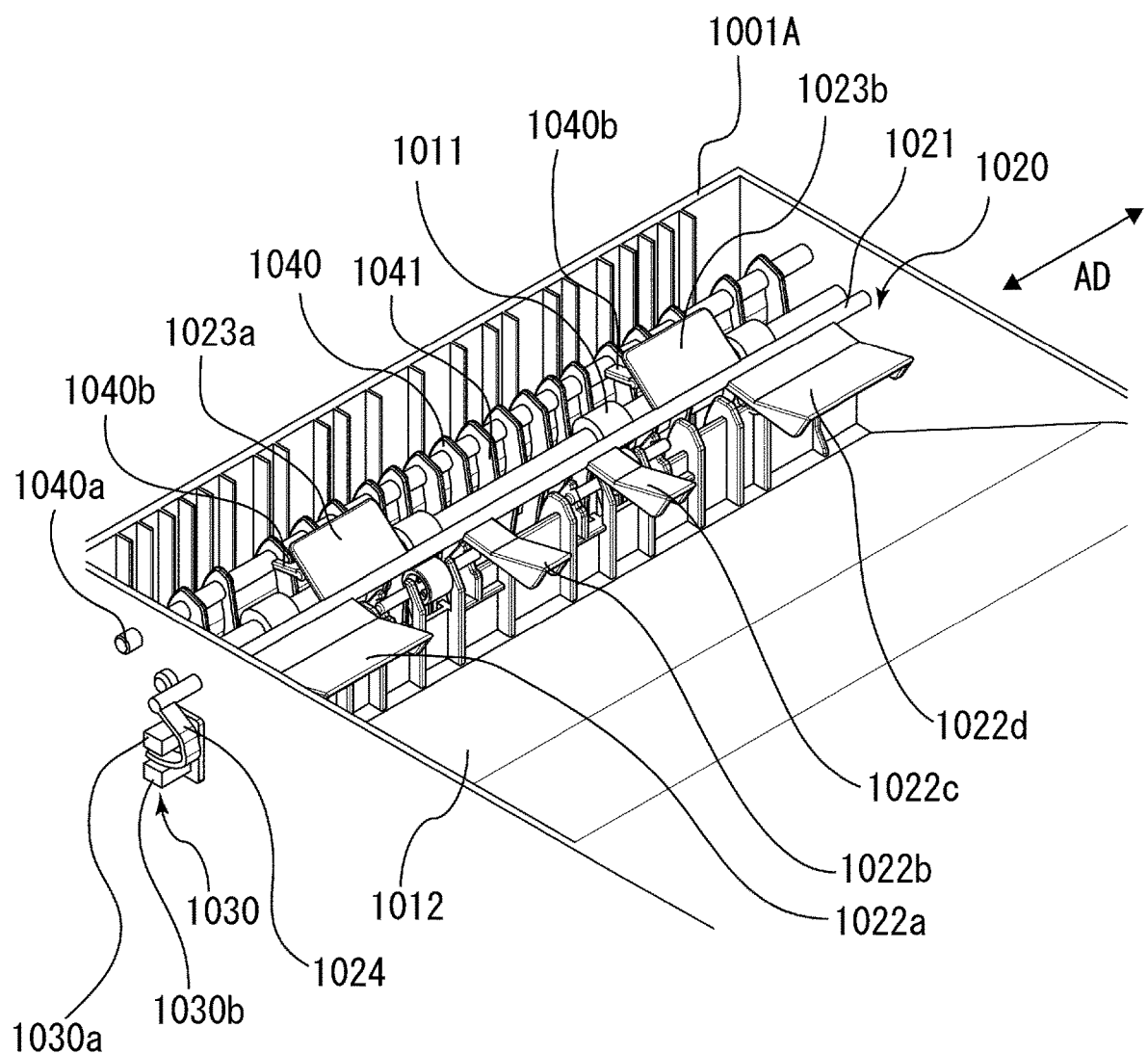

FIG. 14 is a perspective view showing a full-state detection flag and a sensor.

Figure 15:
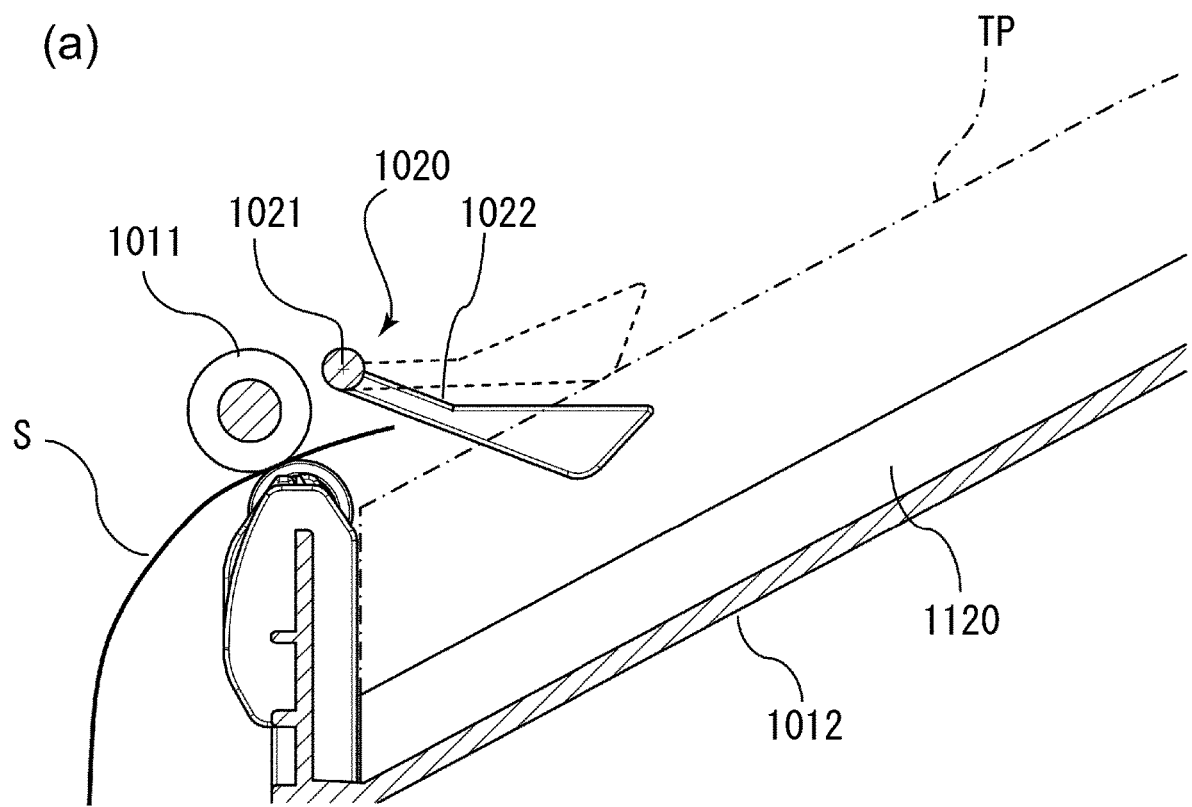
Figure 15:
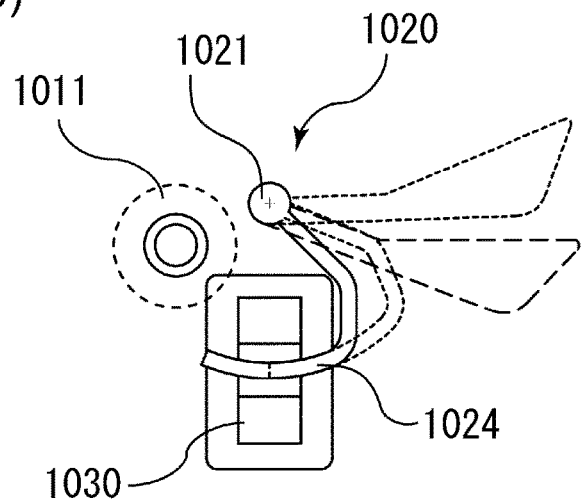

Part (a) of FIG. 15 is a sectional view showing the full-state detection flag positioned in a stand-by position, and part (b) of FIG. 15 is a sectional view showing the sensor in a light-shielding state.

Figure 16:
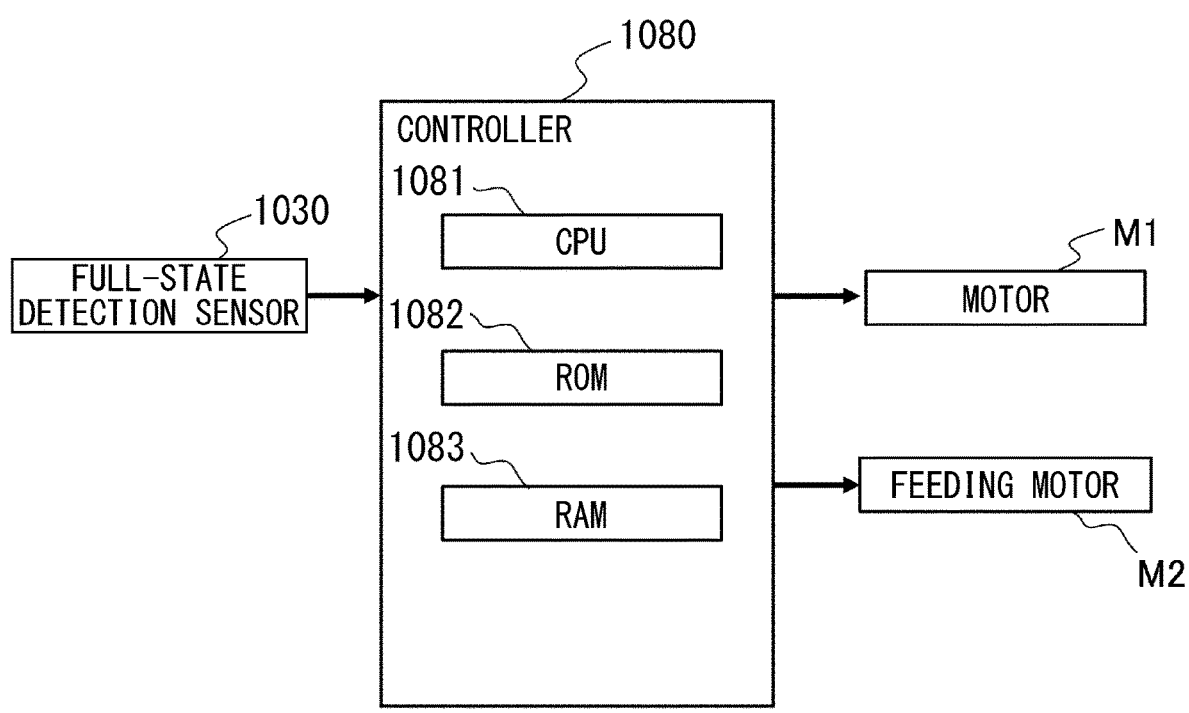

FIG. 16 is a control block diagram showing a control system in the embodiment 5.

Figure 17:
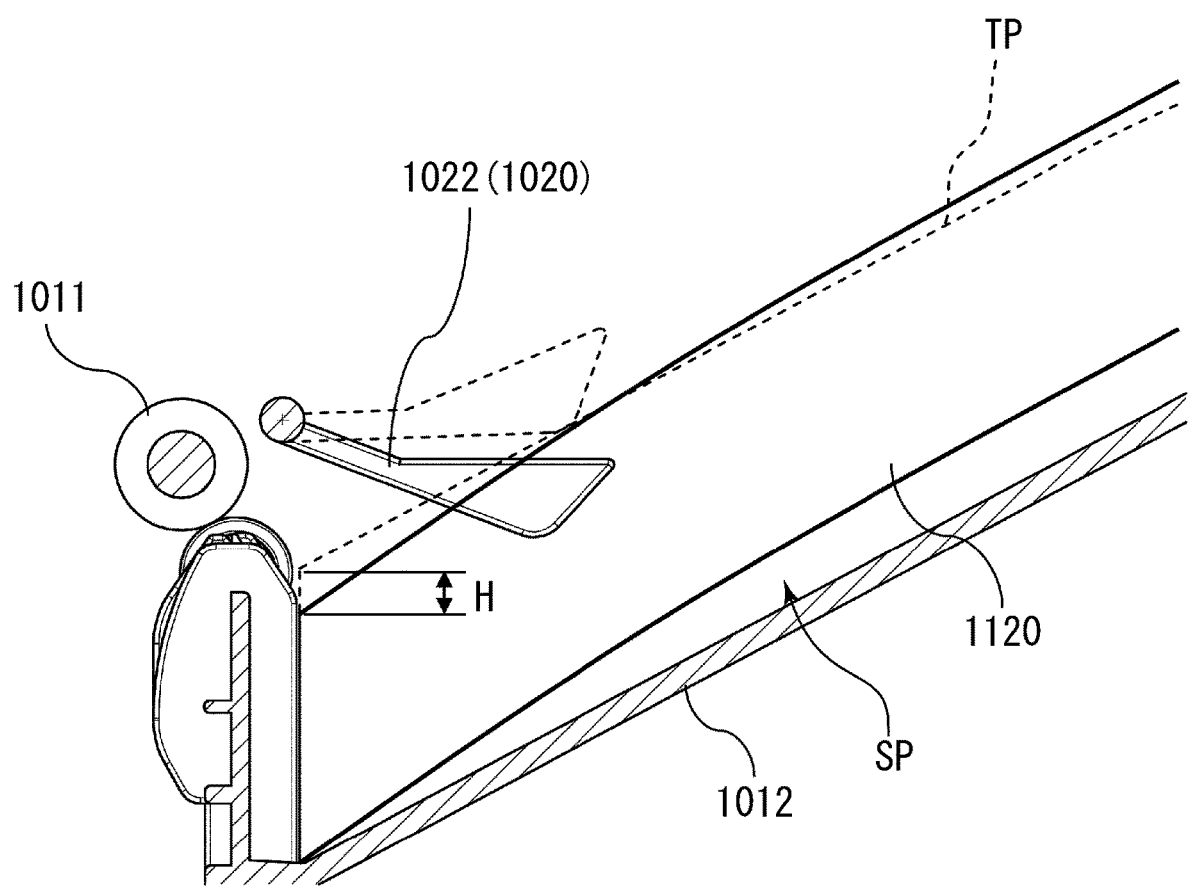

FIG. 17 is a sectional view showing a full-state detection flag in a comparison example.

Figure 18:
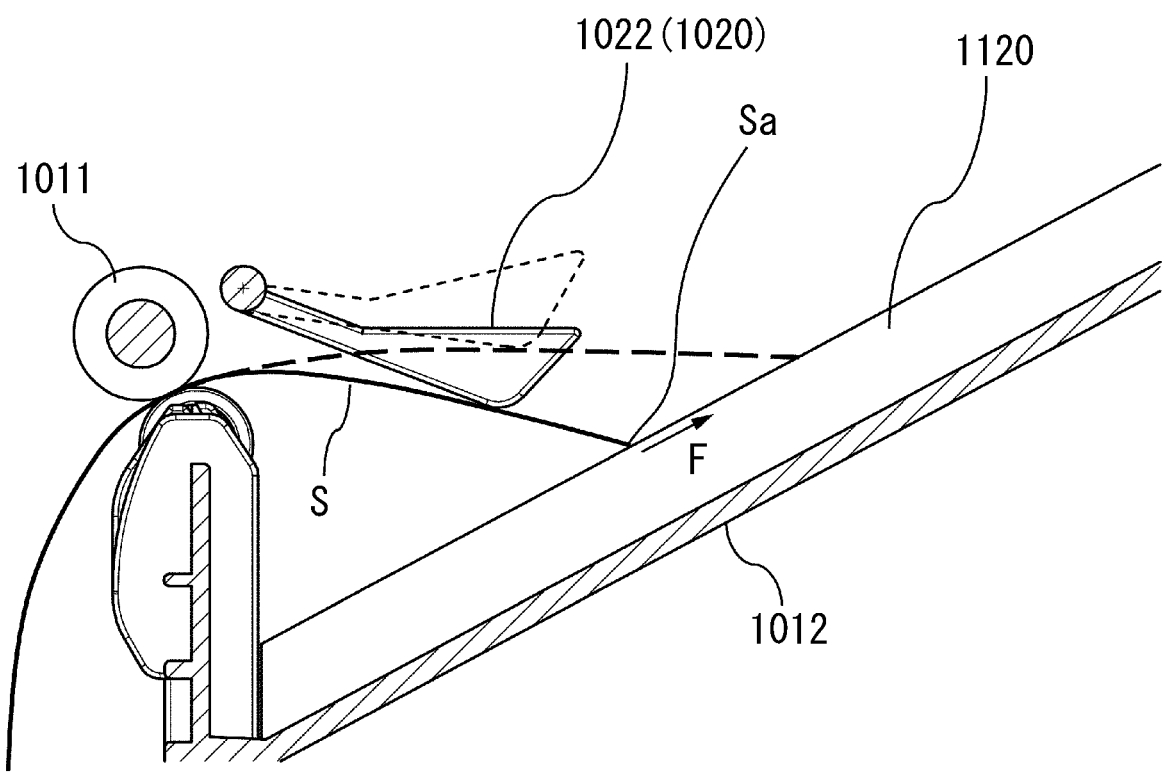

FIG. 18 is a sectional view showing the full-state detection flag and motion of a sheet.

Figure 19:
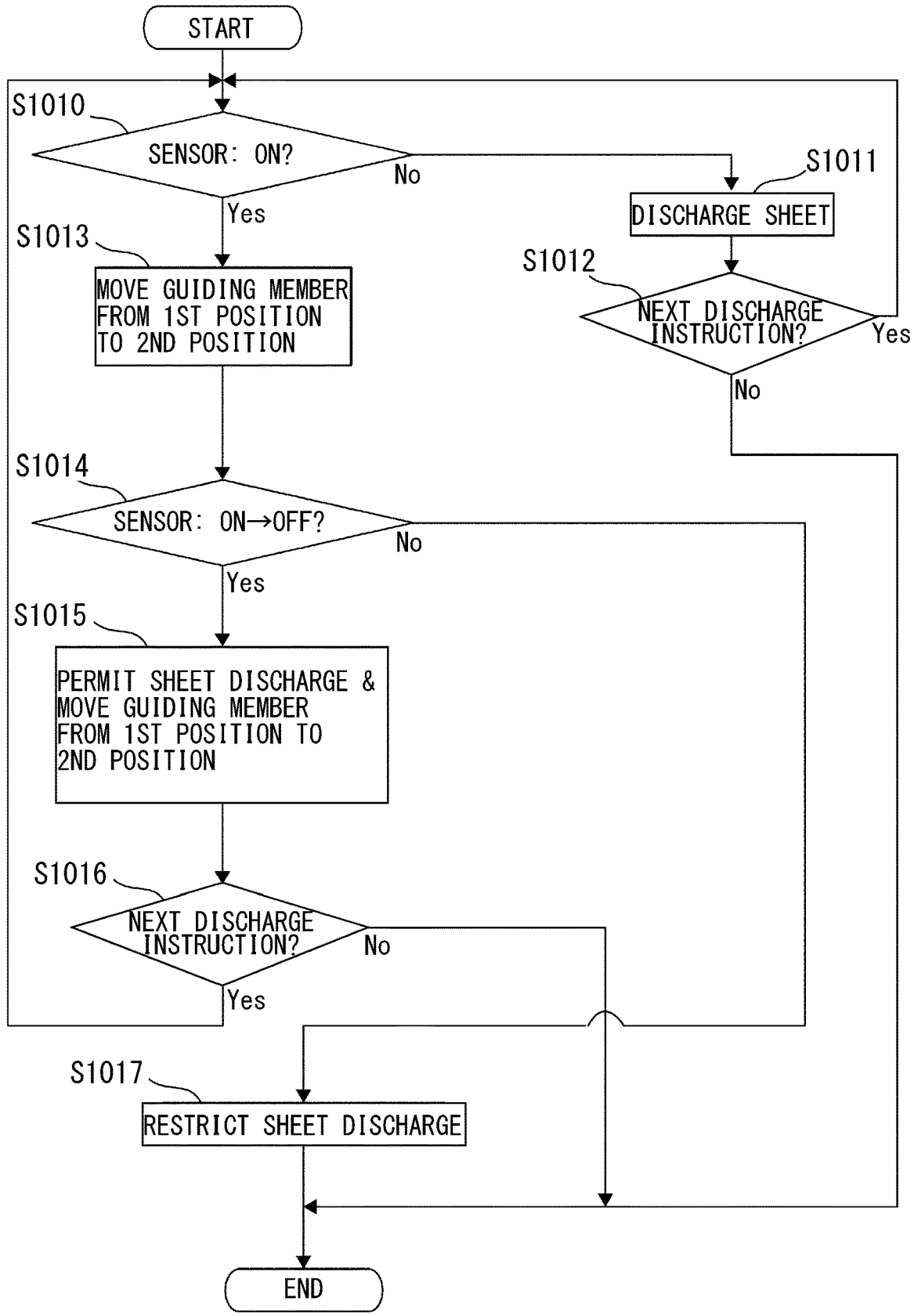

FIG. 19 is a flow chart showing full-state detection control in the embodiment 5.

Figure 20:
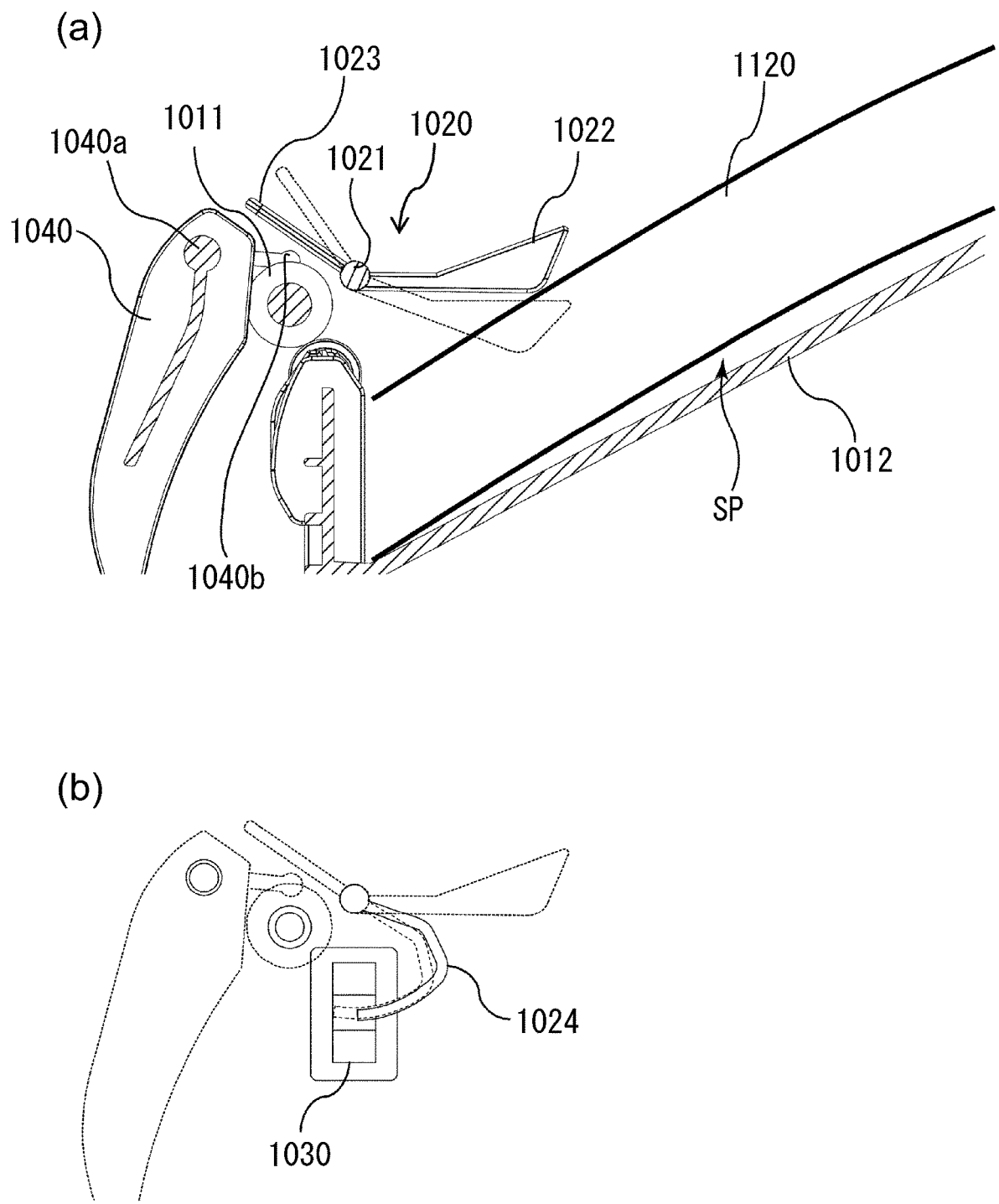

Part (a) of FIG. 20 is a sectional view showing a state in which the full-state detection flag is positioned in a detecting position in a state in which stacked sheets are curled, and part (b) of FIG. 20 is a sectional view showing the sensor.

Figure 21:
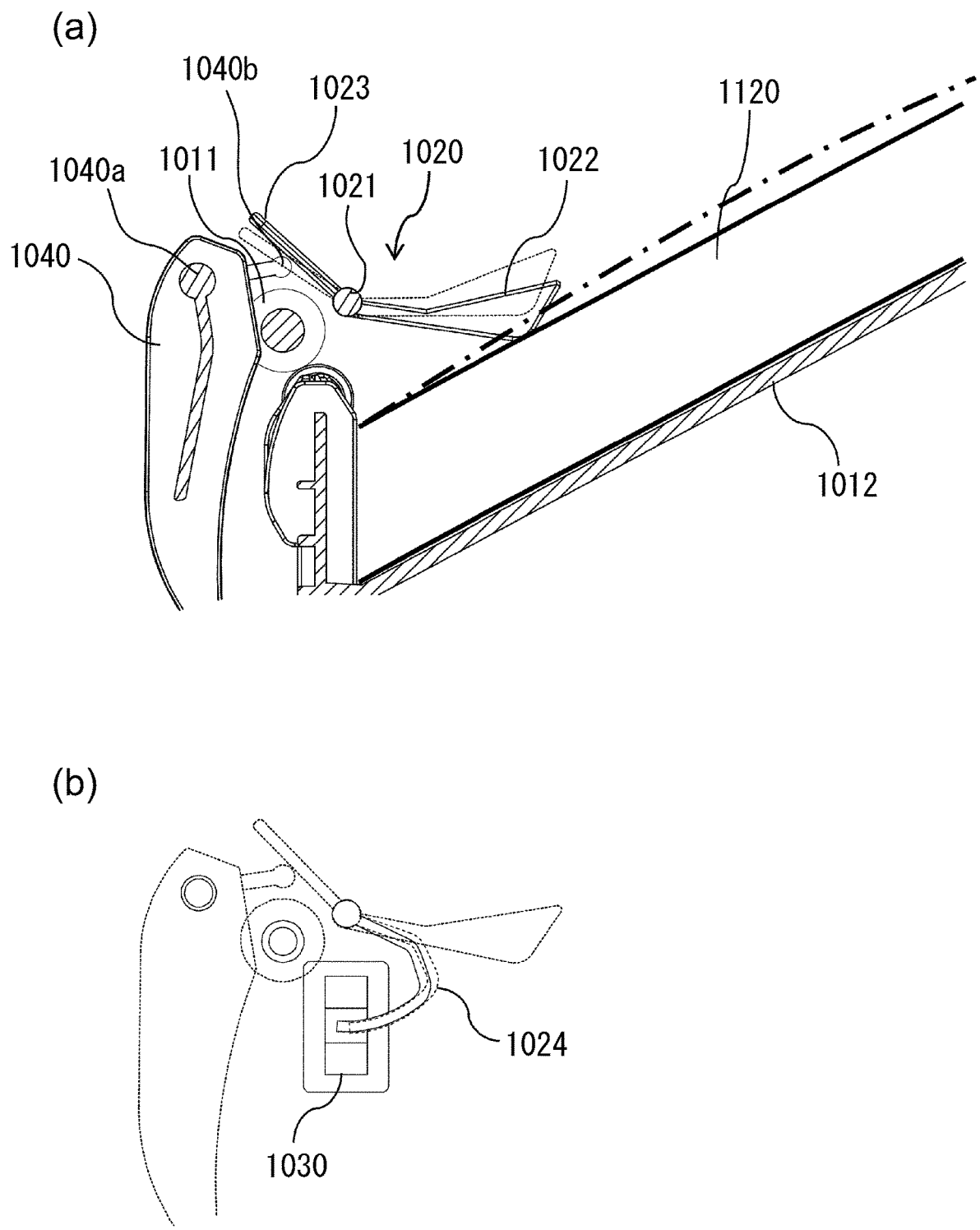

Part (a) of FIG. 21 is a sectional view showing a state in which curl of the stacked sheets is rectified by pressing the sheets by the full-state detection flag, and part (b) of FIG. 21 is a sectional view showing the sensor.

Figure 22:
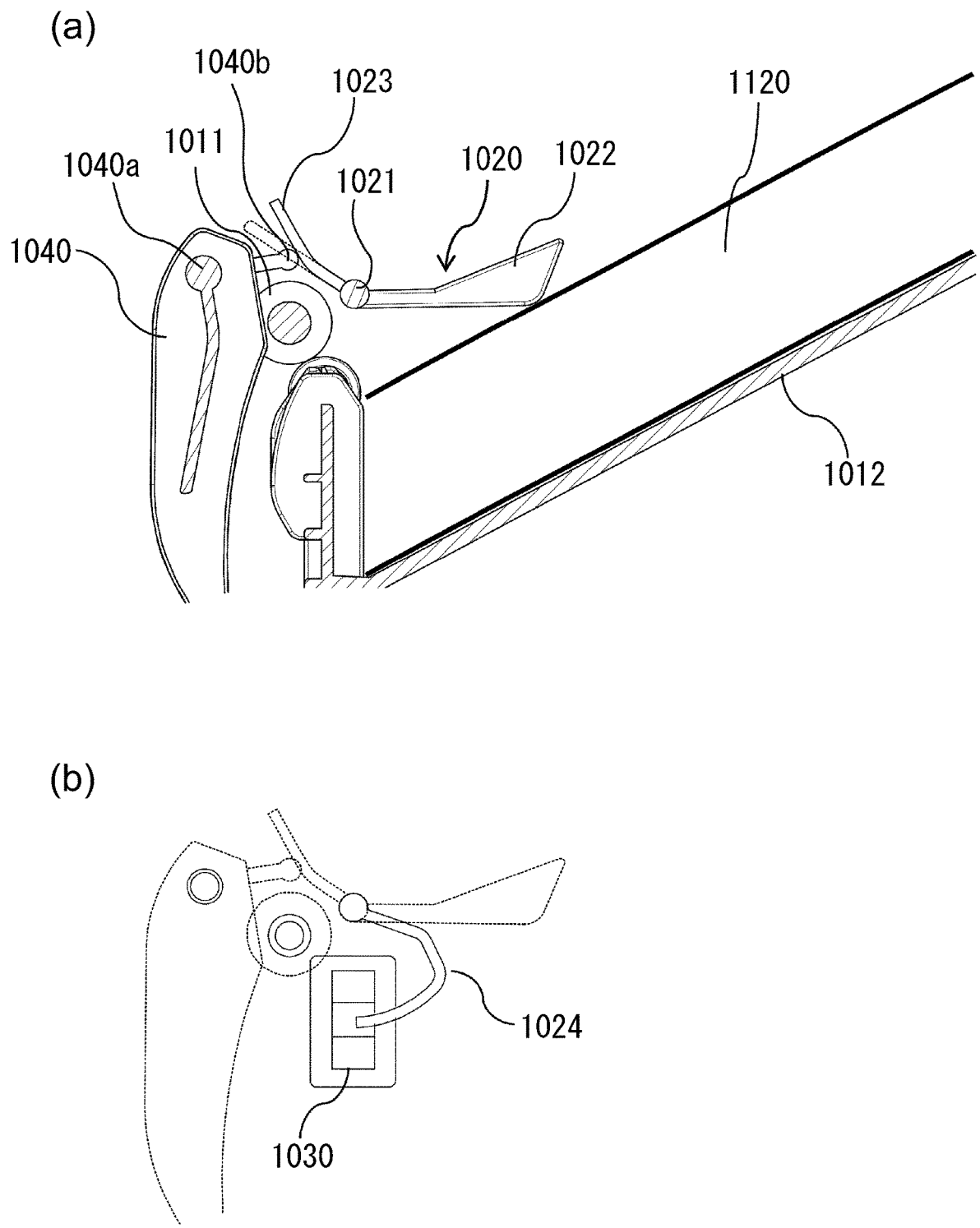

Part (a) of FIG. 22 is a sectional view showing a state in which the full-state detection flag is positioned in the detecting position in a state in which the stacked sheets are not curled, and part (b) of FIG. 22 is a sectional view showing the sensor.

Figure 23:
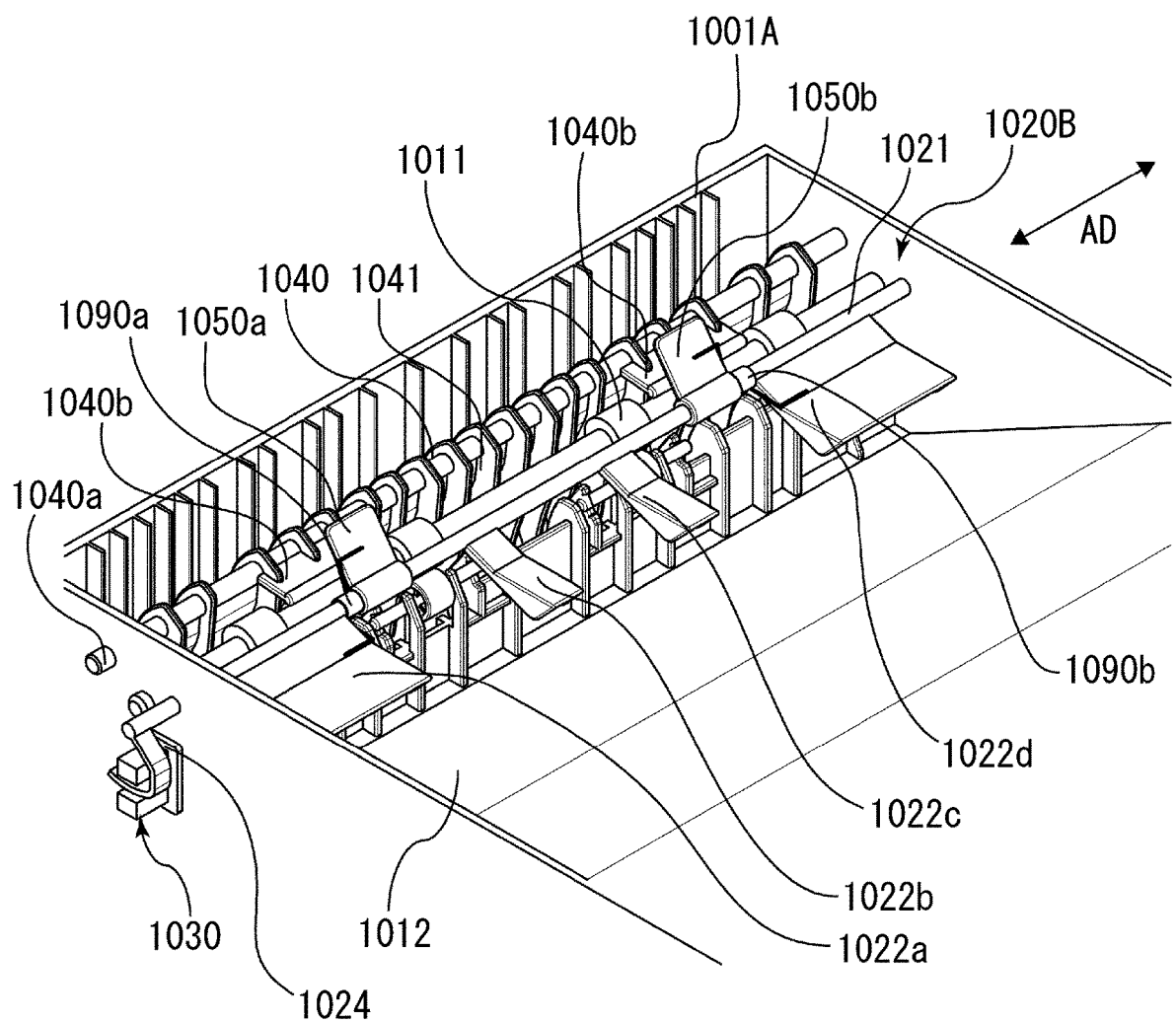

FIG. 23 is a perspective view showing a full-state detection flag in an embodiment 6.

Figure 24:
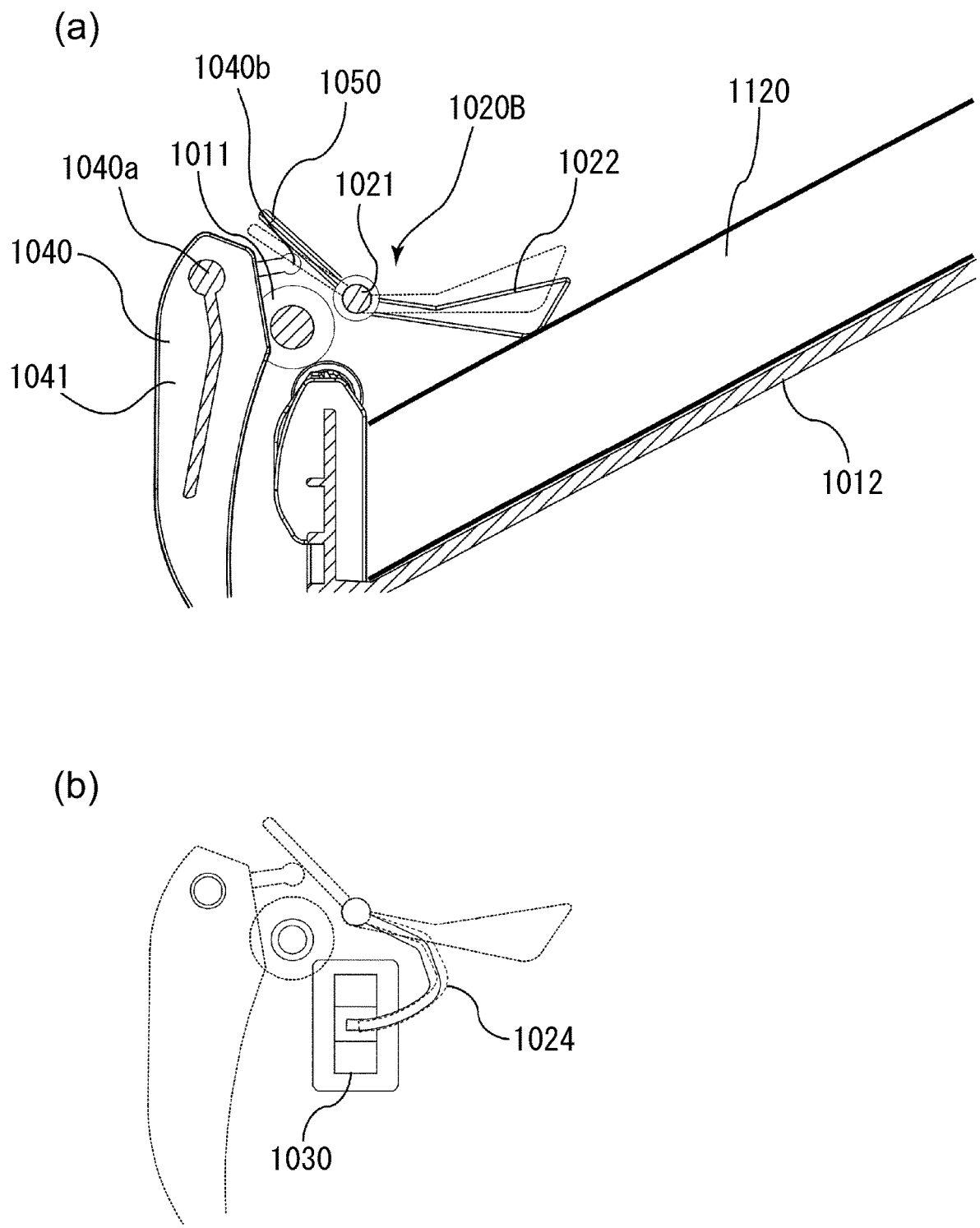

Part (a) of FIG. 24 is a sectional view showing a state in which curl of the stacked sheets is rectified by pressing the stacked sheets by the full-state detection flag, and part (b) is a sectional view showing the sensor.

Figure 25:
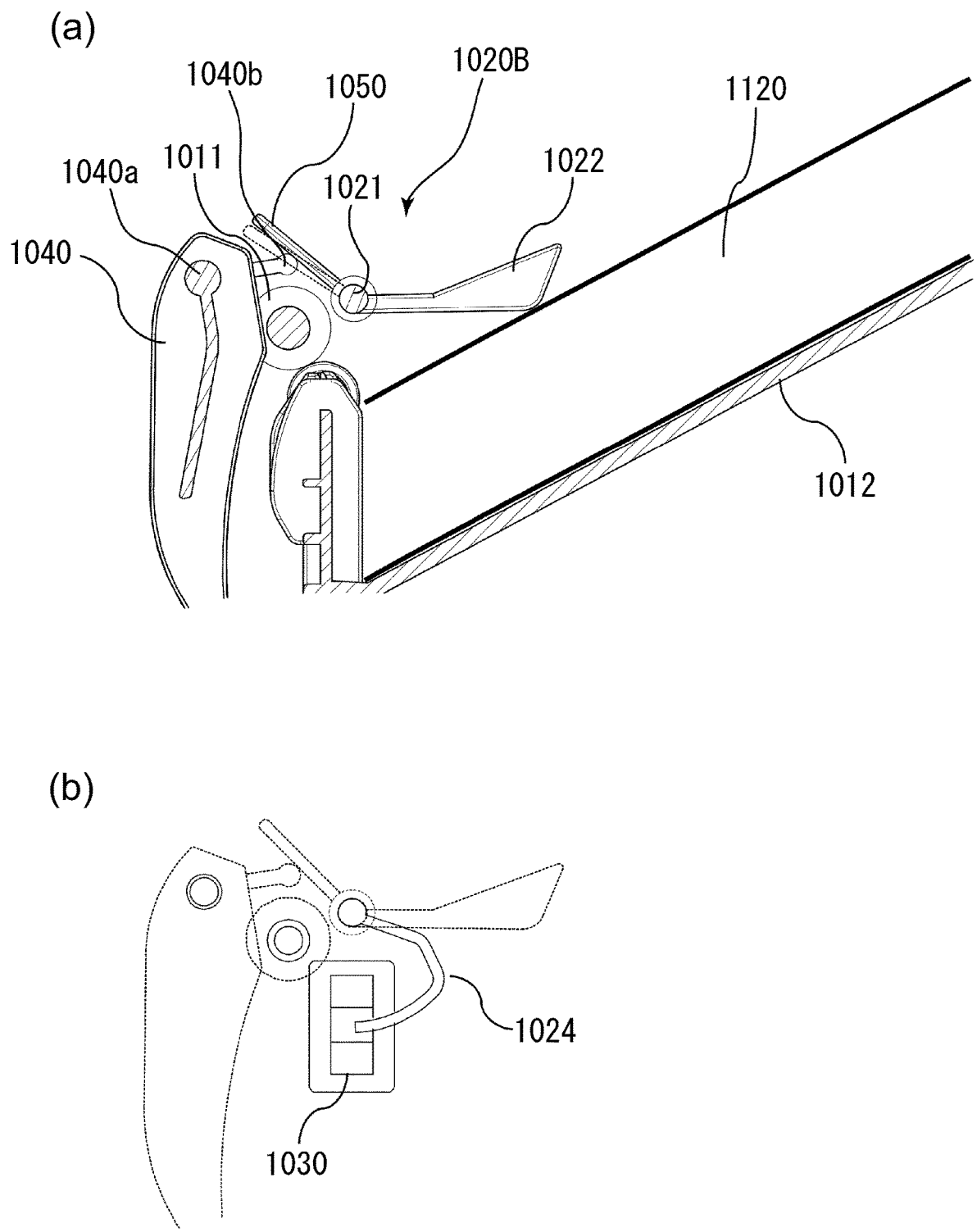

Part (a) of FIG. 25 is a sectional view showing a state in which a pressed member is pressed by a pressing portion in a state in which the stacked sheets are not curled, and part (b) of FIG. 25 is a sectional view showing the sensor.

Figure 26:
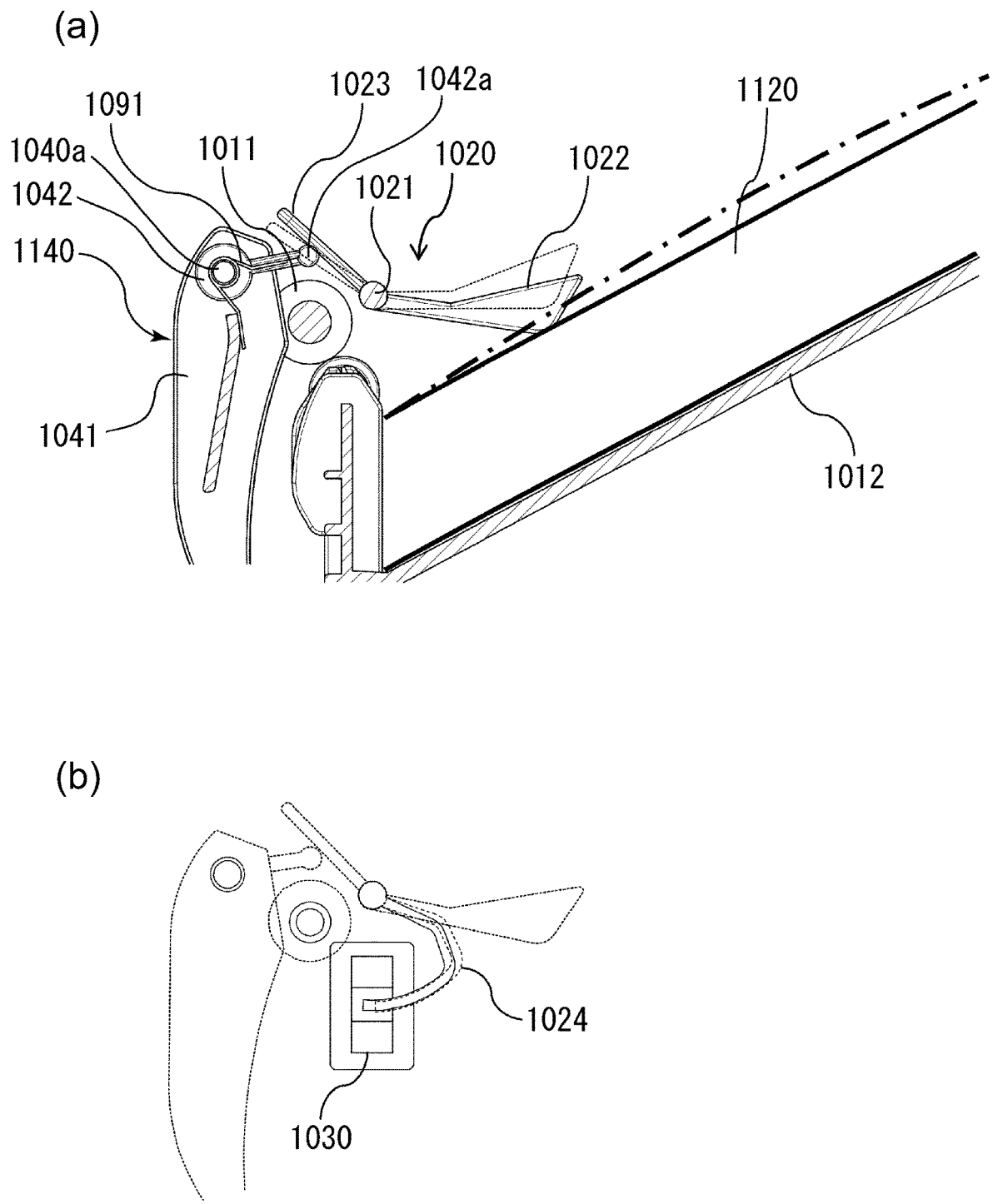

Part (a) of FIG. 26 is a sectional view showing a guiding member and a full-state detection flag in an embodiment 7, and part (b) is a sectional view showing a sensor.

Figure 27:
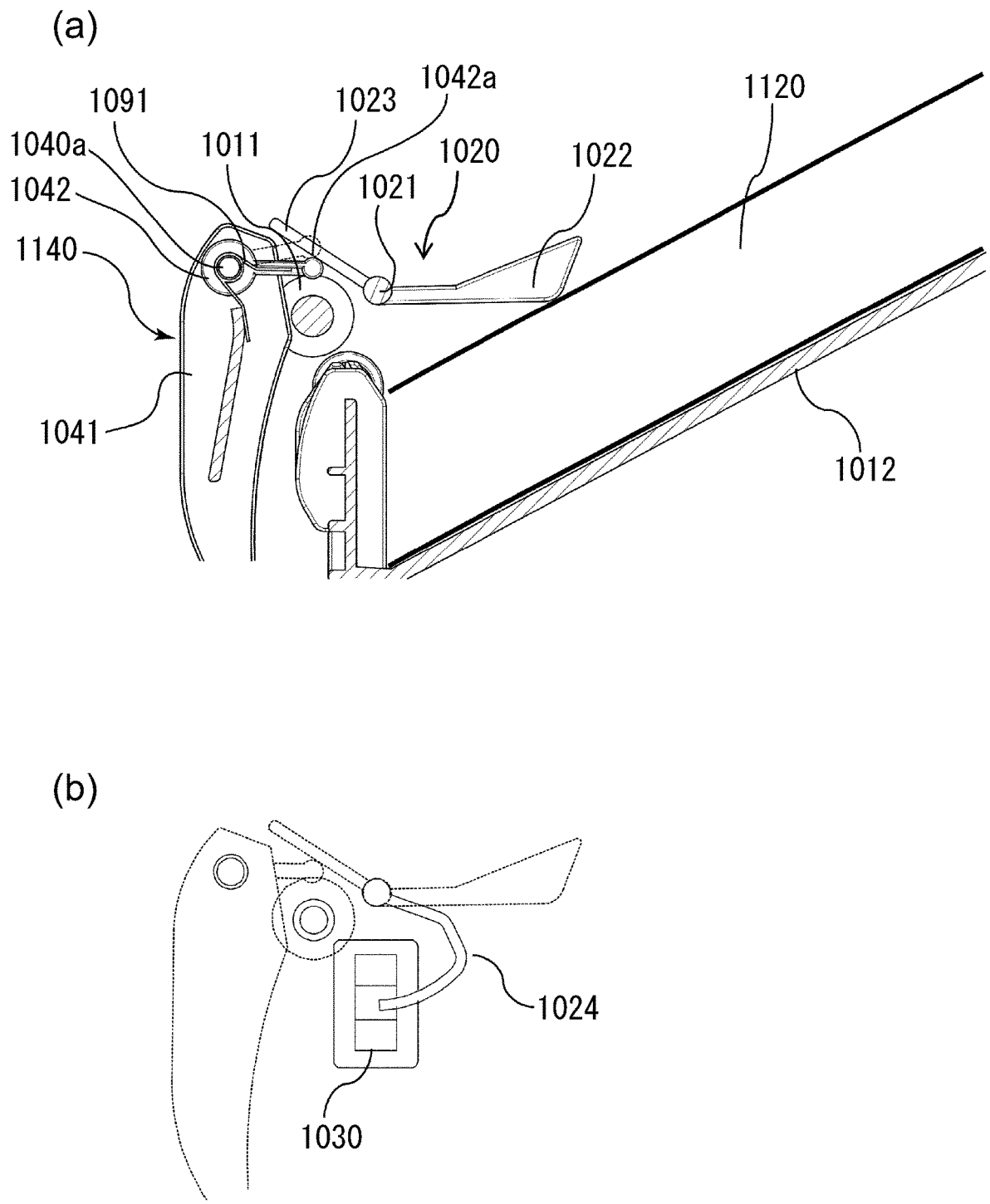

Part (a) of FIG. 27 is a sectional view showing a state in which a pressed portion is pressed by a pressing portion in a state in which the stacked sheets are not curled, and part (b) of FIG. 27 is a sectional view showing the sensor.

DESCRIPTION OF THE EMBODIMENTS

In the following, embodiments according to the present invention will be described while making reference to the drawings.

Embodiment 1

Figure 1:
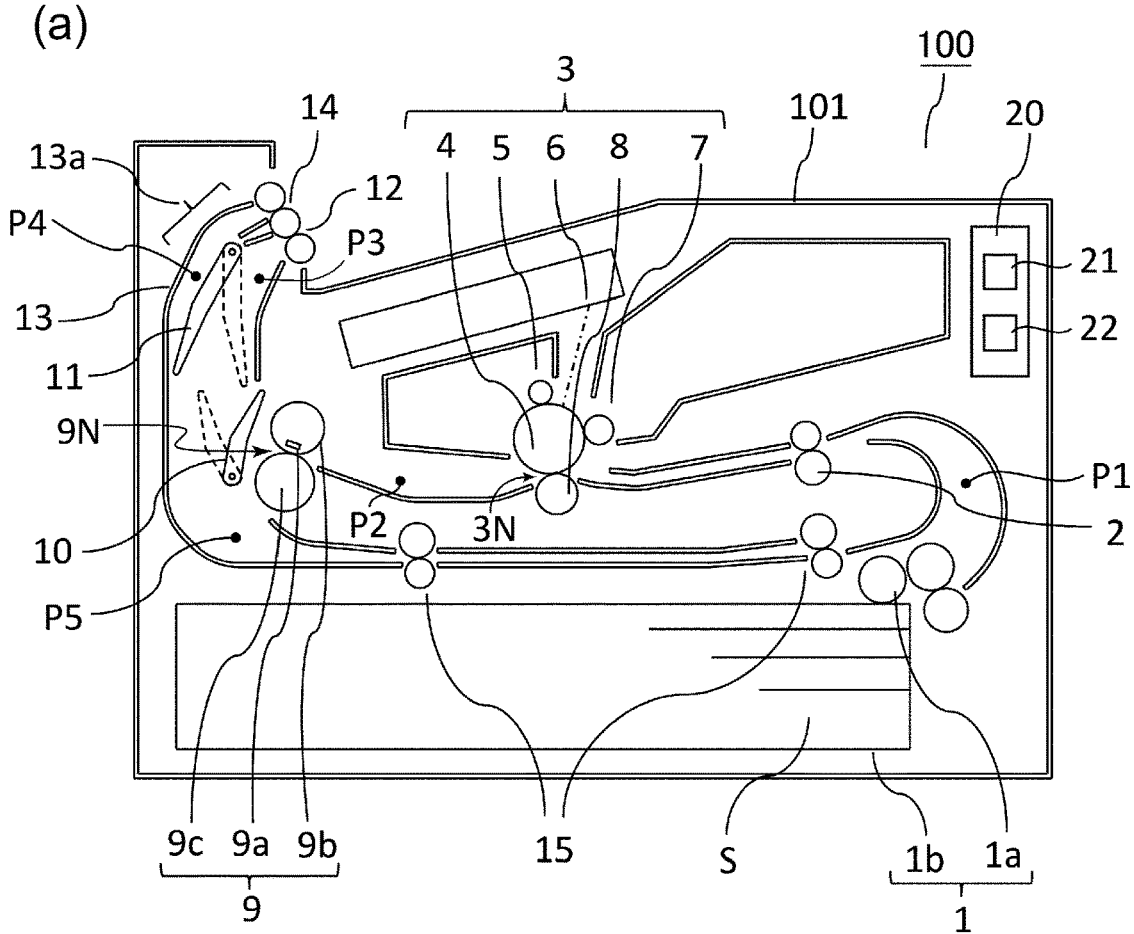
Figure 1:
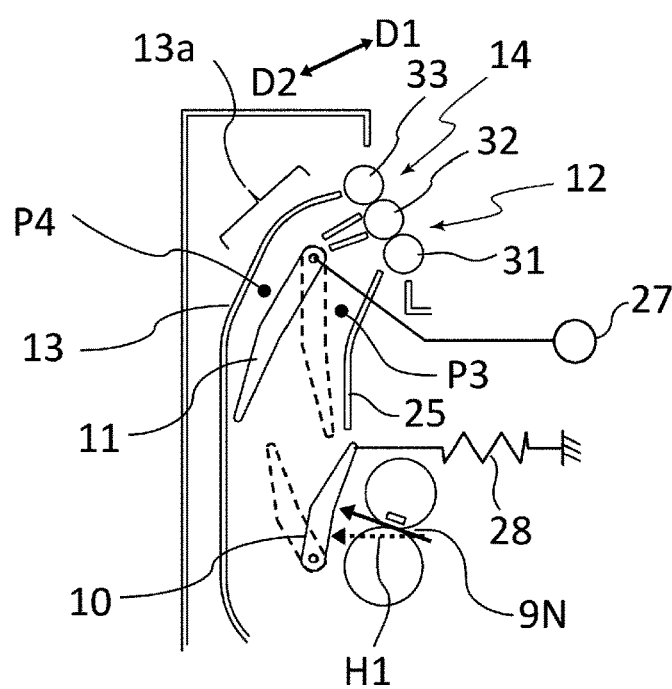

A constitution of an image forming apparatus according to the embodiment 1 will be described. Part (a) of FIG. 1 is a sectional view of an image forming apparatus 100 according to the embodiment 1. Part (b) of FIG. 1 is an enlarged view in which a portion of part (a) of FIG. 1 is enlarged.

The image forming apparatus 100 performs an image forming operation (printing operation) for forming an image on a sheet S which is a recording medium. As the sheet S, various sheets different in size and material, including paper such as plain paper and thick paper; a plastic film; a cloth; a surface-treated sheet such as coated paper; special-shaped sheets such as an envelope and index paper; and the like are usable. The image forming apparatus 100 is not limited to a single-function printer for performing only a printing operation, but may also be a copying machine for performing a copying operation or a multi-function machine having a plurality of functions.

As shown in part (a) of FIG. 1, the image forming apparatus 100 includes a feeding portion 1, a conveying portion 2, an image forming portion 3, a fixing portion 9, a backflow preventing flap 10, a switching flap 11, a discharging portion 12, a reversing portion 14, a re-feeding portion 15, and a controller 20.

Further, a casing 101 of the image forming apparatus 100 accommodates the image forming portion 3 and the fixing portion 9 and is provided with, as conveyance passages of the sheet S, a feeding path P1, an image forming path P2, a discharging path P3, a reversing path P4, and a re-feeding path P5. The feeding path P1 is a conveyance passage from the feeding portion 1 to the conveying portion 2. The image forming path P2 is a conveyance passage from the conveying portion 2 to the fixing portion 9 via a transfer portion 3N of the image forming portion 3. The discharging path P3 is a conveyance passage which ranges from the fixing portion 9 to an outside of the image forming apparatus 100 (outside of the casing 101 accommodating the image forming portion 3 and the fixing portion 9) and in which the discharging portion 12 is provided. The reversing path P4 is a conveyance passage which is branched from the discharging path P3 and then reaches the outside of the image forming apparatus 100 (the outside of the casing 101) and in which the reversing portion 14 is provided. The re-feeding path P5 is a conveyance passage connecting the reversing path P4 and the image forming path P2 with each other.

The feeding portion 1 is an example of a feeding means (feeding unit) for feeding the sheet S (a supplying source for supplying the sheet S). The feeding portion 1 in this embodiment includes a cassette 1b (accommodating portion, sheet stacking portion) for stacking the sheet(s) S in a stacked state, and a feeding unit 1a for feeding the sheets S one by one from the cassette 1b. The feeding unit 1a is constituted by, for example, a pick-up roller (feeding roller) for feeding the sheet S from the cassette 1b and a separation roller pair for feeding the sheets S, sent from the picking-up roller, one by one which separating the sheets S. The sheet S fed by the feeding unit 1a is conveyed to the conveying portion 2 via the feeding path P1.

The conveying portion 2 is an example of a conveying means (conveying unit) for conveying the sheet S toward the image forming portion 3. As the conveying portion 2, it is possible to use, for example, a roller pair for conveying the sheet S by being rotated while nipping the sheet S and a belt for conveying the sheet S by being rotationally driven in a state in which the belt attracts the sheet S.

The image forming portion 3 is an example of an image forming means (image forming unit) for forming an image (toner image) on the sheet S. The image forming portion 3 in this embodiment is an electrophotographic unit of a direct transfer type. That is, the image forming portion includes a photosensitive drum 4 as an image bearing member, a charging roller 5 as a charging means (charging unit), a laser scanner 6 as an exposure means (exposure unit), a developing roller 7 as a developing means (developing unit), and a transfer roller 8 as a transfer means (transfer unit). As a nip between the photosensitive drum 4 and the transfer roller 8, the transfer portion 3N where formation of the image (transfer of the toner image) on the sheet S is constituted.

The fixing portion 9 is an example of a fixing means (heating means, fixing device, fixing unit) of a heat-fixing type in which the image on the sheet S is fixed on the sheet S by heating the sheet S. The fixing portion 9 includes, as a heating source (heat generating portion) for heating the sheet S and the image on the sheet S, a heater 9a on which, for example, a pattern of a heat generating resistor is formed on a substrate made of ceramic. The fixing portion 9 further includes a cylindrical fixing film (first member, heating member) 9b in which the heater 9a is disposed and a pressing roller 9c (second member, pressing member) press-contacted to the heater 9a while nipping the fixing film 9b therebetween. The fixing film 9b and the pressing roller 9c are disposed so that a fixing nip 9N where the sheet S and the image on the sheet S are heated is formed between the fixing film 9b and the pressing roller 9c.

Incidentally, the heating source (heat generating portion) of the fixing portion 9 is not limited to the heater 9a, but may also be, for example, a halogen lamp for emitting radiant heat or an induction heating mechanism for causing the fixing film 9b to generate heat by induction heating. Further, in place of an endless fixing member such as the fixing film 9b, for example, a cylindrical fixing roller may also be used.

The discharging portion 12 is an example of a discharging means (discharging unit) for discharging the sheet S to the outside of the image forming apparatus 100 (the outside of the casing 101). The discharging portion 12 is disposed in the discharging path P3. Incidentally, on an upper surface of the casing 101, a stacking portion (discharge tray) on which the sheets S discharged by the discharging portion 12 to the outside of the image forming apparatus 100 (the outside of the casing 101) are stacked is provided.

The reversing portion 14 is an example of a reversing means (reversing unit) for reversing and conveying the sheet S in the reversing path P4 so that the sheet S passed through the fixing portion 9 and conveyed to the reversing path P4 is conveyed toward the image forming portion 3 again. The "reverse conveyance" means that in order to switch a first side (surface) and a second side (surface) of the sheet S to each other, the sheet S is fed in a first direction of the conveyance passage and then is fed in a second direction opposite to the first direction (switch-back conveyance). Incidentally, in this embodiment, the "first side" represents a side (surface) of the sheet onto which the image is transferred in one-side printing and represents a side (surface) of the sheet onto which the image is first transferred in double-side printing. Further, the "second side" represents a side (surface) of the sheet onto which the image is second transferred in the double-side printing.

As shown in part (b) of FIG. 1, the discharging portion 12 and the reversing portion 14 in this embodiment are formed by three rollers. That is, the discharging portion 12 is formed by a discharging roller 31 (first roller) and an intermediary roller 32 (second roller) for conveying the sheet S while nipping the sheet S in cooperation with the discharging roller 31. A nip formed by the discharging roller 31 and the intermediary roller 32 is referred to as a discharging nip. The reversing portion 14 is formed by the intermediary roller 32 (second roller) and a reversing roller 33 (third roller) for conveying while nipping the sheet S in cooperation with the intermediary roller 32. A nip formed by the intermediary roller 32 and the reversing roller 33 is referred to as a reversing nip.

The re-feeding portion 15 is a conveying means (conveying unit, double-side conveying unit) for conveying (re-feeding) the sheet S so that the sheet S reversed and conveyed by the reversing portion 14 is supplied again to the image forming portion 3.

The switching flap 11 is an example of a switching member (first movable guide) for switching the conveyance passage of the sheet S passed through the fixing portion 9. The switching flap 11 is constituted so as to be movable to a first position (a solid-line position of part (b) of FIG. 1) and a second position (a broken-line position of part (b) of FIG. 1). The first position is a position where the switching flap 11 guides the sheet S, passed through the fixing portion 9, toward the discharging portion 12 via the discharging path P3. The switching flap 11 is moved to the first position and the second position by being driven by a driving source 27 such as a motor or a solenoid. By the switching flap 11, a branch point where the reversing path P4 branches from the discharging path P3. In this embodiment, a length from the fixing portion 9 to the branch point is shorter than a distance from an exit (position where the discharging path P3 is connected to an outside of the casing 101) of the discharging path P3. Further, the length from the fixing portion 9 to the branch point is shorter than a distance from an exit (position where the reversing path 4 is connected to the outside of the casing 101) of the reversing path P4. The reversing path P4 is disposed so that a leading end of the sheet S enters to the reversing path P4 before a trailing end of the sheet S passes through the fixing portion 9.

The backflow preventing flap 10 is a second movable guide for guiding the sheet S, reversed and conveyed by the reversing portion 14, to the re-feeding path P5 and for restricting backflow of the sheet S from the reversing path P4 to the discharging path P3. The backflow preventing flap 10 is provided on a side downstream of the fixing portion 9 and upstream of the switching flap 11 with respect to a conveying direction of the sheet (sheet conveying direction) in the discharging path P3. The backflow preventing flap 10 is movable to a restricting position (solid-line position of part (b) of FIG. 1) where the backflow preventing flap 10 closes or narrows the discharging path P3 so as to restrict the backflow of the sheet S from the reversing path P4 to the discharging path P3 and a permitting position (broken-line position of part (b) of FIG. 1) where the backflow preventing flap 10 pens the discharging path P3. The permitting position can be said as a position where passing of the sheet S, passed through the fixing portion 9, through this position, and is a third position in this embodiment. The restricting position can be said as a position where the backflow preventing flap 10 enters (projects) to the discharging path P3, and is a fourth position in this embodiment.

The backflow preventing flap 10 is urged toward the restricting position (fourth position) by an urging means (urging unit) such as a spring 28, and is constituted so as to be kept in the restricting position when the sheet S does not pass through the restricting position. Further, when the sheet S passes through the restricting position, the backflow preventing flap 10 is constituted so as to be moved from the restricting position to the permitting position against an urging force of the urging means. Incidentally, a driving source for moving the backflow preventing flap 10 to the restricting position and the permitting position may also be provided.

As shown in part (b) of FIG. 1, the reversing path P4 in this embodiment is formed by the reversing guide 13 and the switching flap 11 positioned on a side opposite from the reversing guide while sandwiching a passing space of the sheet S therebetween. The reversing guide 13 is a guiding member for guiding the sheet S fed by the reversing portion 14. The discharging path P3 is formed by a discharging guide 25, and the backflow preventing flap 10 and the switching flap 11 which are positioned on a side opposite from the discharging guide 25 while sandwiching a passing space of the sheet therebetween.

The controller 20 (part (a) of FIG. 1) includes a CPU (processing device) 21 for executing a program, a storing portion 22 in which the program and data or the like necessary to execute the program. The CPU 21 controls an operation (sheet passing operation described later or the like operation) of the image forming apparatus 100 by executing the program read from the storing portion 22. The storing portion 22 is an example of a non-transient storing medium readable by a computer.

For example, in the case where the controller 20 receives a print instruction (execution instruction of image formation) from an external information processing device, the controller 20 starts a print job (image forming job) for forming an image on the sheet S on the basis of image information received together with the print instruction. The print job is a series of tasks in which the image is formed on each of sheets S and then the sheets S each on which the image is formed are discharged to the outside of the image forming apparatus 100. The controller 20 executes a one-side printing job (one-side image forming job for forming the image on one side (surface) of each sheet S and a double-side printing job (double-side image forming job) for forming images on double sides (surfaces) of each sheet S.

In the following, a basic sheet passing operation performed by the image forming apparatus 100 will be described. The "sheet passing operation" in this embodiment refers to a series of operations from supply of a single sheet S from the feeding means until the sheet S is finally discharged on an external stacked portion (outside of the casing 101) of the image forming apparatus 100.

The printing job includes at least one sheet passing operation. The image forming apparatus 100 of this embodiment is, as described later, capable of executing a one-side sheet passing operation (first operation, part (a) of FIG. 12), a sheet passing operation in a water droplet removing mode (second operation, part (c) of FIG. 12), and a double-side sheet passing operation (third operation, part (b) of FIG. 12).

The controller 20 basically executes the one-side sheet passing operation repetitively for each of the sheets S in the one-side printing job, and executes the double-side sheet passing operation repetitively for each of the sheets S in the double-side printing job. As described later, in this embodiment, during execution of the one-side printing job, the sheet passing on the water droplet removing mode (second operation) is executed in some cases.

Incidentally, a printing job in which a plurality of sheets S are objects (object sheets) includes the sheet passing operation in the same number of times as the number of the object sheets. The sheet passing operation of a certain sheet and the sheet passing operation of a subsequent sheet (sheet subsequent to the certain sheet in a feeding order of the sheets S from the feeding portion 1) may overlap with each other on a time axis.

One-Side Sheet Passing Operation

First, the one-side sheet passing operation (first operation) will be described along part (a) of FIG. 12 while making reference to part (a) of FIG. 1. Part (a) of FIG. 12 is a flow chart showing control of the one-side sheet passing operation. Incidentally, respective steps of flow charts in parts (a) to (c) of FIG. 12 and other figures are performed in such a manner that the CPU 21 of the controller 20 executes the above-described program and controls a motor or the like for driving the respective portions of the image forming apparatus as needed unless otherwise specified.

First, an uppermost sheet S of a sheet bundle accommodated in the cassette 1*b* is fed by the feeding unit 1*a* of the feeding portion 1 (S121). The fed sheet S is conveyed to the transfer portion N3 by the conveying portion 2.

The image forming portion 3 transfers an image (toner image) onto the sheet S by an image forming process of an electrophotographic type in parallel to conveyance of the sheet S (S122). That is, the surface of the rotating photosensitive drum 4 is first electrically charged by the charging roller 5 and then is exposed to laser light irradiated from the laser scanner 6. By this, an electrostatic latent image depending on the image information is formed on the surface of the photosensitive drum 4. Then, the developing roller 7 supplies toner as a developer to the photosensitive drum 4, so that the electrostatic latent image is developed into the toner image. The toner image carried on the photosensitive drum 4 is transferred onto the sheet S, sent from the conveying portion 2, by the transfer roller 8 in the transfer portion N3. The sheet S passed through the transfer portion 3N is fed to the fixing portion 9. The fixing portion 9 fixes the image on the sheet S by heating and pressing the sheet S while conveying the sheet S (S123).

The fixing portion 9 in this embodiment heats the toner image on the sheet S by the fixing film 9*b* heated by heat (non-radiant heat) of the heater 9*a* while nipping and conveying the sheet S between the fixing film 9*b* and the pressing roller 9*c* in the fixing nip 9N. By this, an image fixed on the sheet S can be obtained.

The sheet S passed through the fixing portion 9 is fed to the discharging portion 12 via the discharging path P3, and is discharged to the outside of the image forming apparatus 100 (outside of the casing 101) by the discharging portion 12 (S124). Specifically, the sheet S passed through the fixing portion 9 passes through the backflow preventing flap 10 while pressing the backflow preventing flap 10 from the restricting position to the permitting position. When a trailing end of the sheet S (an upstream end of the sheet S with respect to the sheet conveying direction) passes through a free end of the backflow preventing flap 10, the backflow preventing flap 10 returns to the restricting position. Further, the sheet S is guided to the discharging path P3 by the switching flap 11 positioned in the first position (solid-line position of part (a) of FIG. 1) in advance. In other words, in the case of the one-side sheet passing operation, the position of the switching flap 11 is set in the first position.

Double-Side Sheet Passing Operation

Next, the double-side sheet passing operation (third operation) will be described along part (b) of FIG. 12 while making reference to FIG. 2. Part (b) of FIG. 12 is a flow chart showing control of the double-side sheet passing operation. However, details of the image forming process by the image forming portion 3 and the fixing portion 9 are similar to those in the one-side sheet passing operation, and therefore, will be omitted from description.

First, an uppermost sheet S of a sheet bundle accommodated in the cassette 1*b* is fed by the feeding unit 1*a* of the feeding portion 1 (S131). The fed sheet S is conveyed to the transfer portion N3 by the conveying portion 2.

The image forming portion 3 prepares a toner image for being transferred onto a first side (surface) of the sheet S and transfers, in the transfer portion 3N, the toner image onto the first side of the sheet S sent from the conveying portion 3N (S132). The sheet S passed through the transfer portion N3 is fed to the fixing portion 9 and is subjected to fixing of the image on the first side thereof by the fixing portion (S133).

The sheet S passed through the fixing portion 9 is guided to the reversing path P4 by the switching flap 11, and is reversed and conveyed by the reversing portion 14 (S134). Specifically, the sheet S passed through the fixing portion 9 passes through the backflow preventing flap 10 while pressing the backflow preventing flap 10 from the restricting position to the permitting position. When the trailing end of the sheet S passes through a free end of the backflow preventing flap 10, the backflow preventing flap 10 returns to the restricting position. Further, the sheet S is guided from the discharging path P3 to the reversing path P4 by the switching flap 11 positioned in the second position (broken-line position of part (a) of FIG. 1) in advance.

The reversing portion 14 carries out reverse conveyance (switch-back conveyance) such that the sheet S is fed in the first direction toward the outside of the casing 101 and thereafter is conveyed in the second direction D2 before the trailing end of the sheet S passes through the reversing nip. Specifically, the reversing portion 14 conveys the sheet S in the first direction D1 so that a part of the sheet S projects to the outside of the image forming apparatus 100 (outside of the casing 101). Thereafter, the reversing portion 14 conveys the sheet S in the second direction D2. The reversed and conveyed sheet S is restricted in entrance into the discharging path P3 by the backflow preventing flap 10 returned to the restricting position, and is sent to the re-feeding path P5. Then, the sheet S is re-fed to the conveying portion 2 by the re-feeding portion 15. Here, the reverse conveyance by the reversing portion 14 is carried out, so that the first side and the second side of the sheet S are replaced with each other between when the sheet S is first fed from the feeding portion 1 to the conveying portion 2 (S131) and when the same sheet S is re-fed to the conveying portion 2. The sheet S re-fed to the conveying portion 2 is conveyed to the transfer portion 3N by the conveying portion 2.

The image forming portion 3 prepares a toner image for being transferred onto the second side of the sheet S and transfers, in the transfer portion 3N, the toner image onto the second side of the sheet S sent from the conveying portion 3N (S135). The sheet S passed through the transfer portion N3 is fed to the fixing portion 9 and is subjected to fixing of the image on the second side thereof by the fixing portion (S136).

The sheet S passed through the fixing portion 9 is fed to the discharging portion 12 via the discharging path P3, and is discharged to the outside of the image forming apparatus 100 by the discharging portion 12 (S137). Specifically, the sheet S passed through the fixing portion 9 passes through the backflow preventing flap 10 while pressing the backflow preventing flap 10 from the restricting position to the permitting position. When a trailing end of the sheet S passes through a free end of the backflow preventing flap 10, the backflow preventing flap 10 returns to the restricting position. Further, the sheet S is guided to the discharging path P3 by the switching flap 11 positioned in the first position (solid-line position of part (a) of FIG. 1) in advance. In other words, in the case of the double-side sheet passing operation, the position of the switching flap 11 is set in the first position before a leading end (upstream end with respect to the sheet conveying direction) of the sheet S on which the image is formed on the second side thereof reaches the switching flap 11.

Double-Side Printing Job

Next, positions of the respective sheets S and an order of image formation in the double-side printing job will be described using parts (a) to (f) of FIG. 2. Parts (a) to (e) of FIG. 2 are schematic views each showing a sheet position in the double-side printing job. Sheets S1, S2, and S3 in these figures, are a first sheet, a second sheet, and a third sheet, respectively. of the sheets S subjected to the image formation by the double-side printing job, in a feeding order of the sheets S from the feeding portion 1. Incidentally, in parts (a) to (e) of FIG. 2, reference numerals or symbols will be partially omitted. Part (f) of FIG. 2 is a conceptual diagram showing the order of image formation in the double-side printing job.

Figure 2:
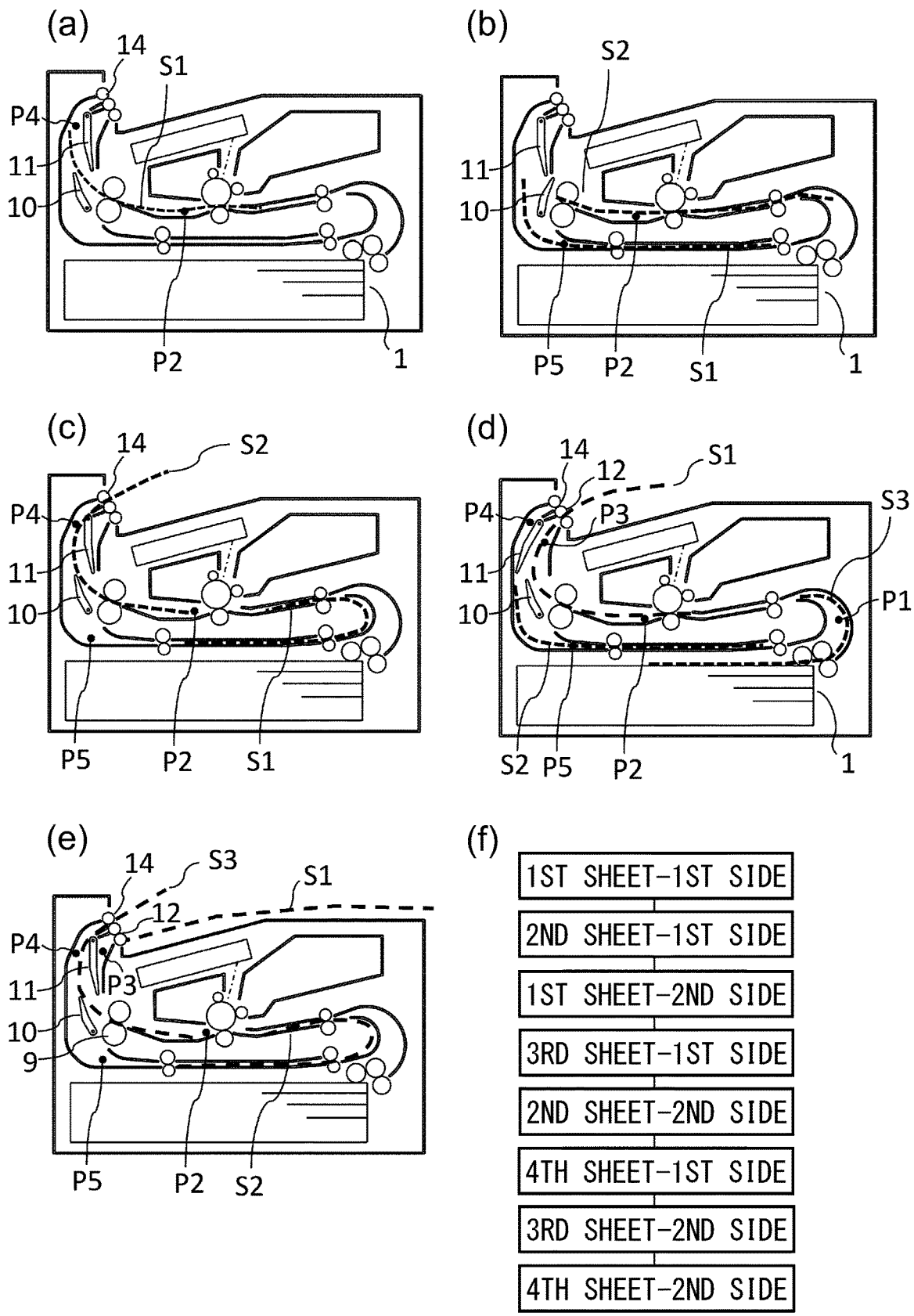

First, as shown in part (a) of FIG. 2, the first sheet S1 is fed from the feeding portion 1, and the image is transferred and fixed on a first side of the sheet S1 during feeding of the sheet S1 through the image forming path P2. Then, the sheet S1 is fed to the reversing path P4 and is reversed and conveyed by the reversing portion 14. That is, the switching flap 11 is set in the second position (position of part (a) of FIG. 2) until a leading end of the sheet S1 reaches the switching flap 11.

As shown in part (b) of FIG. 2, the first sheet S1 reversed and conveyed by the reversing portion 14 is re-fed through the conveying portion 2 by the re-feeding portion 15. In parallel to the reverse conveyance and re-feeding of the first sheet S1, the second sheet S2 is fed from the feeding portion 1, and the image is transferred and fixed on the first side of the sheet S2.

As shown in part (c) of FIG. 2, the image is transferred and fixed on a second side of the sheet 1 during conveyance of the first sheet S1 subsequent to the second sheet S2 through the image forming path P2. Further, the second sheet S2 passed through the fixing portion 9 is fed to the reversing path P4.

As shown in part (d) of FIG. 2, the first sheet S1 passed through the fixing portion 9 passes through the discharging path P3 and is discharged to the outside of the image forming apparatus by the discharging portion 12. Here, the switching flap 11 is moved from the second position to the first position (position of part (d) of FIG. 2) in a period from sending of the second sheet S2, on which the image is formed on the first side thereof, to the reversing path P3 until a leading end of the first sheet S1 on which the image is formed on the second side reaches the switching flap 11. The sheet S1 is discharged by the discharging portion 12, whereby the double-side sheet passing operation for the first sheet S1 is completed.

Further, as shown in part (d) of FIG. 2, the second sheet S2 fed to the reversing path P4 is reversed and conveyed by the reversing portion 14. In parallel to the reverse conveyance and the re-feeding of the second sheet S2, the third sheet S3 is fed from the feeding portion 1, and the image is transferred and fixed on a first side of the sheet S3 during conveyance of the sheet S3 through the image forming path P2.

As shown in part (e) of FIG. 2, the image is transferred and fixed on a second side of the second sheet S2 during conveyance of the second sheet S2 subsequent to the third sheet S3 through the image forming path P2. Further, the third sheet S3 passed through the fixing portion 9 is fed to the reversing path P4. That is, the switching flap 11 is moved from the first position to the second position (position of part (e) of FIG. 2) in a period from sending of the first sheet S1, on which the image is formed on the second side thereof, to the discharging path P3 until a leading end of the third sheet S3 on which the image is formed on the first side thereof.

Here, a positional relationship between the second sheet S2 (certain sheet) and the third sheet S3 (subsequent sheet to the second sheet S2) in part (e) of FIG. 2 is similar to a positional relationship between the first sheet S2 (certain sheet) and the second sheet S2 (subsequent sheet to the first sheet S1). For that reason, in part (e) of FIG. 2 and later, the same operation as the operation of parts (c) to (e) of FIG. 2 in which the sheets S1, S2 and S3 are replaced with a certain sheet, a subsequent sheet to the certain sheet, and a sheet subsequent to the subsequent sheet, respectively, is repeated. Further, the position of the switching flap 11 is switched between the first position and the second position for each sheet except for a first operation and a final operation of the double-side printing job. By this, the image forming apparatus 100 is capable of forming images on the first side and the second side of each sheet while continuously conveying a plurality of sheets.

Part (f) of FIG. 2 shows an order of image formation (sheets and sheet sides onto which images are transferred in the transfer portion N3) in the double-side printing job in which a designated number of sheets is four (sheets). As described above using parts (a) and (b) of FIG. 2, in the double-side printing job, first, in an order of feeding, images are continuously formed on the first side of the first sheet S1 and the first side of the second sheet S2. Thereafter, image formation for the first side and image formation for the second side are alternately repeated as an order of the second side of N-th sheet, the first side of (N+2)-th sheet, the second side of (N+1)-th sheet, the second side of (N+2)-th side, . . . . As regards the final two sheets (the third sheet S3 and a fourth sheet S4 in part (f) of FIG. 2) in the double-side printing job, the image formation for the second side is continuously carried out two times.

As described above, in the double-side printing job, the plurality of sheets are simultaneously fed inside the image forming apparatus 100, so that productivity of the image forming apparatus 100 can be improved. That is, compared with a type in which the double-side sheet passing operation of the subsequent sheet is started after the double-side sheet passing operation of the certain sheet is completed, the double-side sheet passing operation for each of the sheets is simultaneously progressed, so that a discharge interval of print products can be shortened.

Further, in this embodiment, by providing the reversing path P4 for reversing and conveying the sheet separately from the discharging path P3 for discharging the sheet, the productivity of the double-side printing job is further improved. That is, for example, in a constitution in which the discharging path P3 also functions as the reversing path for performing the reverse conveyance, the subsequent sheet cannot be discharged during the reverse conveyance of the certain sheet through the discharging path P3, and therefore, a sheet conveyance interval cannot help being made long. On the other hand, in this embodiment, in parallel to the reverse conveyance of the sheet through the reversing path P4, an operation for discharging another through via the discharging path P3 (so-called passing-each-other conveyance) can be performed, so that the sheet conveying interval can be narrowed. That is, in the double-side printing job, a period in which the first sheet is reversed and conveyed in a second conveyance passage (reversing path P4) and a period in which the leading end of the second sheet passed through the fixing means passes through a first conveyance passage (discharging path P3) and is fed to the discharging means can be made overlap with each other.

In parts (a) to (f) of FIG. 2, as an example of sheet circulation control in the double-side printing job, a form such that the images are continuously formed on the first sides of the first two sheets, and then the images are alternately formed on the second side and the first side of the sheets, and then the images are continuously formed on the second sides of the final two sheets was described. The sheet circulation control in the double-side printing job is not limited thereto, but is also changeable depending on a specific constitution of the image forming apparatus 100 such as the image forming path P2 and the re-feeding path P5 or depending on a length of the sheet in the conveying direction. For example, in the case where the re-feeding path P5 is long, the productivity is capable of being improved in some instances by a type in which the images are continuously formed on the first sides of the first three sheets, and then the images are alternately formed on the second side and the first side of the sheets, and then the images are continuously formed on the second sides of the final three sheets.

Dew Condensation During One-Side Printing

Here, an image defect which can occur in the case where the double-side printing job is executed after execution of the one-side printing job will be described. During the execution of the one-side printing job, the sheet S is heated in the fixing portion 9. By this, moisture in the sheet is evaporated, so that water vapor is generated. This water vapor is deposited on a guide or the like forming the sheet conveyance passage, so that dew condensation occurs in some cases.

In the case where the dew condensation occurs in the image forming path P2 or the discharging path P3, a water droplet is removed by the sheet S passing through these sheets by the one-side sheet passing operation, so that the image defect or the like does not occur. However, in the paths such as the reversing path P4 or the re-feeding path P5, through which the sheet S does not pass in the one-side sheet passing operation, the water droplet grows large in some instances during the execution of the one-side printing job.

After an end of the one-side printing job, when the double-side printing job is started in a state in which a large water droplet is deposited on the guide of the reversing path P4 or the re-feeding path P5, the sheet S is wetted by absorbing the water droplet during passing thereof through the reversing path P4 and the re-feeding path P5. When the wetted sheet S is fed to the transfer portion 3N, the sheet S wets the surface of the photosensitive drum 4 or wets the surface of the charging roller 5 via the photosensitive drum 4, and thus changes a characteristic of the photosensitive drum 4 or the charging roller 5, so that there is a possibility of causing the image defect. For example, when the double-side printing job is executed after the one-side printing job is executed for sheets in a large amount of 100 sheets or more, the first sheet in the double-side printing job is liable to cause the above-described image defect. Further, at a wetted portion of the sheet, friction coefficient between itself and the conveying roller fluctuates or the like, so that there is also a possibility that improper conveyance such as oblique movement or jamming of the sheet occurs.

Therefore, in this embodiment, during the execution of the one-side printing job for forming the image on one side of each of a plurality of sheets S, a predetermined sheet is subjected to execution of an operation in a water droplet removing mode described later as a sheet passing operation different from a normal sheet passing operation.

Incidentally, in this embodiment, there is a situation such that dew condensation is liable to occur on the reversing guide 13 constituting the reversing path P4 as described below. For that reason, a possibility that the influence of the dew concentration of the reversing guide 13 is visualized can be effectively reduced by the operation in the water droplet removing mode. However, the technique in the present invention is also useful in a member other than the reversing guide 13 in this embodiment.

First, the water vapor generated by heating the sheet S by the fixing portion 9 is warmer than ambient air, and is circulated upward by convection, and thus is liable to be deposited on the guide positioned above the fixing nip 9N of the fixing portion 9. For example, in the case where at least a part of the reversing guide 13 is positioned above the fixing nip 9N with respect to a vertical direction (direction of gravitation), the dew condensation is liable to occur at a portion of the reversing guide 13 positioned above the fixing nip 9N. In the case of the image forming apparatus 100 of this embodiment, entirety of the reversing guide 13 is positioned above the fixing nip 9N, so that the dew condensation can occur during the one-side printing job.

Further, in this embodiment, a horizontal component H1 (a leftward component in part (a) of FIG. 1) of the sheet conveying direction in the fixing nip 9N is opposite in direction to a horizontal component (rightward component in part (a) of FIG. 1) of a conveying direction (D1) in which the sheet is fed toward the outside of the casing 101 by the reversing portion 14. Incidentally, a point of view in part (a) of FIG. 1 is a sheet widthwise direction perpendicular to the sheet conveying direction in the fixing nip 9N.

Here, at least a part (all in an example of part (a) of FIG. 1) of the reversing guide 13 is positioned above the fixing nip 9N and on a side downstream of the fixing nip 9N with respect to the horizontal component H1 of the sheet conveying direction in the fixing nip 9N. Further, an upper portion 13a of the reversing guide 13 is inclined (overhung) so as to extend from a downstream side toward an upstream side of the horizontal component H1 upward with respect to the vertical direction.

By such a shape of the reversing guide 13, the sheet S sent from the fixing nip 9N can be smoothly guided toward the reversing portion 14. On the other hand, the upper portion 13a of the reversing guide 13 is in a position where the upper portion 13a covers the fixing portion 9 or in a positional relationship close thereto, and therefore, the dew condensation during the one-side printing job is liable to occur at the upper portion 13a of the reversing guide 13.

Further, in this embodiment, at a branch portion from the discharging path P3 to the reversing path P4, two movable members (movable guides) consisting of the switching flap 11 and the backflow preventing flap 10 are disposed. In order to avoid mutual interference, it is desired that a certain gap (clearance) is set between the switching flap 11 and the backflow preventing flap 10. It becomes possible that the water vapor can enter the reversing path P4 from the discharging path P3, and therefore, the dew condensation during the one-side printing job is liable to occur.

Control of One-Side Printing Job in Embodiment 1

Figure 3:
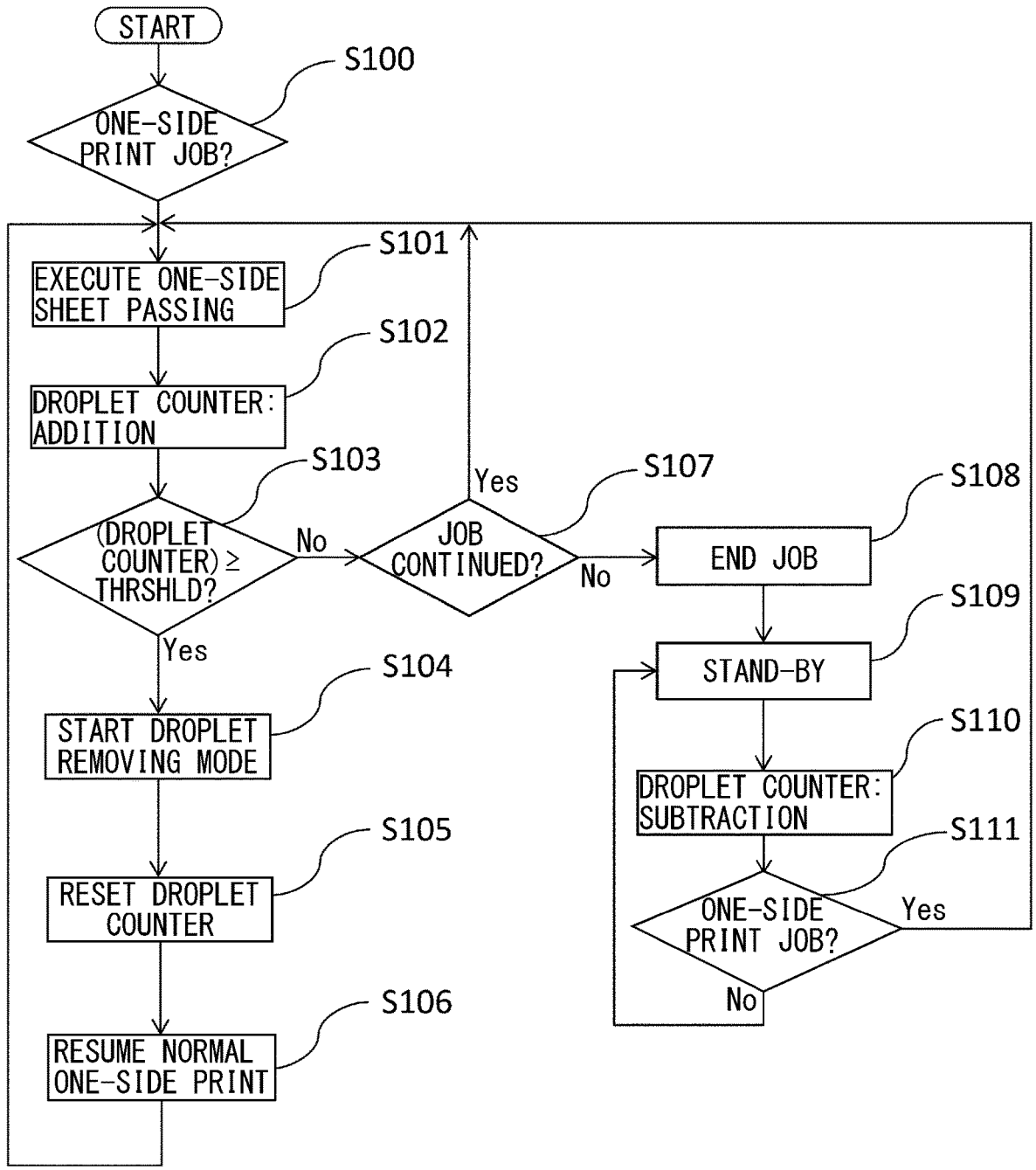
FIG. 3 is a flow chart showing control of a one-side printing job in the embodiment 1.

In the following, a control method of the one-side printing job in the embodiment 1 will be described using FIGS. 3 and 4. FIG. 3 is a flow chart showing a control example of the one-side printing job. Parts (a) to (e) of FIG. 4 are schematic views showing sheet positions and an order of image formation in the one-side printing job. The controller 20 continuously executes the flow of FIG. 3 in a period in which a main power source of the image forming apparatus 100 is turned on, for example.

First, using FIG. 3, the flow of the one-side printing job for forming the image on one side of each of the plurality of sheets S will be described. The controller 20 estimates whether or not the water droplet generates on the reversing guide 13 by using a water droplet counter C of which value is a variable increasing depending on the number of times of execution of the one-side sheet passing operation (the number of printed sheets), and determines whether or not an operation for removing the water droplet (operation in the water droplet removing mode) should be executed.

In the case where the value of the water droplet counter C is large, there is a high possibility that the dew condensation occurs on the reversing guide 13, and in the case where the value of the water droplet counter C is small, there is a high possibility that the dew condensation is small is amount or does not occur. An initial value of the water droplet counter C is 0, for example. Further, a threshold of the water droplet counter C is 49, for example.

When the one-side printing job is inputted (S100) and then the one-side sheet passing operation is executed (S101), 1 is added to the value of the water droplet counter C (S102). In other words, the value of the water droplet counter C is an integrated value obtained by integrating an addition value for each (one) of sheets which are objects (object sheets) of the one-side sheet passing operation (first operation). Further, the addition value in this embodiment is a fixed value (1). The addition value in this embodiment is set in advance, and is stored in a storing portion of the image forming apparatus 100. Incidentally, as described later, the respective addition values may be different from each other depending on an attitude of the sheet S.

When the value of the water droplet counter C before the start of the one-side printing job is C(0) and the value of the water droplet counter C at the time when n times of the one-side sheet passing operation are executed in the one-side printing job is C(n), the C(n) in this embodiment can be represented as follows.

$$C(n)=C(0)+n$$

In the case where the value of the water droplet counter C is less than the threshold (S103: No) and the job is continued, i.e., there is a sheet on which the image is not yet formed (S107: Yes), the normal one-side sheet passing operation (S101) and the addition of a value to the value of the water droplet counter C(S102) are repeated.

On the other hand, in the case where the value of the water droplet counter C is less than the threshold (S103: No) and there is no subsequent sheet on which the image should be formed (S107: No), the job is ended (S108). Thereafter, depending on a waiting time of the image forming apparatus 100, the value of the water droplet counter C is subtracted (S109, S110). The waiting time is an elapsed time from completion of the last one-side printing job until the one-side printing job is subsequently inputted. In the case where the waiting time is sufficiently long, the value of the water droplet counter C is subtracted to 0. Further, in the case where a subsequent job is the double-side printing job, at that time, the value of the water droplet counter C may be reset to 0. When the one-side printing job is inputted (S111: Yes), the sequence is returned to S101, in which the above-described processing is executed.

Here, the value of the water droplet counter C becomes the threshold or more (S103: Yes), the operation in the water droplet removing mode described later is executed (S104). Thereafter, the value of the water droplet counter C is reset to 0 (S105), and in the case where there is a sheet on which the image is not yet formed, the job is resumed by the normal one-side sheet passing operation (S106), and the sequence is returned to S101, and the processing is continued.

When the control using the water droplet counter C is carried out as described above, during the execution of the one-side printing job, the operation in the water droplet removing mode is executed by using a single sheet as an object sheet (predetermined sheet) for each predetermined number of sheets in the order of feeding the sheets. In this embodiment, processing is repeated on a 50-sheets basis in such a manner that 49 sheets are passed through the transfer portion 3N by the one-side sheet passing operation and then a subsequent single sheet is passed through the transfer portion 3N by the operation in the water droplet removing mode.

Water Droplet Removing Mode

Using parts (a) to (e) of FIG. 4 and part (c) of FIG. 12, a sheet passing operation (second operation) in the water droplet removing mode will be described. Parts (a) to (e) of FIG. 4 are schematic views showing positions of the sheets in the operation in the water droplet removing mode. Part (c) of FIG. 12 is a flow chart showing control of the sheet passing operation in the water droplet removing mode.

In the following, in this section, a sheet which is an object of the operation in the water droplet removing mode is referred to as an "object (target) sheet TS". Further, in the order of feeding sheets from the feeding portion 1, a sheet which is one sheet before the object sheet TS is referred to as "sheet TS−1", and a sheet which is one sheet after the object sheet TS is referred to as a "sheet TS+1".

For passing of the sheet TS−1, addition to the water droplet counter C is made (S102 of FIG. 3), and thus when the value of the value of the water droplet counter C becomes the threshold or more (S103: Yes), the sheet subsequent to the sheet TS−1 becomes the object sheet TS. Here, a final sheet S of the one-side printing job becomes the sheet TS−1, and in the case where a subsequent one-side printing job is executed before the value of the water droplet counter C is subtracted (S111 of FIG. 3), a first sheet may be used as the object sheet TS in the feeding order of sheets in the subsequent one-side printing job.

As shown in part (a) of FIG. 4, the image is formed on the sheet TS−1 which is one sheet before the object sheet TS by the normal one-side sheet passing operation (see the flow chart of part (a) of FIG. 12). That is, the sheet TS−1 is fed by the feeding portion 1, and the image is transferred onto a first side thereof in the transfer portion 3N and then is fixed on the first side in the fixing portion 9. Thereafter, the sheet TS−1 is discharged by the discharging portion 12 without being sent to the reversing path P4. Accordingly, in the case where the one-side printing job is executed in a state in which the value of the water droplet counter does not reach the threshold, the normal one-side sheet passing operation is executed for the first sheet in the feeding order, and the control determines the object sheet TS from a second sheet and later in the feeding order.

As shown in part (b) of FIG. 4, the object sheet TS is fed by the feeding portion 1 subsequently to the sheet TS−1 and is conveyed to the transfer portion 3N (S141 of part (c) of FIG. 12). However, the object sheet TS passes through the transfer portion 3N without transfer of the image thereon in the transfer portion 3N (S142 of part (c) of FIG. 12).

As shown in part (c) of FIG. 4, the object sheet TS is sent to the fixing portion 9, and is heated by the fixing portion 9 (S143 of part (c) of FIG. 12). The object sheet TS is supplied with heat from the fixing portion 9, and thus the object sheet TS absorbed the water droplet from the reversing guide 13 becomes easy to be dried as described later.

Incidentally, a temperature of the heater 9a when the object sheet TS on which the image is not formed passes through the fixing portion 9 in the operation in the water droplet removing (preventing) mode may be different from a temperature of the heater 9a when the sheet S passes through the fixing portion 9 in the normal one-side sheet passing operation. The controller 20 is capable of changing electric power supplied to the fixing portion 9 between when the object sheet TS on which the image is not formed passes through the fixing portion 9 in the operation in the water droplet removing mode and when the sheet S passes through the fixing portion 9 in the normal one-side sheet passing operation. In the case where an operator desires to early dry the water droplet on the reversing path P4 by heating the sheet S, it is preferable that the temperature of the heater 9a when the object sheet TS on which the image is not formed passes through the fixing portion 9 in the operation in the water droplet removing mode is higher than the temperature of the heater 9a in the case of the normal one-side sheet passing operation. On the other hand, in the case where the operator desires to reduce an amount of the water vapor from the object sheet TS or in the case where the operator desires the reduce electric power consumption, the temperature of the heater 9a when the object sheet TS on which the image is not formed passes through the fixing portion 9 in the operation in the water droplet removing mode is lower than the temperature of the heater 9a in the case of the normal one-side sheet passing operation.

The object sheet TS passed through the fixing portion 9 is guided to the reversing path P4 by the switching flap 11, and is reversed and conveyed by the reversing portion 14 (S144 of part (c) of FIG. 12). Specifically, the object sheet TS passed through the fixing portion 9 passes through the backflow preventing flap 10 which pressing away the backflow preventing flap 10 from the restricting position to the permitting position. When the trailing end of the object sheet TS passes through a free end of the backflow preventing flap 10, the position of the backflow preventing flap 10 returns to the restricting position. Then, the object sheet TS is guided from the discharging path P3 to the reversing path P4 by the switching flap 11 positioned in the second position (position of part (c) of FIG. 4) in advance.

In other words, the switching flap 11 is held in the first position in the normal one-side sheet passing operation, and on the other hand, in the case where the operation in the water droplet removing mode is executed during execution of the one-side printing job, the switching flap 11 is temporarily moved to the second position. By this, a conveying operation of the object sheet TS described in the following is realized.

The reversing portion 14 carries out reverse conveyance (switch-back conveyance) in which the object sheet TS is fed in the first direction D1 toward the outside of the casing 101 and then is conveyed in the second direction D2 before the trailing end of the object sheet TS passes through the nip. The object sheet TS reversed and conveyed is restricted from entering into the discharging path P3 by the backflow preventing flap 10 returned to the restricting position and then is sent to the re-feeding path P5.

Here, on the reversing guide 13, a slight water droplet is deposited by repetitive execution of the one-side sheet passing operation in some cases. This water droplet is removed from the reversing guide 13 by being adsorbed by the object sheet TS sent to the reversing path P4. By this, growth of the water droplet generated by the dew condensation during the execution of the one-side printing job is suppressed.

As shown in part (c) of FIG. 4, in parallel to the reverse conveyance and the re-feeding of the object sheet TS, feeding of the sheet TS+1 subsequent to the object sheet TS is started. On the sheet TS+1, the image is formed by the normal one-side sheet passing operation (see the flow chart of part (a) of FIG. 12). That is, the sheet TS-1 is fed by the feeding portion 1, and the image is transferred onto the first side thereof in the transfer portion 3N and is fixed thereon in the fixing portion 9. Thereafter, the sheet TS-1 is discharged by the discharging portion 12 without being sent to the reversing path P4 as shown in part (d) of FIG. 4. For that reason, the switching flap 11 is returned from the second position to the first position in a period from sending of the object sheet TS, in the operation in the water droplet removing mode, to the reversing path P4 until the leading end of the subsequent sheet TS+1 reaches the free end of the switching flap 11.

As shown in part (e) of FIG. 4, during conveyance of the object sheet TS through the image forming path P2 subsequently to the sheet TS+1, the image is transferred and fixed on the first side of the object sheet TS (S145 and S146 of part (c) of FIG. 12). Then, the object sheet TS passed through the fixing portion 9 passes through the discharging path P3 and is discharged to the outside of the image forming apparatus 100 by the discharging portion 12 (S147 of part (c) of FIG. 12).

Further, subsequently to the object sheet TS, a sheet TS+2 after the next to the object sheet TS is fed from the feeding portion 1. The image is formed on the sheet TS+2 by the normal one-side sheet passing operation (see the flow chart of part (a) of FIG. 12).

Here, there is a case that the object sheet TS absorbs a slight water droplet deposited on the reversing guide 13, but a water content is small, and therefore, the object sheet TS does not cause an image defect or the like. In other words, the threshold of the water droplet counter C is set at a small value to the extent such that the water droplet does not grow to a degree that the image defect is generated on the object sheet TS in the operation in the water droplet removing mode. On the other hand, the threshold of the water droplet counter C may preferable be a value to a degree that the operation in the water droplet removing mode is excessively executed. Further, by heating the object sheet TS by the fixing portion 9 before sending the object sheet TS to the reversing path P4, vaporization of moisture during conveyance of the object sheet TS absorbed the water droplet through the reversing path P4 and the re-feeding path P5 can be promoted.

There is a case that during execution of a single one-side printing job, the operation in the water droplet removing mode is executed for each of a plurality of sheets. In this case, the normal one-side sheet passing operation is executed at least one time after the execution of the operation in the water droplet removing mode and before execution of an operation in a subsequent water droplet removing mode. That is, in the case where after the operation in the water droplet removing mode is executed for the first sheet, the operation in the subsequent water droplet removing mode is executed for the second sheet different from the first sheet, before the operation in the water droplet removing mode is executed for the second sheet, the normal one-side sheet passing operation is executed for at least one sheet. The number of times of the execution for the normal one-side sheet passing operation after the operation in the water droplet removing mode is executed and before the operation in the subsequent water droplet removing mode is executed may preferably be 5 or more, more preferably be 10 or more.

Advantages of this Embodiment

Thus, the controller 20 executes, during the execution of the one-side printing job, the sheet passing operation (part (c) of FIG. 12) in the water droplet removing mode instead of the normal one-side sheet passing operation (part (a) of FIG. 12) for a predetermined sheet (predetermined sheets) of the second sheet and subsequent sheets in the feeding order.

In other words, the controller (control means, control unit) 20 is constituted so as to execute the first operation and the second operation, executed for the predetermined sheet(s), during the execution of the job for forming the image on one side of each of the plurality of sheets. For the predetermined sheet(s), the control means executes the second operation without executing the first operation. In the first operation, the image forming means forms the image on the sheet fed by the feeding means, and the discharging means discharges the sheet. At this time, the sheet does not pass via the second conveyance passage. On the other hand, in the second operation, the sheet fed by the feeding means and then conveyed to the second conveyance passage after passing through the image forming portion without forming the image on the sheet is reversed and conveyed by the reversing means, and thereafter, the image forming means forms the image on the sheet, and the discharging means discharges the sheet.

By this, during the one-side printing job, it is possible to reduce a possibility that a water droplet in a large amount is deposited on the reversing guide 13. Accordingly, even in the case where the double-side printing job is started immediately after the end of the one-side printing job, it is possible to reduce a possibility that a problem such as the image defect arises for the first sheet in the double-side printing job.

That is, according to this embodiment, it becomes possible to reduce a degree of an occurrence of a harmful effect due to wetting of the sheet.

Further, compared with a comparison constitution in which in the double-side printing job, the image is not formed on the sheet fed first and in which the sheet is sent to the double-side conveyance passage and is caused to absorb the water droplet on the double-side conveyance passage, it is possible to shorten the FPOT of the double-side printing job. By this, a stress exerted on a user (operator) due to a long FPOT is alleviated, so that it is possible to improve usability (user experience).

Further, in the above-described comparison constitution, in the case where the images are formed on a large amount of the sheets in the one-side printing job, moisture in a large amount is deposited on the first sheet of the double-side printing job, so that the image is formed on the first sheet without sufficiently drying the first sheet, and thus there is also a liability that the image defect is caused. On the other hand, according to this embodiment, during execution of the one-side printing job, the operation in the water droplet removing mode is executed at a predetermined frequency, so that the water droplet on the reversing guide 13 is removed by the operation in the water droplet removing mode when the water droplet is slight. By this, in the case where the images are formed on the large amount of the sheets in the one-side printing job, it is possible to prevent deposition of a large amount of water droplets on the reversing guide 13, so that a possibility of the occurrence of the image defect can be reduced.

Further, in this embodiment, in the case where the one-side printing job is ended in a state in which the value of the water droplet counter C is less than 49, the value of the water droplet counter is subtracted depending on the waiting time of the image forming apparatus 100. In other words, a first one-side printing job is referred to as a first job, and a job which is started after an end of the first job and in which an image is formed on the first side of each of the plurality of sheets is referred to as a second job. In addition, a time from the end of the first job to a start of the second job is referred to as the waiting time, and the number of sheets fed by the first operation from the start of the second job until the second operation is executed first in the second job is referred to as the number of execution sheets. In this case, the control means is constituted to execute the second operation so that the number of execution sheets when the waiting time is a first length becomes larger than the number of execution sheets when the waiting time is a second length shorter than the first length.

By this, in consideration of drying of the reversing guide 13 during the waiting time, at an appropriate timing, the operation in the water droplet removing mode can be executed. That is, in the case where the waiting time is long, the drying of the reversing guide 13 progresses during the waiting time, so that compared with the case where a present one-side printing job is started immediately after the last one-side printing job, a grace until a water droplet in an amount causing the image defect is deposited on the reversing guide 13 becomes large. For that reason, the value of the water droplet counter C is decreased depending on the length of the waiting time, the number of sheets until the operation in the water droplet removing mode is executed in the present one-side printing job is increased, so that an execution frequency of the operation in the water droplet removing mode can be reduced. In other words, while avoiding a risk of the occurrence of the image defect, an unnecessary operation in the water droplet removing mode is reduced, so that productivity of the one-side printing job can be enhanced. Incidentally, when a constitution in which an execution timing of a first operation in the water droplet removing mode in the present one-side printing job is changed depending on the length of the waiting time is employed, a method other than the subtraction of the value of the water droplet counter C (for example, a table including the waiting time and the execution timing which are determined in advance) may be used.

Further, in this embodiment, during conveyance of the object sheet TS in the operation in the water droplet removing mode through the reversing path P4 and the re-feeding path P5, the image is formed on the sheet TS+1 later in feeding order than the object sheet TS, by the normal one-side sheet passing operation (part (d) of FIG. 4). In other words, during execution of the second operation for the above-described predetermined sheet, the control means starts the first operation for the sheet subsequent to the predetermined sheet in the feeding order. Then, in a period from passing of the predetermined sheet through the image forming means until the predetermined sheet is conveyed again to the image forming means. By this, the productivity is improved compared with the case where the one-side sheet passing operation for the sheet TS+1 is started after waiting for completion of the formation of the image on the object sheet TS (part (e) of FIG. 4). Incidentally, in the case where the reversing path 4 or the re-feeding path 5 is long, the image may be formed on the object sheet after the images are formed on sheets which are two sheets (or which may also be three or more sheets) later in the feeding order than the object sheet TS.

Modified Embodiment

In this embodiment, a control example in which the value of the water droplet counter C is increased by 1 for each (one) execution of the one-side sheet passing was described, but an increment of the water droplet counter C may be changed depending on a sheet attitude such as a sheet material or a sheet size. For example, thick paper accumulates moisture larger in amount than thin paper, so that the increment of the water droplet counter C for one thick paper may be set larger than the increment of the water droplet counter C for one thin paper. Further, when materials of sheets are the same, a large-size sheet accumulates moisture larger in amount than a small-size sheet. For that reason, the increment of the water droplet counter C for a single sheet with a first size may be set larger than the increment of the water droplet counter C for a single sheet with a second size smaller than the first size.

In the operation in the water droplet removing mode in this embodiment, an example in which the object sheet TS is caused to pass through the transfer portion 3N only once and then the image is transferred onto the object sheet TS when the object sheet TS is second fed to the transfer portion 3N was described. The present invention is not limited thereto, but for example, in the operation in the water droplet removing mode, a constitution in which the object sheet TS is caused to pass through the transfer portion 3N twice and then the image is transferred onto the object sheet TS when the object sheet TS is thirdly fed to the transfer portion 3N may also be employed. In this case, the image is formed on the same side between the object sheet TS and another sheet on the basis of a state in which these sheets are set in the cassette 1b of the feeding portion 1. For this reason, for example, even in the case where a sheet different in material between a front side and a back side thereof or in the like case, the operation in the water droplet removing mode is easily applicable to this case.

Further, in this embodiment, when the object sheet TS in the operation in the water droplet removing mode is first fed to the transfer portion 3N, description was made on the assumption that the object sheet TS is caused to pass through the transfer portion 3N without forming the image thereon (S142). In this case, not only the case where the image is not formed on the object sheet TS at all (in the case where a light quantity of the laser scanner 6 is zero), but also toner with an extremely low density may be deposited on the object sheet TS. The "extremely low density" refers to a density to a degree such that the object sheet TS cannot be distinguished from white paper by eye observation.

Further, the discharging portion 12 and the reversing portion 14 may be constituted as mutually independent conveying units (for example, two sets of roller pairs). On the other hand, when the discharging portion 12 and the reversing portion 14 are constituted by a triple-roller type as in this embodiment, there is no need that a member corresponding to the intermediary roller 32 is provided to both the discharging portion 12 and the reversing portion 14 so that this constitution is advantageous in terms of downsizing of the image forming apparatus.

Embodiment 2

An embodiment 2 will be described using FIGS. 5 and 6. In the above-described embodiment 1, a method in which the object sheet in the operation in the water droplet removing mode is determined by integrating, in a water droplet counter, an addition value which is a fixed value per a single (one) sheet depending on the number of printed sheets of the one-side printing job was described. In this embodiment, a method in which the addition value per the single sheet is changed depending on environmental information of the image forming apparatus 100 will be described.

In the following, elements to which reference numerals or symbols common to the embodiment 1 and this embodiment (embodiment 2) are added have the substantially same constitutions and functions as those described in the embodiment 1 unless otherwise specified, and a portion different from the embodiment 1 will be principally described.

As shown in FIG. 5, the image forming apparatus 100 of this embodiment is provided with an environmental sensor 16. An installation position of the environmental sensor 16 may preferably be disposed in the neighborhood (for example, in a space between the reversing guide 13 and a side wall of the casing 101) of the reversing guide 13 where the dew condensation occurs.

The environmental sensor 16 outputs detection signal depending on a temperature and a humidity of ambient air. That is, the environmental sensor 16 is not only an example of a temperature detecting means (temperature detecting unit) for detecting an environmental temperature of an installation environment of the image forming apparatus but also an example of a humidity detecting means (humidity detecting unit) for detecting an environmental humidity of the installation environment of the image forming apparatus.

As shown in FIG. 6, in a one-side printing job in this embodiment, every time when a one-side sheet passing operation is executed (S101), an addition value depending on the environmental temperature detected by the environmental sensor 16 is integrated (S202). Other steps are similar to those in the embodiment 1 (FIG. 3).

When the one-side printing job is started, as described above, there is a case that the water vapor generated from the sheet heated in the fixing portion 9 is deposited and condensed into dew in some instances. In the case where a temperature of the reversing guide 13 is low, a water droplet is liable to generate from a relationship between the temperature and a saturated water vapor amount, and on the other hand, in the case where the temperature is high, the water droplet does not readily generate.

Therefore, in this embodiment, the addition value is changed depending on the environmental temperature so that the addition value added to the value of the water droplet counter C every time of the one-side sheet passing operation becomes larger with a lower environmental temperature. Specifically, during calculation of the water droplet counter C, the number of print sheets by the one-side sheet passing operation is multiplied by an environmental coefficient k. A value of the environmental coefficient k is set in advance so as to become larger with a lower environmental temperature and smaller with a higher environmental temperature, and is stored in the storing portion 22.

When the value of the water droplet counter C before a start of the one-side printing job is C(0) and the value of the water droplet counter C during execution of n times of the one-side sheet passing operation in the one-side printing job is C(n), the C(n) in this embodiment can be represented as follows.

$$C(n)=C(0)+k \times n$$

By this, in a condition in which the dew condensation is liable to occur due to the low environmental temperature, compared with the case where the environmental temperature is high, a frequency of execution of the operation in the water droplet removing mode in the one-side printing job becomes high. In other words, the control means in this embodiment is constituted so that on the basis of a detection result of the temperature detecting means, a frequency of the execution of the second operation (operation in the water droplet removing mode) during executing of the job (one-side printing job) in the case where the environmental temperature is a first temperature is made higher than a frequency of the execution of the second operation during the execution of the job in the case where the environmental temperature is a second temperature higher than the first temperature. However, when the execution frequency of the operation in the water droplet removing mode is changed depending on the environmental temperature, the present invention is not limited to the above-described method using the environmental coefficient k.

According to this embodiment, by control depending on the environmental temperature, an occurrence of the harmful effect due to the wetting of the sheet can be reduced more reliably.

Modified Embodiment 1

In this embodiment, the control depending on the environmental temperature was described as an example, but control depending on an environmental humidity may also be used. Specifically, the addition value may only be required to be changed depending on the environmental humidity so that the addition value added to the value of the water droplet counter C every time of the one-side sheet passing operation becomes larger with a higher environmental humidity. For example, the value of the environmental coefficient k may only be required so as to be larger with the higher environmental humidity and smaller with a lower environmental humidity.

By this, in a condition in which the dew condensation is liable to occur due to the high environmental humidity, compared with the case where the environmental humidity is low, a frequency of execution of the operation in the water droplet removing mode in the one-side printing job becomes high. In other words, the control means in this modified embodiment is constituted so that on the basis of a detection result of the humidity detecting means, a frequency of the execution of the second operation (operation in the water droplet removing mode) during executing of the job (one-side printing job) in the case where the environmental humidity is a first humidity is made higher than a frequency of the execution of the second operation during the execution of the job in the case where the environmental humidity is a second humidity lower than the first humidity. However, when the execution frequency of the operation in the water droplet removing mode is changed depending on the environmental humidity, the present invention is not limited to the above-described method using the environmental coefficient k.

According to this modified embodiment, by control depending on the environmental humidity, an occurrence of the harmful effect due to the wetting of the sheet can be reduced more reliably.

Incidentally, the control depending on the environmental temperature and the control depending on the environmental humidity may be used in combination. Further, the temperature detecting means and the humidity detecting means may be separated provided, and either one of these means may be provided.

Modified Embodiment 2

As another modified embodiment of the embodiment 2, a subtraction speed of the water droplet counter (S110) may be changed depending on the environmental temperature or the environmental humidity. For example, in a high-temperature environment or a low-humidity environment in which the water droplet on the reversing guide 13 is liable to be dried, compared with a low-temperature environment or a high-humidity environment, a subtraction amount of the water droplet counter C per unit time may only be required to be made large. By this, while avoiding the risk of the occurrence of the image defect, an unnecessary operation in the water droplet removing mode is reduced, so that productivity of the one-side printing job can be enhanced.

Embodiment 3

An embodiment 3 will be described using FIGS. 7 and 8. In this embodiment, a method in which the addition value of the water droplet counter C per the single sheet is changed depending on a water content of the sheet used in image forming apparatus 100 will be described.

In the following, elements to which reference numerals or symbols common to the embodiment 1 and this embodiment (embodiment 3) are added have the substantially same constitutions and functions as those described in the embodiment 1 unless otherwise specified, and a portion different from the embodiment 1 will be principally described.

As shown in FIG. 7, the image forming apparatus 100 of this embodiment is provided with a water content sensor 17. An installation position of the water content sensor 17 may preferably be disposed in a position (for example, in the neighborhood of the conveying portion 2 or the cassette 1*b*) where the sheet before the sheet is heated to the fixing portion 9 passes through the position.

The water content sensor 17 outputs detection signal depending on the water content of the sheet. That is, the water content sensor 17 is an example of a measuring means (measuring unit) for measuring the water content of the sheet. As the water content sensor 17, an infrared moisture meter for estimating the water content on the basis of C (a ratio (absorbance) between a light quantity of infrared radiation reflected by the sheet and a light quantity of irradiated infrared radiation by irradiating the sheet with the infrared radiation with a waveform likely to be absorbed by water.

As shown in FIG. 8, in a one-side printing job in this embodiment, every time when a one-side sheet passing operation is executed (S101), an addition value depending on the water content of the sheet measured by the water content sensor 17 is integrated (S302). Other steps are similar to those in the embodiment 1 (FIG. 3).

When the one-side printing job is started, as described above, there is a case that the water vapor generated from the sheet heated in the fixing portion 9 is deposited and condensed into dew in some instances. In the case where the water content of the sheet is large, water vapor generated from the heated sheet becomes large, and on the other hand, in the case where the water content is small, the water vapor becomes small.

Therefore, in this embodiment, the addition value is changed depending on the water content of the sheet so that the addition value added to the value of the water droplet counter C every time of the one-side sheet passing operation becomes larger with a larger water content of the sheet. Specifically, during calculation of the water droplet counter C, the number of print sheets by the one-side sheet passing operation is multiplied by a water content coefficient w. A value of the water content coefficient w is set in advance so as to become larger with a larger water content of the sheet and smaller with a smaller water content of the sheet, and is stored in the storing portion 22.

When the value of the water droplet counter C before a start of the one-side printing job is C(0) and the value of the water droplet counter C during execution of n times of the one-side sheet passing operation in the one-side printing job is C(n), the C(n) in this embodiment can be represented as follows.

$$C(n)=C(0)+w\times n$$

By this, in a condition in which the dew condensation is liable to occur due to the large water content of the sheet, compared with the case where the water content is small, a frequency of execution of the operation in the water droplet removing mode in the one-side printing job becomes high. In other words, the control means in this embodiment is constituted so that on the basis of a measurement result of the measuring means (water content sensor 17), a frequency of the execution of the second operation (operation in the water droplet removing mode) during executing of the job (one-side printing job) in the case where the water content of the sheet is a first water content is made higher than a frequency of the execution of the second operation during the execution of the job in the case where the water content of the sheet is a second water content smaller than the first water content. However, when the execution frequency of the operation in the water droplet removing mode is changed depending on the water content of the sheet, the present invention is not limited to the above-described method using the water content coefficient w.

According to this embodiment, by control depending on the water content of the sheet, an occurrence of the harmful effect due to the wetting of the sheet can be reduced more reliably.

Incidentally, in this embodiment, the water content sensor 17 was disposed in the neighborhood of the conveying portion 2, but may also be disposed in a different place when the place is on a side upstream of the fixing portion 9 in the sheet conveyance passage. Further, the control depending on the water content of the sheet may be combined with the control depending on the environmental temperature or the environmental humidity described in the embodiment 2 and the modified embodiments thereof.

Embodiment 4

An embodiment 4 will be described using FIGS. 9 and 10. In this embodiment, a method in which the object sheet in the operation in the water droplet removing mode is determined on the basis of a size of a margin of an image will be described.

In the following, elements to which reference numerals or symbols common to the embodiment 1 and this embodiment (embodiment 4) are added have the substantially same constitutions and functions as those described in the embodiment 1 unless otherwise specified, and a portion different from the embodiment 1 will be principally described.

As shown in FIG. 9 by a broken-like arrow, the object sheet TS in the operation in the water droplet removing mode is longer in conveyance passage until the image is transferred in the transfer portion 3N than the sheet on which the image is formed by the normal one-side sheet passing operation. Specifically, the object sheet TS is longer in conveyance passage by a length of the passage from first passing thereof through the transfer portion 3N until the object sheet TS reversed and conveyed in the reversing portion 14 reaches gain the transfer portion 3N via the re-feeding portion 15. For that reason, oblique movement and a positional deviation (which are collectively referred to as a conveyance error) of the sheet which occur during conveyance of the sheet are liable to occur. As a factor of the conveyance error, an alignment deviation between the rollers of the reversing portion 14 and the re-feeding portion 15, a difference in outer diameter between a right end and a left end of the roller, a conveyance resistance of the reversing guide 13, and the like are cited.

Further, in the case where an area of a pointed image is larger than an entire area of the sheet, i.e., in the case where a margin of the sheet is narrow, a deviation of an image forming position due to the conveyance error is liable to become conspicuous.

Therefore, in this embodiment, a constitution in which the operation in the water droplet removing mode is performed substantially at a certain frequency in the one-side printing job and in which as the object sheet in the operation in the water droplet removing mode, a sheet as broad as possible in margin is selected is employed. In other words, the control means in this embodiment executes a first operation (normal one-side sheet passing operation) for a first predetermined number of sheets during execution of a job (one-side printing job) and then determines a predetermined sheet (object sheet in the operation in the water droplet removing mode) in the following manner. That is, the control means determines, as the predetermined sheet, a sheet broadest in margin of the image formed on the sheet, of a second predetermined number of sheets, which is either one of the second predetermined number of sheets subsequent to the first predetermined number of sheets in the feeding order.

Using FIG. 10, control of the one-side printing job in this embodiment will be described. Steps S100 to S102 and S104 to S111 are common to this embodiment (embodiment 4) and the embodiment 1 (FIG. 3).

In this embodiment, in the case where the value of the water droplet counter C becomes not less than 46 which is a threshold (S403: Yes), the sequence enters a sequence (S404 to S407) including selection of the object sheet in the operation in the water droplet removing mode. By this sequence, of three sheets (the second predetermined number of sheets) subsequent to the sheet for which the value of the water droplet counter C becomes not less than 46, the sheet with a broadest margin (narrowest image forming range) is determined as the object sheet in the operation in the water droplet removing mode.

Specifically, on the basis of image information of the one-side printing job, an image forming range of an image scheduled to be formed on the three sheets is checked (S404), and of the three sheets, the sheet with the broadest margin is determined as the object sheet (S405). For example, in the case where three sheets on which images of parts (a) to (c) of FIG. 11 are formed, respectively, are candidates, the sheet of part (c) of FIG. 11 on which the margin is broadest becomes the object sheet. That is, in this embodiment, in the case where an integrated value (value of the water droplet counter) becomes not less than a preset threshold by integrating an addition value corresponding to either one of the sheets, of a predetermined number of sheets subsequent to the associated sheet in the feeding order, the sheet with the broadest margin of the image formed on the sheet is determined as the predetermined sheet (object sheet in the operation in the water droplet removing mode).

Then, as regards the sheets (S406: No) other than the object sheet, the normal one-side sheet passing operation (S407) is executed, and when the sheet is the object sheet (S406: Yes), the operation in the water droplet removing mode is started (S104). Subsequent processes are similar to those in the embodiment 1 (FIG. 3).

According to this embodiment, not only the occurrence of the harmful effect due to the wetting of the sheet is reduced, but also a deviation of the image forming position of the object sheet in the operation in the water droplet removing mode can be made inconspicuous.

Specifically, in the case where if the sheet of part (a) of FIG. 11 is the object sheet in the operation in the water droplet removing mode, due to a conveyance error of the reversing path P4 and the re-feeding path P5, there is a possibility that the image forming position is deviated as shown in part (d) of FIG. 11. In the case where an image with a narrow margin is formed as shown in part 8a) of FIG. 11, the deviation of the image forming position is liable to become conspicuous as shown in part (d) of FIG. 11. On the other hand, in this embodiment, the sheet of part (c) of FIG. 11 is the object sheet in the operation in the water droplet removing mode, so that even when the image forming position is deviated by the same amount as the amount in part (d) of FIG. 11, the deviation of the image forming position is not readily conspicuous as shown in part (e) of FIG. 11.

Incidentally, in this embodiment, a selection range of the object sheet is the three sheets subsequent to a point of time when the value of the water droplet counter C becomes not less than 46, but may be changed broadly or narrowly. Further, threshold of the water droplet counter C for defining a timing centering a sequence in which selection of the object sheet is made may be changed.

Other Embodiments

The present invention can also be realized in processing in which a program for realizing one or more functions of the above-described embodiments is supplied to a system or the image forming apparatus via a network or a storing medium and in which one or more processors in a computer of the system or the image forming apparatus read and execute the program. Further, the present invention can also be realized by a circuit (for example, ASIC) for realizing one or more functions.

According to the present invention, it is possible to provide a new image forming apparatus capable of reducing the occurrence of the harmful effect due to the wetting of the sheet.

Embodiment 5

General Constitution

An embodiment 5 of the present invention will be described. However, dimensions, materials, shapes, a relative arrangement, and the like of constituent elements described in this embodiment should be appropriately changed depending on constitutions and various conditions of devices to which the present invention is applied. That is, the scope of the present invention is not intended to be limited to the following embodiments.

A printer 1001 as an image forming apparatus is a laser beam printer of an electrophotographic type for forming a monochromatic toner image. The printer 1001 includes a sheet feeding portion 1055 for feeding stacked sheets and an image forming portion 1060 for forming an image on the sheet fed from the sheet feeding portion 1055 as shown in FIG. 13. Further, the printer 1001 includes a fixing device 1010 for fixing the image transferred onto the sheet and a sheet discharging device 1070 capable of discharging a sheet to an outside of the printer 1001. Incidentally, the sheet in this embodiment includes paper such as a sheet or an envelope, a plastic film such as a sheet for an overhead projector (OHP), a cloth, and the like.

When an instruction of image formation is outputted to the printer 1001, on the basis of image information inputted from an external computer or the like connected to the printer 1001, an image forming process by the image forming portion 1060 is started. The image forming portion 1060 includes a photosensitive drum 1002, and a charging roller 1003, a developing roller 1005, and a transfer roller 1009 which are provided along the photosensitive drum 1002. A laser scanner 1004 emits laser light toward the photosensitive drum 1002 on the basis of the inputted image information. At this time, the photosensitive drum 1002 is electrically charged in advance by the charging roller 1003 and then is irradiated with the laser light, so that an electrostatic latent image is formed on the photosensitive drum 1002. Thereafter, this electrostatic latent image is developed by the developing roller 1005, so that the monochromatic toner image is formed on the photosensitive drum 1002.

In parallel to the above-described image forming process, a sheet S is fed from the sheet feeding portion 1055. The sheet feeding portion 1055 includes an unshown cassette for stacking sheets S, a pick-up roller 1006, and a separation roller pair 1007. The sheets S stacked on the cassette are fed by the pick-up roller 1006. The sheets S fed by the pick-up roller 1006 are separated one by one by the separation roller pair 1007.

The sheet S separated one by one by the separation roller pair 1007 is conveyed toward the transfer roller 1009 by a conveying roller pair 1008*a* and 1008*b*. Then, onto the sheet S, by an electrostatic load bias applied to the transfer roller 1009, a toner image on the photosensitive drum 1002 is transferred. To the sheet S on which the toner image is transferred, predetermined heat and pressure are imparted by a pressing roller 1010*a* and a heating unit 101*b* of the fixing device 1010, so that toner is melted and stuck (fixed) on the sheet S. The heating unit 1010*b* incorporates a heater. The sheet S passed through the fixing device 1010 is conveyed to a sheet discharging device 1070.

The sheet discharging device 1070 includes a guiding member 1040 for guiding the sheet S passed through the fixing device 1010 to either one of a first conveyance passage CP1 and a second conveyance passage CP2, discharging roller pairs 1011 and 1011U, full-state detection flags 1020 and 1020U, and discharge trays 1012 and 1012U. The guiding member 1040 as a second movable unit is provided so as to be movable to a first position shown by a solid line of FIG. 13 and a second position shown by a broken line of FIG. 13. The guiding member 1140 is urged by an unshown spring toward the first position, for example. Further, the guiding member 1040 is constituted so as to be movable from the first position to the second position against an urging force of the spring by a motor M1 (see, FIG. 16).

When the guiding member 1040 is positioned in the first position, the sheet S is guided to the first conveyance passage CP1 by the guiding member 1040 and is discharged to the discharge tray 1012 by the discharging roller pair 1011. When the guiding member 1040 is positioned in the second position, the sheet S is guided to the second conveyance passage CP2 by the guiding member 1040 and is discharged to the discharge tray 1012U by the discharging roller pair 1011U.

Full-State Detection Flag

Next, the full-state detection flag 1020 of the sheet discharging device 1070 will be specifically described. The full-state detection flag 1020 as a first moving unit includes, as shown in FIG. 14, a rotation shaft 1021 rotatably supported by a casing 1001A of the printer 1001, flag portions 1022a, 1022b, 1022c, and 1022d, urged portions 1023a and 1023b, and a light blocking portion 1024. The flag portions 1022a, 1022b, 1022c, and 1022d are fixed to the rotation shaft 1021 and are extend in a radial direction perpendicular to the axial direction AD of the rotation shaft 1021. Further, the flag portions 1022a, 1022b, 1022c, 1022d are arranged and disposed in the axial direction AD and are disposed symmetrically along the axial direction AD with respect to a center of the conveyance passage. By this, the flag portions 1022a, 1022b, 1022c, and 1022d are capable of contacting various-size sheets discharged by the discharging roller pair 1011 as a discharging portion.

The urged portions 1023a and 1023b are also fixed to the rotation shaft 1021 and are extended in a direction different from the direction of the flag portions 1022a, 1022b, 1022c, and 1022d, along the radial direction perpendicular to the axial direction AD of the rotation shaft 1021. That is, the urged portions 1023a and 1023b are provided integrally with the flag portions 1022a, 1022b, 1022c, and 1022d via the rotation shaft 1021. The urged portions 1023a and 1023b are arranged and disposed in the axial direction AD and are disposed symmetrically along the axial direction AD with respect to the center of the conveyance passage. Further, the urged portions 1023a and 1023b are constituted by an elastic material.

The above-described guiding member 1040 is constituted rotatably between the first position and the second position about a rotation shaft 1040a supported by the casing 1001A. Further, the guiding member 1040 includes a main body portion 1041 driven by a motor M1 and urging portions 1040b and 1040b provided integrally with the main body portion 1041. In the axial direction AD, the urged portions 1023a and 1023b and the urging portions 1040b and 1040b of the guiding member 1040 are constituted so as to at least partially overlap with each other. That is, in the axial direction, a range in which the urged portions 1023a and 1023b are disposed and a range in which the urging portions 1040b and 1040b are disposed at least partially overlap with each other. For this reason, the urged portions 1023a and 1023b are disposed so as to be contactable to the guiding member 1040, moving from the first position to the second position, in a state in which the flag portions 1022 (see, part (a) of FIG. 15) are positioned in a detecting position described later.

Incidentally, the flag portions 1022a, 1022b, 1022c, and 1022d have constitutions and functions similar to each other, and the urged portions 1023a and 1023b also have constitutions and functions similar to each other. Therefore, in the following, in the case where the flag portions 1022a, 1022b, 1022c, and 1022d are described without being particularly distinguished, these flag portions will be described and illustrated in the drawings, simply as the flag portion(s) 1022. Similarly, in the case where the urged portions 1023a and 1023b are described without being particularly distinguished, these urged portions will be described and illustrated in the drawings, simply as the urged portion(s) 1023.

The light blocking portion 1024 is fixed to one end portion of the rotation shaft 102 with respect to the axial direction AD and is constituted so as to be capable of blocking an optical path of a sensor 1030 fixed to the casing 1001A. The sensor 1030 as a detecting portion includes a light emitting portion 1030a and a light receiving portion 1030b, and light emitted from the light emitting portion 1030a is received by the light receiving portion 1030b, so that the sensor 1030 is turned on (ON state). In other words, the sensor 1030 changes an output value on the basis of whether or not the light receiving portion 1030b receives the light. The optical path is formed between the light emitting portion 1030a and the light receiving portion 1030b. The rotation shaft 1021, the flag portions 1022a, 1022b, 1022c, and 1022d, the urged portions 1023a and the 1023b, and the light blocking portion 1024 of the full-state detection flag 1020 are moved integrally with each other.

As shown in parts (a) and (b) of FIG. 15, the sheet discharged by the discharging roller pair 1011 is stacked as a stacked sheet 1120 on the discharge tray 1012. The flag portion 1022 of the full-state detection flag 1020 is temporarily raised by the sheet fed by the discharging roller pair 1011, and is lowered when a trailing end of the sheet passes through the discharging roller pair 1011. Thus, a state in which the flag portion 1022 of the full-state detection flag 1020 is temporarily raised and then is lowered by the sheet is hereinafter referred to as a lowered state of the flag portion 1022. In the case where a height of the stack sheets 1120 is less than a predetermined height, the flag portion 1022 of the full-state detection flag 1020 in the lowered state does not contact the stacked sheets 1120, and is positioned in a stand-by position shown by a solid line of part (a) of FIG. 15. In a state in which the flag portion 1022 as a contact portion is positioned in the stand-by position, as shown in part (b) of FIG. 15, the light blocking portion 1024 blocks the optical path of the sensor 1030, and therefore, the sensor 1030 is in an OFF state (light blocking state).

When the height of the stacked sheets 1120 becomes the predetermined height, an upper surface of an uppermost stacked sheet 1120 contacts the flag portion 1022 in the lowered state. Then, a position where the flag portion 1022 in the lowered state contacts the upper surface of the (uppermost) stacked sheet 1120 is shifted upward with an increasing height of the stacked sheets 1120. In other words, the position the flag portion 1022 in the lowered state contacts the upper surface of the stacked sheet 1120 is shifted from the stand-by position toward the detecting position described later as the number of the sheets stacked on the discharge tray 1012 increases. When the flag portion 1022 is positioned in a position shown by a broken line of part (a) of FIG. 15, i.e., when the flag portion 1022 contacts an upper surface of an uppermost sheet TP of the stacked sheets 1120 in a full(-state) amount, the flag portion 1022 is positioned in the detecting position. In other words, the flag portion 1022 is positioned in the detecting position in the case where the flag portion 1022 contacts the uppermost stacked sheet TP of the stacked sheets 1120 stacked on the discharge tray 1012. In a state in which the flag portion 1022 is positioned in the detecting position, as shown in part (b) of FIG. 15, the light blocking portion 1024 does not block the optical path of the sensor 1030, so that the sensor 1030 is in the ON state (light-transmission state). In a state before the flag portion 1022 reaches the detecting position, the light blocking portion 1024 blocks the optical path of the sensor 1030, so that the sensor 1030 is in the OFF state (light-blocked state). That is, the sensor 1030 is changed in state from the OFF state to the ON state by an increase in the number of stacked sheets 1120 and then by arrival of the full-state detection flag 1020 at the detecting position. Incidentally, in the following, when the flag portion 1022 is in the stand-by position, the full-state detection flag 1020 is referred to that the full-state detection flag 1020 is also positioned in the stand-by position. Similarly, when the flag portion 1022 is in the detecting position, the full-state detection flag 1020 is referred to that the full-state detection flag 1020 is also positioned in the detecting position. In addition, when the flag portion 1022 is in the lowered state, the full-state detection flag 1020 is referred to that the full-state detection flag 1020 is also in the lowered state. Incidentally, the light blocking portion 1024 and the sensor 1030 may be constituted so that the light blocking portion 1024 blocks the optical sheet of the sensor 1030 in a state in which the flag portion 1022 is positioned in the detecting position and so that the light blocking portion 1024 does not block the sensor 1030 in a state before the flag portion 1022 reaches the detecting position.

Control Block

FIG. 16 is a block diagram showing a control block of the printer 1001 according to this embodiment. As shown in FIG. 16, the printer (image forming apparatus) 1001 includes a controller 1080. The controller 1080 includes a CPU 1081, a ROM 1082, and a RAM 1083. In the ROM 1082, various programs are stored, and the CPU 1081 reads and executes the program stored in the ROM 1082. The RAM 1083 is used as a working (operation) area of the CPU 1082.

To an input side of the controller 1080, the sensor 1030 is connected, and to an output side of the controller 1080, the motor M1 and a conveyance motor M2 are connected. The motor M1 causes the motor M1 to rotate the guiding member 1040 between the first position and the second position. The conveyance motor M2 drives respective rollers of the printer 1001. The conveyance motor M2 drives at least the discharging roller pair 1011, but may also drive other rollers. Other rollers may also be driven by another conveyance motor.

Incidentally, in this embodiment, by the motor M1 as an actuator, the guiding member 1040 is driven, but the present invention is not limited thereto. For example, the guiding member 1040 may be driven by a solenoid as the actuator. Further, a constitution in which the motor M1 is omitted and in which the guiding member 1040 is moved from the first position to the second position by using the conveyance motor M2 as the actuator may be employed. In this case, the guiding member 1040 may be moved from the first position to the second position by reversely rotating the conveyance motor M2. Further, in a drive transmission path of the conveyance motor M2, a switching device for switching transmission and blockage of a driving force to the guiding member 1040 or the respective rollers may be provided. As the switching device, it is possible to use various constitutions such as an electromagnetic clutch, a one-way clutch, and a pendulum gear.

Comparison Example

Here, a comparison example will be described using FIGS. 17 and 18. In FIG. 17, the stacked sheets stacked on the discharge tray 1012 are curled. The sheet is curled in some instances due to a difference in amount of vaporized water content between a front side and a black side of the sheet when the sheet passes through the fixing device 1010. Then, the curled stacked sheets float relative to the discharge tray 1012, so that a space SP is formed between the stacked sheets and the discharge tray 1012.

Thus, when the stacked sheet 1120 are curled, the flag portion 1022 reaches the detecting position by the stacked sheets 1120 in an amount smaller than a full(-state) amount (shown by chain line of part (a) of FIG. 15) by a height H (FIG. 17). That is, the stacked sheets 1120 are conveyed, whereby compared with a state in which the stacked sheets 1120 are not curled, the sensor 1030 is in the ON state although the sheets are stacked on the discharge tray 1012 only in the number of sheets smaller the number of the curled stacked sheets by the number of sheets corresponding to the height H.

In order to suppress such curl of the stacked sheets 1120, a method in which the stacked sheets are pressed from above by increasing a weight of the flag portion 1022 would be considered. However, when the weight of the flag portion 1022 is increased, as shown in FIG. 18, when a leading end Sa of the sheet S discharged by the discharging roller pair 1011 presses the flag portion 1022, the leading end Sa of the sheet S cannot completely press up the flag portion 1022 and thus is directed downward. Then, in a contact portion between the leading end Sa of the sheet S and the stacked sheets 1120, an angle formed between the leading end Sa of the sheet S and the stacked sheets 1120 becomes large.

In order to suppress movement of the stacked sheets 1120 by a force F imparted from the sheet S, it is also possible to lower a contact pressure between the sheet S and the stacked sheets 1120 by disposing the discharge tray 1012 away from the discharging roller pair 1011, but in this case, the printer 1001 is upsized. Therefore, a controller 80 in this embodiment executes full-state detection control as described in the following.

Full-State Detection Operation

Next, the full-state detection control in this embodiment will be described using FIG. 19 to part (b) of FIG. 21.

In FIG. 19, description will be made by taking, as an example, full-state detection control in a job in which for example, images are formed on a plurality of sheets and then the sheets are continuously discharged on the discharge tray 1012. As shown in FIG. 19, first, the controller 1080 discriminates whether or not the sensor 1030 is in the ON state (step S1010). As described above, the sheets are successively discharged on the discharge tray 1012 by the discharging roller pair 1011, and when the height of the stacked sheets 1120 is increased, the flag portion 1022 of the full-state detection flag 1020 is moved from the stand-by position to the detecting position. In the case where discrimination that the sensor 1030 is in the ON state is not made (step S1010: No), the controller 1080 controls the discharging roller pair 1011 so as to subsequently discharge the sheet S (step S1011). Then, the controller 1080 checks whether or not there is a next discharge instruction for discharging the sheet S onto the discharge tray 1012 (step S1012). In the case where the next discharge instruction is present (step S1012: Yes), the sequence is returned to the step S1010. In the case where the next discharge instruction is absent (step S1012: No), the full-state detection control is ended.

On the other hand, in the case where the discrimination that the sensor 1030 is in the ON state is made (step S1010: Yes), the controller 1080 controls the motor M1 so as to move the guiding member 1040 from the first position to the second position (step S1013).

The urged portion 1023 of the full-state detection flag 1020 does not contact the guiding member 1040 even when the guiding member 1040 is moved between the first position and the second position in the case where the flag portion 1022 is positioned in the stand-by position. On the other hand, the urged portion 1023 does not contact the guiding member 1040 positioned in the first position when the flag portion 1022 is positioned in the detecting position, but is urged upward by the urging portion 1040b of the guiding member 1040 when the guiding member 1040 is moved from the first position to the second position. Incidentally, in this embodiment, when the guiding member 1040 is positioned in the first position and the flag portion 1022 is positioned in the detecting position, the urging portion 1040b of the guiding member 1040 is spaced from the urged portion 1023 of the full-state detection flag 1020.

In the step S1013, the flag portion 1022 is positioned in the detecting position, so that as shown in part (a) of FIG. 20 and part (a) of FIG. 21, when the guiding member 1040 is moved from the first position to the second position, the urging portion 1040b presses the urged portion 1023. At this time, in part (a) of FIG. 20 and part (a) of FIG. 21, the stacked sheets 1120 stacked on the discharge tray 1012 are curled. The urged portion 1023 is pressed by the urging portion 1040b, whereby the full-state detection flag 1020 is rotated clockwise about the rotation shaft 1021 in part (a) of FIG. 20. That is, by the step S1013 as first processing, the flag portion 1022 of the full-state detection flag 1020 is urged from the detecting position toward the stand-by position.

By this, as shown in part (a) of FIG. 21, the flag portion 1022 presses the stacked sheets 1120 downward, so that the stacked sheets follow the discharge tray 1012 and thus the curl of the stacked sheets 1120 is rectified. In other words, the full-state detection flag 1020 is urged toward the stand-by position by the guiding member 1040 moved from the first position to the second position, so that a force for pressing the stacked sheets 1120 by the flag portion 1022 of the full-state detection flag 1020 is increased. Further, in a state in which the flag portion 1022 presses the stacked sheets 1120, when the urged portion 1023 is pressed by the urging portion 1040b, the urged portion 1023 is elastically deformed. An elastic force generated by elastic deformation of the urged portion 1023 acts as a pressing force of the flag portion 1022 toward the stacked sheets 1120.

Returning to description of the flow chart of FIG. 19, then, the controller 1080 discriminates whether or not the state of the sensor 1030 is changed from the ON state to the OFF state (step S1014). In other words, by the sensor 1030, the controller 1080 discriminates whether or not the flag portion 1022 is moved from the detecting position toward the stand-by position.

As shown in parts (a) and (b) of FIG. 21, when the curled stacked sheets 1120 are pressed against the discharge tray 1012 by the flag portion 1022 of the full-state detection flag 1020 while being supported by the guiding member 1040, the flag portion 1022 is rotated from the detecting position toward the stand-by position by a predetermined amount. Then, the state of the sensor 1030 is changed from the ON state to the OFF state. By this, sheet(s) can be further stacked on the discharge tray 1012.

In the case where discrimination that the state of the sensor 1030 is changed from the ON state to the OFF state (step S1014: Yes), the controller 1080 not only permits discharge of the sheet S by the discharging roller pair 1011 but also causes the guiding member 1040 to move from the second position to the first position (step S1015). By moving the guiding member 1040 from the second position to the first position, the guiding member 1040 is capable of guiding the sheet S again to the discharge tray 1012 via the first conveyance passage CP1. Then, the sheet S is discharged onto the discharge tray 1012 by the discharging roller pair 1011.

Next, the controller 1080 discriminates whether or not there is a next discharge instruction (step S1016). In the case where the next discharge instruction is absent (step S1016: No), the full-state detection control is ended. On the other hand, in the case where the next discharge instruction is present (step S1016: Yes), the controller 1080 causes the sequence to return to the step S1010.

Thus, in the case where the next discharge instruction is present, the controller 1080 repeats processing in which the guiding member 1040 is moved between the first position and the second position, unless the state of the sensor 1030 is kept in the ON state in the step S1014. With this, every time when one sheet S is discharged, the flag portion 1022 is urged from the detecting position toward the waiting position so that the flag portion 1022 rectifies the curl of the stacked sheets 1120.

Parts (a) and (b) of FIG. 22 are schematic views for illustrating the case where the stacked sheets 1120 stacked on the discharge tray 1012 are not curled. In the step S1013 of FIG. 9, in the case where the stacked sheets 1120 which are not curled are pressed against the discharge tray 1012 by the flag portion 1022 of the full-state detection flag 1020 while being supported by the guiding member 1040, the urged portion 1023 is elastically deformed as shown in part (a) of FIG. 22. That is, a force from the urging portion 1040b of the guiding member 1040 is caused to escape by elastic deformation of the urged portion 1023, so that breakage of the guiding member 1040 and the full-state detection flag 1020 are prevented. Incidentally, in the step S1013, the stacked sheets 1120 which are not curled includes the stacked sheets 1120 which are originally not curled and the stacked sheets 1120 of which curl is rectified by being pressed by the flag portion 1022.

In such a case, the full-state detection flag 1020 is not moved from the detecting position even when the urged portion 1023 is pressed by the urging portion 1040b. That is, the flag portion 1022 is kept at the detecting position. Therefore, in the step S1014 of FIG. 19, the controller 1080 discriminates that the state of the sensor 1030 is not changed from the ON state to the OFF state (step S1014: No), and the sequence goes to the step S1017. Then, the controller 1080 detects discharge of the sheets (step S1017). At this time, the controller 1080 may cause the guiding member 1040 to move from the second position to the first position. Further, in a state in which the discharge of the sheet S is restricted in the step S1017, feeding of the sheet S from the sheet feeding portion 1055 is restricted. By the above, the controller 1080 ends the full-state detection control. That is, the controller 1080 discriminates that the state of the stacked sheets 1120 on the discharge tray 1012 is a full state from that the state of the sensor 1030 is kept in the ON state in the step S1014. Incidentally, the steps S1014, S1015, and S1017 constitute second processing in this embodiment.

The controller 1080 may cause a display portion of the printer 1001 or an external computer or the like connected to the printer 1001 to display information indicating that the state of the stacked sheets 1120 on the discharge tray 1012 is the full state and information on removal of the stacked sheets 1120 from the discharge tray 1012. When the stacked sheets 1120 on the discharge tray 1012 are removed, the state of the sensor 1030 is changed from the ON state to the OFF state. At this time, the controller 1080 permits discharge of the sheets S. When the state of the sensor 1030 is changed to the OFF state, the controller 1080 may automatically resume the conveyance of the sheet S and may also resume the conveyance of the sheet S when a user provides an instruction to resume the conveyance of the sheet S.

By employing the constitution as described above, even when the stacked sheets 1120 on the discharge tray 1012 are curled first, the curl can be rectified by pressing the stacked sheets 1120 by the flag portion 1022 receiving a force from the guiding member 1040. Further, even when the state of the sensor 1030 once becomes the ON state, the controller 1080 does not immediately determine that the state of the sensor 1030 is the full state, but discriminates whether or not the full state is determined by pressing the stacked sheets 1120 by the flag portion 1022 receiving the force from the guiding member 1040. By this, the number of sheets capable of being stacked on the discharge tray 1012 can be sufficiently ensured irrespective of occurrence or non-occurrence of the curl of the sheet. In other words, erroneous detection by the sensor 1030 in a state in which an amount of the sheets does not reach a full amount can be reduced.

Further, the full-state detection flag 1020 can increase a pressing force toward the stacked sheets 1120 by moving the guiding member 1040 from the first position to the second position. For this reason, the stacked sheets 1120 can be firmly pressed without increasing a weight of the full-state detection flag 1020 itself, so that a sheet stacking property can be improved.

Further, in order to suppress dropout of the stacked sheets 1120, there is no need to change arrangement and an angle of the discharge tray 1012, so that it is possible to compatibly realize an increase in the number of sheets capable of being stacked on the discharge tray 1012 and the stacking property of the sheets (stacked sheets) while maintaining a size of the printer 1001.

Embodiment 6

Next, an embodiment 6 of the present invention will be described, but in this embodiment, the urged portions 1023*a* and 1023*b* of the full-state detection flag 1020 in the embodiment 5 are constituted by another member. For this reason, constitutions similar to the constitutions of the embodiment 5 will be described by omitting illustration or by adding the same reference numerals or symbols to the drawings.

Full-State Detection Flag

A full-state detection flag 1020B as a first moving unit in the embodiment 6 includes, as shown in FIG. 23, a rotation shaft 1021, flag portions 1022*a*, 1022*b*, 1022*c*, and 1022*d*, urged members 1050*a* and 1050*b*, a light blocking portion 1024, and urging members 1090*a* and 1090*b*.

The urged members 1050*a* and 1050*b* are supported rotatably relative to the rotation shaft 1021 and are extended in a direction different from the direction of the flag portions 1022*a*, 1022*b*, 1022*c*, and 1022*d*, along the radial direction perpendicular to the axial direction AD of the rotation shaft 1021. That is, the urged members 1050*a* and 1050*b* are provided separately from the flag portions 1022*a*, 1022*b*, 1022*c*, and 1022*d*. The urged members 1050*a* and 1050*b* are arranged and disposed in the axial direction AD and are disposed symmetrically along the axial direction AD with respect to the center of the conveyance passage. In the axial direction AD, the urged members 1050*a* and 1050*b* and the urging portions 1040*b* and 1040*b* of the guiding member 1040 are constituted so as to at least partially overlap with each other. That is, in the axial direction, a range in which the urged members 1050*a* and 1050*b* are disposed and a range in which the urging portions 1040*b* and 1040*b* are disposed at least partially overlap with each other.

In the rotation shaft 1021, the urging members 1090*a* and 1090*b* constituted by a torsion coil spring or the like are engaged. The urging member 1090*a* engages with the flag portion 1022*a* and the urged member 1050*a* and urges the urged member 1050*a* toward the guiding member 1040. Further, the urging member 1090*b* engages with the flag portion 1022*d* and the urged member 1050*b* and urges the urged member 1050*b* toward the guiding member 1040.

Incidentally, the flag portions 1022*a*, 1022*b*, 1022*c*, and 1022*d* have constitutions and functions similar to each other, and the urged members 1050*a* and 1050*b* also have constitutions and functions similar to each other. Further, the urging members 1090*a* and 1090*b* also have constitutions and functions similar to each other. Therefore, in the following, in the case where the flag portions 1022*a*, 1022*b*, 1022*c*, and 1022*d* are described without being particularly distinguished, these flag portions will be described and illustrated in the drawings, simply as the flag portion(s) 1022. Similarly, in the case where the urged members 1050*a* and 1050*b* are described without being particularly distinguished, these urged members will be described and illustrated in the drawings, simply as the urged member(s) 1050. Similarly, in the case where the urging members 1090*a* and 1090*b* are described without being particularly distinguished, these urging members will be described and illustrated in the drawing, simply as the urging member(s) 1090.

The urged member 1050 as an urged portion is connected to the flag portion 1022 by the urging member 1090 as a second urging portion, so that the urged member 1050 is rotated about the rotation shaft 1021 integrally with the flag portion 1022 in a state in which movement of the flag portion 1022 is not restricted. On the other hand, the urged member 1050 is rotatable relative to the flag portion 1022 in a state in which the movement of the flag portion 1022 is restricted.

When the flag portion 1022 is positioned in the stand-by position, the urged member 1050 does not contact the guiding member 1040 even when the guiding member 1040 is moved between the first position and the second position. On the other hand, when the flag portion 1022 is positioned in the detecting position, the urged member 1050 does not contact the guiding member 1040 positioned in the first position, but when the guiding member 1040 is moved from the first position to the second position, the urged member 1050 is pressed upward by the urging portion 1040*b* of the guiding member 1040.

Full-State Detection Control

Also, in this embodiment, similarly as in the embodiment 5, the controller 80 (see, FIG. 15) executes the full-state detection control shown in FIG. 19.

As shown in FIG. 19, first, the controller 1080 discriminates whether or not the sensor 1030 is in the ON state (step S1010).

The case where the discrimination that the sensor 1030 is in the ON state is made (step S1010: Yes), the controller 1080 controls the motor M1 so as to move the guiding member 1040 from the first position to the second position (step S1013). The steps S1011 and S1012 are similar to those in the embodiment 5, and therefore will be omitted from description.

In the step S1013, the full-state detection flag 1020B is positioned in the detecting position, so that as shown in part (a) of FIG. 24, when the guiding member 1040 is moved from the first position to the second position, the urging portion 1040*b* presses the urged member 1050. At this time, in part (a) of FIG. 24, the stacked sheets 1120 stacked on the discharge tray 1012 are curled. The urged member 1050 is pressed by the urging portion 1040*b*, whereby the flag portion 1022 of the full-state detection flag 1020B is rotated together with the urged member 1050 clockwise about the rotation shaft 1021 in part (a) of FIG. 24.

By this, as shown in part (a) of FIG. 24, the flag portion 1022 presses the stacked sheets 1120 downward, so that the stacked sheets follow the discharge tray 1012 and thus the curl of the stacked sheets 1120 is rectified. In other words, the full-state detection flag 1020B is urged toward the stand-by position by the guiding member 1040 moved from the first position to the second position, so that a force for pressing the stacked sheets 1120 by the flag portion 1022 of the full-state detection flag 1020B is increased. Further, in a state in which the flag portion 1022 presses the stacked sheets 1120, when the urged portion 1023 is pressed by the urging portion 1040b, the urged member 1050 is rotated relative to the flag portion 1022. By this, the urging member 1090 is elastically deformed, so that an elastic force of the urged member is enhanced, and this elastic force acts as a pressing force of the flag portion 1022 toward the stacked sheets 1120.

Returning to description of the flow chart of FIG. 19, then, the controller 1080 discriminates whether or not the state of the sensor 1030 is changed from the ON state to the OFF state (step S1014).

As shown in parts (a) and (b) of FIG. 24, when the curled stacked sheets 1120 are pressed against the discharge tray 1012 by the flag portion 1022 of the full-state detection flag 1020B while being supported by the guiding member 1040, the full-state detection flag 1020B is rotated from the detecting position toward the stand-by position by a predetermined amount. Then, the state of the sensor 1030 is changed from the ON state to the OFF state. By this, sheet(s) can be further stacked on the discharge tray 1012.

In the case where discrimination that the state of the sensor 1030 is changed from the ON state to the OFF state (step S1014: Yes), the controller 1080 not only permits discharge of the sheet S by the discharging roller pair 1011 but also causes the guiding member 1040 to move from the second position to the first position (step S1015). Then, the sheet S is discharged by the discharging roller pair 1011. The step S1016 is similar to that in the embodiment 4, and therefore will be omitted from description.

Further, parts (a) and (b) of FIG. 25 are schematic views for illustrating the case where the stacked sheets 1120 stacked on the discharge tray 1012 are not curled. As shown in part (a) of FIG. 25, the flag portion 1022 positioned in the detecting position contacts the stacked sheet 1120 which is not curled, and therefore movement thereof toward the stand-by position is restricted. On the other hand, in the step S1013 of FIG. 19, the guiding member 1040 is moved from the first position to the second position, whereby the urged member 1050 is pressed by the urging portion 1040b of the guiding member 1040. By this, the urged member 1050 is rotated clockwise about the rotation shaft 1021 in part (a) of FIG. 25 against the urging force of the urging member 1090. That is, the urged member 1050 is rotated about the rotation shaft 1021 relative to the flag portion 1022 in a stand-by state. By this, a force from the urging portion 1040b of the guiding member 1040 is caused to escape by rotation of the urged member 1050, relative to the flag portion 1022 so that breakage of the guiding member 1040 and the full-state detection flag 1020B are prevented.

In such a case, the flag portion 1022 is not moved from the detecting position even when the urged member 1050 is pressed by the urging portion 1040b. Therefore, in the step S1014 of FIG. 19, the controller 1080 discriminates that the state of the sensor 1030 is not changed from the ON state to the OFF state (step S1014: No), and the sequence goes to the step S1017.

The step S1017 is similar to that in the embodiment 5, and therefore will be omitted from description.

By employing the constitution as described above, similarly as in the embodiment 5, the stacked sheets 1120 can be firmly pressed without increasing a weight of the full-state detection flag 1020 itself, so that a sheet stacking property can be improved. Further, in this embodiment, the urging member 1090 is interposed between the flag portion 1022 and the urged member 1050, so that a pressing force of the flag portion 1022 toward the stacked sheets 1120 can be easily changed depending on an elastic force of the urging member 1090.

Therefore, by changing the urging member 1090, the pressing force of the flag portion 1022 toward the stacked sheets 1120 can be easily changed.

Embodiment 7

Next, an embodiment 7 of the present invention will be described, but in this embodiment, the urging portion 1040b of the guiding member 1040 in the embodiment 5 are constituted by another member. For this reason, constitutions similar to the constitutions of the embodiment 5 will be described by omitting illustration or by adding the same reference numerals or symbols to the drawings.

Guiding Member

A guiding member 1140 in the embodiment 7 includes, as shown in parts (a) and (b) of FIG. 26, a main body portion 1041 rotatable about a rotation shaft 1040a between a first position and a second position, a pressing member 1042 provided separately from the main body portion 1041, and an urging member 1091. The main body portion 1041 is rotatable between the first position and the second position by the motor M1 (see, FIG. 16), and guides the sheet S to the first conveyance passage CP1 when positioned in the first position and guides the sheet S to the second conveyance passage CP2 when positioned in the second position.

In the rotation shaft 1040a, the urging member 1091 constituted by a torsion coil spring or the like are engaged. The urging member 1091 as a first urging member engages with the main body portion 1041 and the pressing member 1042 and urges the pressing member 1042 toward the pressed portion 1023 of the full-state detection flag 1020. In other words, the urging member 1091 connects the main body portion 1041 and the pressing member 1042 with each other and urges the pressing member 1042 toward the pressed portion 1023 relative to the main body portion 1041. The pressing member 1042 as a pressing portion includes a pressing portion 1042a capable of pressing the pressed portion 1023 of the full-state detection flag 1020.

The main body portion 1041 is connected to the pressing member 1042 by the urging member 1091, so that the main body portion 1041 is rotated about the rotation shaft 1040a integrally with the pressing member 1042 in a state in which movement of the pressing member 1042 is not restricted. On the other hand, the main body portion 1041 is rotatable relative to the pressing member 1042 in a state in which the movement of the pressing member 1042 is restricted.

When the full-state detection flag 1020 is positioned in the stand-by position, the pressing member 1042 does not contact the pressed portion 1023 of the full-state detection flag 1020 even when the guiding member 1140 as a second moving unit is moved between the first position and the second position. On the other hand, when the flag portion 1022 is positioned in the detecting position, the pressing member 1042 presses the pressed portion 1023 of the full-state detection flag 1020 when the main body portion 1041 (guiding member 1140) is moved from the first position to the second position. Incidentally, in this embodiment the pressed portion 1023 is not required to be constituted by an elastic material.

Full-State Detection Control

Also, in this embodiment, similarly as in the embodiment 5, the controller 80 (see, FIG. 15) executes the full-state detection control shown in FIG. 19.

As shown in FIG. 19, first, the controller 1080 discriminates whether or not the sensor 1030 is in the ON state (step S1010).

The case where the discrimination that the sensor 1030 is in the ON state is made (step S1010: Yes), the controller 1080 controls the motor M1 so as to move the guiding member 1140 from the first position to the second position (step S1013). The steps S1011 and S1012 are similar to those in the embodiment 5, and therefore will be omitted from description.

In the step S1013, the full-state detection flag 1020 is positioned in the detecting position, so that as shown in part (a) of FIG. 26, when the guiding member 1140 is moved from the first position to the second position, the pressing portion 1042a of the pressing member 1042 presses the pressed portion 1023 of the full-state detection flag 1020. At this time, in part (a) of FIG. 26, the stacked sheets 1120 stacked on the discharge tray 1012 are curled. The pressed portion 1023 is pressed by the pressing portion 1042a, whereby the flag portion 1022 of the full-state detection flag 1020B is rotated together with the pressed portion 1023 clockwise about the rotation shaft 1021 in part (a) of FIG. 26.

By this, as shown in part (a) of FIG. 26, the flag portion 1022 presses the stacked sheets 1120 downward, so that the stacked sheets follow the discharge tray 1012 and thus the curl of the stacked sheets 1120 is rectified. In other words, the full-state detection flag 1020 is urged toward the stand-by position by the guiding member 1140 moved from the first position to the second position, so that a force for pressing the stacked sheets 1120 by the flag portion 1022 of the full-state detection flag 1020 is increased. Further, in a state in which the flag portion 1022 presses the stacked sheets 1120, when the pressed portion 1023 is pressed by the pressing portion 1042a, the pressing member 1042 is rotated relative to the main body portion 1041. By this, the urging member 1091 is elastically deformed, so that an elastic force of the urged member is enhanced, and this elastic force acts as a pressing force of the flag portion 1022 toward the stacked sheets 1120 via the pressing member 1042, the pressed portion 1023, and the rotation shaft 1021.

Returning to description of the flow chart of FIG. 19, then, the controller 1080 discriminates whether or not the state of the sensor 1030 is changed from the ON state to the OFF state (step S1014).

As shown in parts (a) and (b) of FIG. 26, when the curled stacked sheets 1120 are pressed against the discharge tray 1012 by the flag portion 1022 of the full-state detection flag 1020 while being supported by the guiding member 1140, the full-state detection flag 1020B is rotated from the detecting position toward the stand-by position by a predetermined amount. Then, the state of the sensor 1030 is changed from the ON state to the OFF state. By this, sheet(s) can be further stacked on the discharge tray 1012.

In the case where discrimination that the state of the sensor 1030 is changed from the ON state to the OFF state (step S1014: Yes), the controller 1080 not only permits discharge of the sheet S by the discharging roller pair 1011 but also causes the guiding member 1040 to move from the second position to the first position (step S1015). Then, the sheet S is discharged by the discharging roller pair 1011. The step S1016 is similar to that in the embodiment 4, and therefore will be omitted from description.

Further, parts (a) and (b) of FIG. 27 are schematic views for illustrating the case where the stacked sheets 1120 stacked on the discharge tray 1012 are not curled. As shown in part (a) of FIG. 25, the flag portion 1022 positioned in the detecting position contacts the stacked sheet 1120 which is not curled, and therefore movement thereof toward the stand-by position is restricted. On the other hand, in the step S1013 of FIG. 19, the guiding member 1140 (main body portion 1041) is moved from the first position to the second position, whereby the pressing portion 1042a of the pressing member 1042 of the guiding member 1140 presses the pressing portion 1023. The stacked sheets 1120 are not curled, and the full-state detection flag 1020 is kept at the detecting position, and therefore, the pressing member 1042 is rotated about the rotation shaft 1040a relative to the main body portion 1041 against the urging force of the urging member 1091. By this, a force received by the pressing member 1042 from the main body portion 1041 via the urging member 1091 is caused to escape by rotation of the pressing member 1042, relative to the main body portion 1041 so that breakage of the guiding member 1140 and the full-state detection flag 1020 are prevented.

In such a case, the flag portion 1022 is not moved from the detecting position even when the pressed portion 1023 is pressed by the pressing portion 1042a. Therefore, in the step S1014 of FIG. 19, the controller 1080 discriminates that the state of the sensor 1030 is not changed from the ON state to the OFF state (step S1014: No), and the sequence goes to the step S1017.

The step S1017 is similar to that in the embodiment 5, and therefore will be omitted from description.

By employing the constitution as described above, similarly as in the embodiment 5, the stacked sheets 1120 can be firmly pressed without increasing a weight of the full-state detection flag 1020 itself, so that a sheet stacking property can be improved. Further, in this embodiment, the guiding member 1140 is constituted by the main body portion 1041 and the pressing member 1042, and a constitution in which the urging member 1091 is interposed between the main body portion 1041 and the pressing member 1042 is employed. For this reason, a pressing force of the flag portion 1022 toward the stacked sheets 1120 can be easily changed depending on an elastic force of the urging member 1091. Therefore, by changing the urging member 1091, the pressing force of the flag portion 1022 toward the stacked sheets 1120 can be easily changed.

Other Embodiments

Incidentally, in either one of the above-described embodiments, the guiding member 1040 or 1140 is moved from the first position to the second position, whereby the pressing force of the flag portion 1022 toward the stacked sheets 1120 was increased, but the present invention is not limited thereto. For example, instead of the guiding member 1040 or 1140, a movable member for increasing the pressing force of the flag portion 1022 toward the stacked sheets 1120 may be provided. A constitution and arrangement of this movable member are not limited. By providing such a movable member, the pressing force of the full-state detection flag 1020U toward the stacked sheet 1120 can also be increased.

Further, in the embodiment 5, the urged portion 1023 was constituted by the elastic material and was constituted so as to be elastically deformed when the urging portion 1040b presses the urged portion 1023, but the present invention is not limited thereto. For example, the urging portion 1042b may be constituted by the elastic material and may be constituted so as to be elastically deformed when the urging portion 1040b presses the urged portion 1023. That is, when the urging portion 1040b presses the urged portion 1023, a constitution in which at least either one of the urged portion 1023 and the urging portion 1040b is elastically deformed may only be required to be employed.

Further, in the embodiment 5, when the guiding member 1040 is positioned in the first position and the flag portion 1022 is positioned in the detecting position, the urging portion 1040b of the guiding member 1040 is spaced from the urged portion 1023 of the full-state detection flag 1020, but the present invention is not limited thereto. For example, when the guiding member 1040 is positioned in the first position and the flag portion 1022 is positioned in the detecting position, the urging portion 1040b of the guiding member 1040 may lightly contact the urged portion 1023 of the full-state detection flag 1020. In either case, a constitution in which the pressing force of the flag portion 1022 toward the stacked sheets 1120 is increased by movement of the guiding member 1040 from the first position to the second position (step S1013 of FIG. 19) may only be required to be employed. The same also applies to the embodiments 6 and 7.

Further, in either one of the above-described embodiments, in the case where discrimination that the state of the sensor 1030 becomes the ON state through the steps S1014 to S1016 is made (step S1010: Yes), the controller 1080 may cause the sequence to go to the step S1017.

Further, in either one of the above-described embodiments, description was made using the printer 1001 of the electrophotographic type, but the present invention is not limited thereto. For example, the present invention is applicable to an image forming apparatus of an ink jet type in which an image is formed on a sheet by ejecting an ink liquid from a nozzle. Further, the present invention is also applicable to a sheet conveying apparatus detachably mountable to the printer 1001.

The present invention is capable of being realized in processing such that a program for realizing one or more functions of the above-described embodiments is supplied to a system or an apparatus via a network or a medium and then one or more processors in a computer of the system or the apparatus reads and executes the program. Further, the present invention is also capable of being realized by a circuit (ASIC) for realizing one or more functions.

According to the present invention, a sheet stacking property can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2022-179893 filed on Nov. 9, 2022, and 2022-199832 filed on Dec. 14, 2022, which are hereby incorporated by reference herein in their entirety.

What is claimed is:

1. An image forming apparatus comprising:
a feeding unit configured to feed a sheet;
an image forming unit configured to form an image on the sheet fed by the feeding unit;
a fixing unit configured to fix the image on the sheet by heating the sheet;
a casing configured to accommodate the fixing unit, the casing including a first conveyance passage along which the sheet passed through the fixing unit is conveyed and including a second conveyance passage branched from the first conveyance passage;
a discharging unit provided in the first conveyance passage and configured to discharge the sheet to an outside of the casing;
a reversing unit configured to reverse and convey the sheet in the second conveyance passage so that the sheet conveyed in the second conveyance passage is conveyed again toward the image forming unit; and
a controller configured to execute a first operation and a second operation executed for a predetermined sheet during execution of a job for forming an image on one side of each of a plurality of sheets,
wherein in the first operation, the image forming unit forms the image on the sheet fed by the feeding unit, and then the discharging unit discharges the sheet, and
wherein in the second operation, after the reversing unit reverses and conveys the sheet (i) which is fed by the feeding unit and (ii) which passes through the image forming unit without forming the image thereon and is conveyed to the second conveyance passage, the image forming unit forms the image on the sheet, and then the discharging unit discharges the sheet.

2. An image forming apparatus according to claim 1, further comprising:
a first movable guide movable to a first position where the first movable guide guides the sheet, passed through the fixing unit, toward the discharging unit and a second position where the first movable guide guides the sheet, passed through the fixing unit, toward the second conveyance passage; and
a second movable guide provided on a side downstream of the fixing unit and upstream of the first movable guide with respect to a sheet conveying direction in the first conveyance passage and movable to a third position where the second movable guide permits passing of the sheet passed through the fixing unit and a fourth position where the sheet enters the first conveyance passage.

3. An image forming apparatus according to claim 2, further comprising:
a driving source configured to drive the first movable guide so as to be moved to the first position and the second position; and
an urging unit configured to urge the second movable guide toward the fourth position.

4. An image forming apparatus according to claim 1, wherein the second conveyance passage includes a guiding member for guiding the sheet fed by the reversing unit,
wherein the fixing unit includes a first member and a second position which are provided so as to form a nip, and
wherein at least a part of the guiding member is positioned above the nip with respect to a vertical direction.

5. An image forming apparatus according to claim 4, wherein as viewed in a sheet width direction perpendicular to a sheet conveying direction in the nip, the part of the guiding member is positioned on a side downstream of the nip with respect to a horizontal component of the sheet conveying direction and is inclined so as to be extended upward in the vertical direction toward an upstream side of the horizontal component.

6. An image forming apparatus according to claim 1, wherein the discharging unit is formed by a first roller and a second roller rotated while nipping the sheet in a cooperation with the first roller to discharge the sheet, and wherein the reversing unit is formed by the second roller and a third roller rotated while nipping the sheet in a cooperation with the second roller to discharge the sheet.

7. An image forming apparatus according to claim 1, wherein in a case that the image forming apparatus forms the image on each of double sides of each of the plurality of sheets including a first sheet and a second sheet, a period in which the first sheet is reversed and conveyed in the second conveyance passage and a period in which a leading end of the second sheet passed through the fixing unit passes through the first conveyance passage and is fed to the discharging unit overlap with each other.

8. An image forming apparatus according to claim 1, wherein the predetermined sheet is a single sheet per a predetermined number of sheets in a feeding order of the sheets by the feeding unit.

9. An image forming apparatus according to claim 1, wherein in a case that the job is a first job, a job started after an end of the first job and for forming an image on one side of each of the plurality of sheets is a second job, a time from the end of the first job to a start of the second job is a stand-by time, and a number of sheets fed by the first operation from the start of the second job until the second operation is first executed in the second job is a number of sheets of execution,
the controller executes the second operation in the second job so that the number of sheets of execution when the stand-by time is a first length is more than the number of sheets of execution when the stand-by time is a second length shorter than the first length.

10. An image forming apparatus according to claim 1, further comprising a temperature detecting unit configured to detect an environmental temperature of an environment in which the image forming apparatus is installed,
wherein on the basis of a detection result of the temperature detecting unit, the controller is constituted so that a frequency of execution of the second operation during the execution of the job in a case that the environmental temperature is a first temperature is made higher than a frequency of execution of the second operation during the execution of the job in a case that the environmental temperature is a second temperature higher than the first temperature.

11. An image forming apparatus according to claim 1, further comprising a humidity detecting unit configured to detect an environmental humidity of an environment in which the image forming apparatus is installed,
wherein on the basis of a detection result of the humidity detecting unit, the controller is constituted so that a frequency of execution of the second operation during the execution of the job in a case that the environmental humidity is a first humidity is made higher than a frequency of execution of the second operation during the execution of the job in a case that the environmental humidity is a second humidity lower than the first humidity.

12. An image forming apparatus according to claim 1, further comprising a measuring unit configured to measure a water content of the sheet,
wherein on the basis of a measurement result of the measuring unit, the controller is constituted so that a frequency of execution of the second operation during the execution of the job in a case that the water content of the sheet is a first water content is made higher than a frequency of execution of the second operation during the execution of the job in a case that the water content of the sheet is a second water content lower than the first water content.

13. An image forming apparatus according to claim 1, wherein the controller is constituted so that during the execution of the job, after the first operation is executed for a first predetermined number of sheets, a sheet which is either one of a second predetermined number of sheets subsequent to the first predetermined number of sheets in a feeding order to the sheets by the feeding unit and which is broadest in margin of the image formed on the sheet of the second predetermined number of sheets is the predetermined sheet.

14. An image forming apparatus according to claim 1, wherein the controller determines the predetermined sheet on the basis of an integrated value obtained by integrating an addition value for every one sheet which is an object of the first operation.

15. An image forming apparatus according to claim 14, wherein in a case that the integrated value obtained by integrating the addition value corresponding to either one of the sheets is a predetermined threshold or more, the controller determines, as the predetermined sheet, a sheet subsequent to the sheet in a feeding order of the sheets by the feeding unit and then resets the integrated value.

16. An image forming apparatus according to claim 14, wherein in a case that the job is a first job, a job started after an end of the first job and for forming an image on one side of each of the plurality of sheets is a second job, and a time from the end of the first job to a start of the second job is a stand-by time,
the controller determines a sheet which is an object of the second operation in the second job by using the integrated value obtained by making subtraction depending on a length of the stand-by time.

17. An image forming apparatus according to claim 14, wherein the addition value is changed depending on an environmental temperature of an environment in which the image forming apparatus is installed.

18. An image forming apparatus according to claim 14, wherein the addition value is changed depending on an environmental humidity of an environment in which the image forming apparatus is installed.

19. An image forming apparatus according to claim 14, wherein the addition value is changed depending on a water content of the sheet.

20. An image forming apparatus according to claim 14, wherein in a case that the integrated value obtained by integrating the addition value corresponding to either one of sheets becomes not less than a threshold set in advance, the controller determines, as the predetermined sheet, a sheet broadest in margin of an image formed on a sheet of a predetermined number of sheets after the sheet in a feeding order of the sheets by the feeding unit.

21. An image forming apparatus according to claim 1, wherein the second conveyance passage is provided so that a leading end of the sheet enters the second conveyance passage before a trailing end the sheet passes through the fixing unit.

22. An image forming apparatus according to claim 1, wherein the controller starts the first operation for a sheet subsequent to the predetermined sheet in a feeding order of the sheets by the feeding unit during execution of the second operation for the predetermined sheet, and
the image is formed by the image forming unit on the subsequent sheet in a period from passing of the predetermined sheet through the image forming unit until the subsequent sheet is conveyed again to the image forming unit.

23. An image forming apparatus according to claim 1, wherein the controller determines, as the predetermined sheet, a second sheet or a sheet thereafter in a feeding order of the sheets by the feeding unit.

24. An image forming apparatus according to claim 1, wherein in a case that the second operation is executed for each of the plurality of sheets during the execution of the job, the first operation is executed at least once after the execution of the second operation and before execution of a subsequent second operation.

25. A sheet discharging device comprising:
a discharging portion configured to discharge a sheet;
a stacking portion configured to stack the sheet discharged by the discharging portion;
a first moving unit including a contact portion movable to a stand-by position and a detecting position and including a pressed portion;
a detecting portion configured to detect a position of the contact portion;
a second moving unit including a pressing portion and movable to a first position and a second position;
an actuator configured to drive the second moving unit; and
a controller configured to control the actuator and the discharging portion,
wherein the contact portion is positioned in the detecting position in a case that the contact portion contacts the sheet, stacked on the stacking portion, in a position higher than a predetermined position, and
wherein the controller executes
(i) in a case that detection that the contact portion is positioned in the detecting position is made by the detecting portion, first processing for moving the second moving unit from the first position to the second position so that the pressing portion presses the pressed portion so as to urge the contact portion from the detecting position toward the stand-by position, and
(ii) second processing for permitting discharge of the sheet by the discharging portion in a case that detection that the contact portion is moved from the detecting position toward the stand-by position after the first processing is made by the detecting portion, and for restricting the discharge of the sheet by the discharging portion in a case that detection that the contact portion is maintained in the detecting position even after the first processing is made by the detecting portion.

26. A sheet discharging device according to claim 25, wherein a force by which the sheet stacked on the stacking portion is pressed by the contact portion is increased by execution of the first processing.

27. A sheet discharging device according to claim 25, wherein the detecting portion includes a light emitting portion for emitting light and a light receiving portion for receiving the light emitted from the light emitting portion, and changes an output value on the basis of whether or not the light receiving portion receives the light, and
wherein the first moving unit includes a light shielding portion movable integrally with the contact portion and capable of shielding the light emitted from the light emitting portion toward the light receiving portion.

28. A sheet discharging device according to claim 25, wherein the contact portion is rotatable about a rotation shaft between the stand-by position and the detecting position.

29. A sheet discharging device according to claim 25, wherein the second moving unit guides the sheet to a first conveyance passage in the first position, and guides the sheet to a second conveyance passage different from the first conveyance passage in the second position.

30. A sheet discharging device according to claim 25, wherein in the stand-by position, when a height of the sheet stacked on the stacking portion is less than a predetermined height, the contact portion does not contact the sheet stacked on the stacking portion.

31. A sheet discharging device according to claim 25, wherein the pressed portion is provided integrally with the contact portion.

32. A sheet discharging device according to claim 31, wherein the second moving unit includes a main body portion driven by an actuator, the pressing portion provided integrally with the main body portion, and
wherein at least one of the pressing portion and the pressed portion is elastically deformed when the pressing portion presses the pressed portion in the first processing.

33. A sheet discharging device according to claim 31, wherein the second moving unit includes a main body portion driven by an actuator, the pressing portion provided separately from the main body portion, and a first urging portion for connecting the main body portion and the pressing portion with each other and for urging the pressing portion toward the pressed portion relative to the main body portion, and
wherein the first urging portion is elastically deformed when the pressing portion presses the pressed portion in the first processing.

34. A sheet discharging device according to claim 25, wherein the second moving unit includes a main body portion driven by the actuator and the pressed portion provided integrally with the main body portion,
wherein the first moving unit includes the contact portion, the pressed portion provided separately from the contact portion, and a second urging portion for connecting the contact portion and the pressed portion with each other and for urging the pressed portion toward the pressed portion relative to the contact portion, and
wherein the second urging portion is elastically deformed when the pressing portion presses the pressed portion in the first processing.

35. An image forming apparatus comprising:
an image forming portion configured to form an image on a sheet;
a discharging portion configured to discharge the sheet on which the image is formed by an image forming portion;
a stacking portion configured to stack the sheet discharged by the discharging portion;
a first moving unit including a contact portion movable to a stand-by position and a detecting position and including a pressed portion;
a detecting portion configured to detect a position of the contact portion;
a second moving unit including a pressing portion and movable to a first position and a second position;
an actuator configured to drive the second moving unit; and
a controller configured to control the actuator and the discharging portion,
wherein the contact portion is positioned in the detecting position in a case that the contact portion contacts the sheet, stacked on the stacking portion, in a position higher than a predetermined position, and wherein the controller executes in a case that detection that the contact portion is positioned in the detecting position is made by the detecting portion, first processing for moving the second moving unit from the first position to the second position so that the pressing portion presses the pressed portion so as to urge the contact portion from the detecting position toward the stand-by position, and second processing for permitting discharge of the sheet by the discharging portion in a case that detection that the contact portion is moved from the detecting position toward the stand by position after the first processing is made by the detecting portion, and for restricting the discharge of the sheet by the discharging portion in a case that detection that the contact portion is maintained in the detecting position even after the first processing is made by the detecting portion.

* * * * *